(12) United States Patent
Nishiyama et al.

(10) Patent No.: US 10,082,777 B2
(45) Date of Patent: Sep. 25, 2018

(54) CPU UNIT FOR PLC, PLC-USE SYSTEM PROGRAM, RECORDING MEDIUM IN WHICH PLC-USE SYSTEM PROGRAM IS STORED, PLC SYSTEM, PLC SUPPORT DEVICE, PLC SUPPORT PROGRAM, AND RECORDING MEDIUM IN WHICH PLC SUPPORT PROGRAM IS STORED

(75) Inventors: Yoshihide Nishiyama, Yokohama (JP); Shigeyuki Eguchi, Joyo (JP); Osamu Hamasaki, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 477 days.

(21) Appl. No.: 14/125,997

(22) PCT Filed: Mar. 12, 2012

(86) PCT No.: PCT/JP2012/056243
§ 371 (c)(1),
(2), (4) Date: Feb. 18, 2014

(87) PCT Pub. No.: WO2013/011713
PCT Pub. Date: Jan. 24, 2013

(65) Prior Publication Data
US 2014/0207254 A1    Jul. 24, 2014

(30) Foreign Application Priority Data

Jul. 15, 2011    (JP) ................................. 2011-156474

(51) Int. Cl.
*G06F 9/46* (2006.01)
*G05B 19/04* (2006.01)
(Continued)

(52) U.S. Cl.
CPC ........... *G05B 19/04* (2013.01); *G05B 19/056* (2013.01); *G06F 9/4887* (2013.01);
(Continued)

(58) Field of Classification Search
None
See application file for complete search history.

(56) References Cited

U.S. PATENT DOCUMENTS

| 4,947,315 A | * | 8/1990 | Sokolow | ............ G05B 19/0426 |
| | | | | 700/86 |
| 5,636,124 A | | 6/1997 | Rischar et al. | |
| | | (Continued) | | |

FOREIGN PATENT DOCUMENTS

| JP | H06-309010 A | 11/1994 |
| JP | H07-295858 A | 11/1995 |
| | (Continued) | |

OTHER PUBLICATIONS

Anonymous:"recv(2):receive message from socket—Linux man page",,Aug. 6, 2007(Aug. 6, 2007), XP055186804, Retrieved from the Internet: URL:http://wayback.archive.org/web/20070806000255/http://linux.die.net/man/2/recv [retrieved on Apr. 29, 2015]p. 1, paragraph 3-paragraph 5.

(Continued)

*Primary Examiner* — Diem Cao
(74) *Attorney, Agent, or Firm* — Metrolexis Law Group, PLLC

(57) ABSTRACT

A system program includes a procedure library in which at least a procedure for controlling execution of a control program and a procedure for controlling output of output data and input of input data are included. If schedule-building data including execution order specifications for the procedures included in the procedure library is stored in a storage section, the system program causes a microprocessor to execute the procedures included in the procedure library in accordance with the procedure execution order specifications included in schedule-building data.

25 Claims, 54 Drawing Sheets

(51) Int. Cl.
  *G06F 9/48* (2006.01)
  *G05B 19/05* (2006.01)
  *G05B 19/042* (2006.01)
(52) U.S. Cl.
  CPC .......... *G05B 19/0421* (2013.01); *G05B 19/05* (2013.01); *G05B 2219/15079* (2013.01)

(56) References Cited

U.S. PATENT DOCUMENTS

| | | | |
|---|---|---|---|
| 5,974,346 | A | 10/1999 | Poledna |
| 2002/0198970 | A1* | 12/2002 | Kuwa ................ G05B 19/0421 709/220 |
| 2003/0149864 | A1* | 8/2003 | Furukawa ............ G06F 9/3851 712/228 |
| 2005/0097233 | A1* | 5/2005 | Oka ..................... G05B 19/054 710/9 |
| 2010/0174387 | A1* | 7/2010 | Ono ....................... G05B 19/05 700/23 |
| 2010/0194635 | A1* | 8/2010 | An .......................... G01S 19/24 375/147 |
| 2014/0026145 | A1* | 1/2014 | Canedo .................. G06F 8/433 718/105 |

FOREIGN PATENT DOCUMENTS

| | | |
|---|---|---|
| JP | H10-207724 A | 8/1998 |
| JP | 2000-105604 A | 4/2000 |
| JP | 2010-293210 A | 10/2000 |
| JP | 2002-297234 A | 10/2002 |
| JP | 2003-140918 A | 5/2003 |
| JP | 2007-140656 A | 6/2007 |
| JP | 2009-187573 A | 8/2009 |
| WO | 2011043108 A1 | 4/2011 |

OTHER PUBLICATIONS

Anonymous: "send(2): send message on socket—Linux man page",,Aug. 4, 2007(Aug. 4, 2007), XP055186805, Retrieved from the Internet: URL:http://wayback.archive.org/web/20070804154824/ http://linux.die.nettman/2/send [retrieved on Apr. 29. 2015] p. 1, paragraph 5-paragraph 8.

Office Action dated Aug. 16, 2017 in the counterpart European patent application.

* cited by examiner

Fig. 8

Explanation of task set items

| Set item | Explanation |
|---|---|
| Task name | Specifies task name |
| Task initiation conditions | As task initiation conditions, the following can be specified<br>• "Execution cycle period (n)" starts task each time the control cycle is performed n number of times.<br>• "Event (eeee)", where eeee is a character string that represents an event name.   The event comes in a specific interrupt etc.   If a specified event occurs, a procedure specified in the set item of "task initiation processing" is executed when the processor encounters an idle time. |
| Task initiation processing | Specifies the name and priority of a procedure to be executed upon initiation of task. The priority takes on 2 as an initial value. |
| Thread specification | Specifies the name of a thread.   A plurality of names can be specified. |
| Task termination conditions | Specifies the name of a thread.   A procedure specified in the set item of "task termination processing" is subject to subsequent activation in a thread specified in the present item. |
| Task termination processing | Specifies the name and priority of a procedure to be executed upon task termination.<br>The priority takes on 3 as an initial value. |
| Cycle overrun allowance count | Specifies a cycle overrun allowance count in an integer.   If a cycle overrun occurs in excess of the cycle overrun allowance count, error processing is executed.<br>If "0" is specified, a period overrun is not allowed, so that the error processing is executed if the period overrun occurs once. |

Fig. 9A

Explanation of thread set items (1/2)

| Set item | Explanation |
|---|---|
| Thread name | Specifies the name of a thread. |
| Priority | Specifies the priority value (at least 4 ordinarily) of a thread in execution. An integer is specified. The smaller the value is, the higher the priority is. The thread having the highest priority value in a queue is executed. |
| Initiation conditions | Conditions for initiation of a thread are specified. The following can be specified.<br>• "tttt" or "ssss"<br>tttt and ssss are character strings that represent the names of a task and a thread respectively. If a task name is specified, the relevant thread is subject to subsequent activation in initiation processing of a specified task. If a thread name is specified, the relevant thread is subject to subsequent activation in initiation processing of a specified thread.<br>• "event (eeee)"<br>eeee is a character string that represents the name of an event. The event may come in a specific interrupt etc. If a specified event occurs, the relevant thread is activated. |

Fig. 9B

Explanation of thread set items (2/2)

| Set item | Explanation |
|---|---|
| Procedure specification | Specifies the name of a procedure to be executed. A plurality of procedures can be specified. They are executed in order in which they are enumerated. |
| Control program specification | Specifies the name of a user program to be executed or a reserved word (motion computing program). A plurality of user program names can be specified. If a plurality of user program names are specified, they are executed in order in which they are enumerated. If a reserved word (motion computing program) is specified, the motion computing program is executed in the relevant thread for a user program of the other threads. It is impossible to specify both of a user program name and a reserved word (motion computing program). |
| Motion thread specification | If a user program is already specified in the set item of "Control program specification" and the specified user program includes a motion instruction, specifies the name of a thread in which a motion computing program is executed for the specified user program. If nothing is specified in the present set item, the motion computing program is executed in the relevant thread subsequent to execution of the user program specified in the set item of "Control program specification". |
| Execution core specification | Specifies a core at which a thread is to be executed in a case where a multicore processor is employed for execution. |

Fig. 10

| Name | Function | | |
|---|---|---|---|
| Control cycle initiation procedure | Activates a procedure specified in the set item of "Task initiation processing" for each task | | |
| | Set item | Explanation of set item | |
| | Control cycle initiation conditions | • "Control cycle initiation interrupt"<br>Activated if a control cycle initiation interrupt occurs. (If the priority value is an initial value of 1, execution of the relevant procedure is immediately started.<br>• "tttt"<br>tttt is a character string that represents the name of a task. Subject to subsequent activation in termination processing of a specified task. | |
| | Priority | The initial value is 1. It can be changed. | |

Fig. 11A

| Name | Function |
|---|---|
| Task initiation procedure | • Counts up the execution cycle count of a task.<br>• If the execution cycle count upon count-up is in excess of "execution cycle period (n) + cycle overrun allowance count" and the task ending flag is down, executes error processing for execution cycle overrun.<br>• If the execution cycle count upon count-up is in excess of an execution cycle period (n) and the task ending flag is up, executes the following processing pieces.<br>  • sets the task execution cycle count to "1";<br>  • pushes down the task ending flag;<br>  • starts a timer for use in measurement of a task execution time; and<br>  • activates a thread subject to subsequent activation.<br>• If the execution cycle count upon count-up is in excess of the execution cycle period (n) and the task ending flag is down, activates a thread subject to subsequent activation. (However, if the thread subject to subsequent activation is already activated or a halted state is entered to wait for an event (communication termination notification), nothing is done. |
| Task termination procedure | • Pushes the task ending flag up.<br>• Counts up the task execution count.<br>• Measures the task execution time and records it. |
| Subsequent activation procedure | Activates a thread set for subsequent activation and a procedure and then terminates execution of the thread (enters the sleep state). However, threads of a task whose task ending flag is up are not activated. |
| Output copy procedure | Copies pre-specified output data from the output synchronization buffer to the transmission buffer. |
| Synchronization output copy procedure | Only if the execution cycle count of a task is "1", copies pre-specified output data about the task from the output synchronization buffer to the transmission buffer. The copy must be performed before a related control program is executed in a control cycle. |

Fig. 11B

| Name | Function |
|---|---|
| Input/output directive procedure | Directs the communication circuit to perform output and input operations on pre-specified output data and input data respectively. |
| Output directive procedure | Directs the communication circuit to perform output operations on pre-specified output data. |
| Input directive procedure | Directs the communication circuit to perform input operations on pre-specified input data. |
| Communication termination notification waiting procedure | If notified of communication termination, sets the relevant thread to be reactivated and halts the relevant thread (puts it in the sleep state). |
| Input copy procedure | Copies pre-specified input data from the reception buffer to the input synchronization buffer. |
| Synchronization input copy procedure | Only if the execution cycle count of a task is "1", copies pre-specified input data about the task from the reception buffer to the input synchronization buffer. Copy must be performed before a related control program is executed in a control cycle. |
| Variable reference initiation procedure | Prevents the variable synchronization buffer referenced by a referrer side control program from being rewritten. |
| Control program execution procedure | Starts execution of a control program. |
| Variable distribution procedure | Copies contents of a global variable owned by an owner side control program to the synchronization buffer of a referrer side control program. |
| Cycle timer procedure | Acquires a lapse of times that has elapsed from the initiation of a control cycle to calculate a remaining time to the end of the control cycle, sets a timer in the processor such that, if the remaining time elapses, a timer interrupt may occur, configures the relevant thread to be reactivated upon occurrence of the timer interrupt, and halts the relevant thread (puts it in the sleep state). |
| Data trace procedure | Records a pre-specified variable value in a log file. |

Fig. 12

(1)
| Control cycle initiation conditions | Control cycle initiation interrupt |
|---|---|
| Priority | 1 |

(2)
| Task name | Control A task |
|---|---|
| Task initiation conditions | Execution cycle period (1) |
| Task initiation processing | Task initiation procedure, priority (2) |
| Thread specification | Input/output A Thread<br>Control A Thread |
| Task termination conditions | Control A Thread |
| Task termination processing | Task termination procedure, priority (3) |
| Cycle overrun allowance count | 1 |

(3)
| Thread name | Input/output A Thread |
|---|---|
| Priority | 4 |
| Initiation conditions | Control A task |
| Procedure specification | Synchronization output copy procedure<br>Input/output directive procedure<br>Communication termination notification waiting procedure<br>Synchronization input copy procedure<br>Subsequent activation procedure |

(4)
| Thread name | Control A Thread |
|---|---|
| Priority | 5 |
| Initiation conditions | Input/output A Thread |
| Procedure specification | Data trace procedure<br>Variable reference initiation procedure<br>Control program execution procedure<br>Variable distribution procedure<br>Subsequent activation procedure |
| Control program specification | Control A program |

(5)
| Task name | Control B task |
|---|---|
| Task initiation conditions | Execution cycle period (2) |
| Task initiation processing | Task initiation procedure, priority (2) |
| Thread specification | Control B Thread |
| Task termination conditions | Control B Thread |
| Task termination processing | Task termination procedure, priority (3) |
| Cycle overrun allowance count | 1 |

(6)
| Thread name | Control B Thread |
|---|---|
| Priority | 6 |
| Initiation conditions | Control A Thread |
| Procedure specification | Variable reference initiation procedure<br>Control program execution procedure<br>Variable distribution procedure<br>Subsequent activation procedure |
| Control program specification | Control B program |

Fig. 20

(1)
| Control cycle initiation conditions | Control cycle initiation interrupt |
|---|---|
| Priority | 1 |

(2)
| Task name | Control E task |
|---|---|
| Task initiation conditions | Execution cycle period (1) |
| Task initiation processing | Task initiation procedure, priority (2) |
| Thread specification | Output E thread<br>Input E thread<br>Control E Thread |
| Task termination conditions | Control E Thread |
| Task termination processing | Task termination procedure |
| Cycle overrun allowance count | 1 |

(3)
| Thread name | Output E Thread |
|---|---|
| Priority | 4 |
| Initiation conditions | Control E task |
| Procedure specification | Synchronization output copy procedure<br>Input/output directive procedure<br>Subsequent activation procedure |

(4)
| Thread name | Control E Thread |
|---|---|
| Priority | 5 |
| Initiation conditions | Input E Thread |
| Procedure specification | Communication termination notification waiting procedure<br>Synchronization input copy procedure<br>Subsequent activation procedure |

(5)
| Thread name | Control E Thread |
|---|---|
| Priority | 6 |
| Initiation conditions | Input E Thread |
| Procedure specification | Data trace procedure<br>Variable reference initiation procedure<br>Control program execution procedure<br>Variable distribution procedure<br>Subsequent activation procedure |
| Specification control program | Control E program |

(6)
| Task name | Control F task |
|---|---|
| Task initiation conditions | Execution cycle period (2) |
| Task initiation processing | Task initiation procedure, priority (2) |
| Thread specification | Control F Thread |
| Task termination conditions | Control F Thread |
| Task termination processing | Task termination procedure |
| Cycle overrun allowance count | 1 |

(6)
| Thread name | Control F Thread |
|---|---|
| Priority | 7 |
| Initiation conditions | Control F task |
| Procedure specification | Variable reference initiation procedure<br>Control program execution procedure<br>Variable distribution procedure<br>Subsequent activation procedure |
| Control program specification | Control F program |

| Control cycle initiation conditions | Control cycle initiation interrupt |
|---|---|
| Priority | 1 |

(2)

| Task name | Control G task |
|---|---|
| Task initiation conditions | Execution cycle period (1) |
| Task initiation processing | Task initiation procedure, priority (2) |
| Thread specification | Input/output G Thread<br>Control G Thread |
| Task termination conditions | Control G Thread |
| Task termination processing | Task termination procedure, priority (3) |
| Cycle overrun allowance count | 1 |

(3)

| Thread name | Input/output G Thread |
|---|---|
| Priority | 4 |
| Initiation conditions | Control G task |
| Procedure specification | Synchronization output copy procedure<br>Input/output directive procedure<br>Communication termination notification waiting procedure<br>Synchronization input copy procedure<br>Subsequent activation procedure |

(4)

| Thread name | Control G Thread |
|---|---|
| Priority | 6 |
| Initiation conditions | Input/output G Thread |
| Procedure specification | Data trace procedure<br>Variable reference initiation procedure<br>Control program execution procedure<br>Variable distribution procedure<br>Subsequent activation procedure |
| Control program specification | |

(5)

| Task name | Control H task |
|---|---|
| Task initiation conditions | Execution cycle period (2) |
| Task initiation processing | Task initiation procedure, priority (2) |
| Thread specification | Input/output H Thread<br>Control H Thread |
| Task termination conditions | Control H Thread |
| Task termination processing | Task termination procedure, priority (3) |
| Cycle overrun allowance count | 1 |

(6)

| Thread name | Input/output H Thread |
|---|---|
| Priority | 5 |
| Initiation conditions | Control H task |
| Procedure specification | Output copy procedure<br>Input/output directive procedure<br>Communication termination notification waiting procedure<br>Input copy procedure<br>Subsequent activation procedure |

(7)

| Thread name | Control H Thread |
|---|---|
| Priority | 7 |
| Initiation conditions | Input/output H Thread |
| Procedure specification | Variable reference initiation procedure<br>Control program execution procedure<br>Variable distribution procedure<br>Subsequent activation procedure |
| Specification control program | Control B program |

Fig. 25

(1)
| Control cycle initiation conditions | Control cycle initiation interrupt |
|---|---|
| Priority | 1 |

(2)
| Task name | Control J task |
|---|---|
| Task initiation conditions | Execution cycle period (1) |
| Task initiation processing | Task initiation procedure, priority (2) |
| Thread specification | Input/output J Thread<br>Control J Thread |
| Task termination conditions | Control J Thread |
| Task termination processing | Task termination procedure, priority (3) |
| Cycle overrun allowance count | 1 |

(3)
| Thread name | Input/output J Thread |
|---|---|
| Priority | 4 |
| Initiation conditions | Control J task |
| Procedure specification | Synchronization output copy procedure<br>Input/output directive procedure<br>Communication termination notification waiting procedure<br>Synchronization input copy procedure<br>Subsequent activation procedure |

(4)
| Thread name | Control J Thread |
|---|---|
| Priority | 5 |
| Initiation conditions | Input/output J Thread |
| Procedure specification | Control program execution procedure<br>Subsequent activation procedure |
| Control program specification | Motion computing program |

(5)
| Task name | Control K task |
|---|---|
| Task initiation conditions | Execution cycle period (2) |
| Task initiation processing | Task initiation procedure, priority (2) |
| Thread specification | Control K Thread |
| Task termination conditions | Control K Thread |
| Task termination processing | Task termination procedure, priority (3) |
| Cycle overrun allowance count | 1 |

(6)
| Thread name | Control K Thread |
|---|---|
| Priority | 6 |
| Initiation conditions | Control J Thread |
| Procedure specification | Data trace procedure<br>Control program execution procedure<br>Subsequent activation procedure |
| Control program specification | Sequence K program |
| Motion thread specification | Control J Thread |

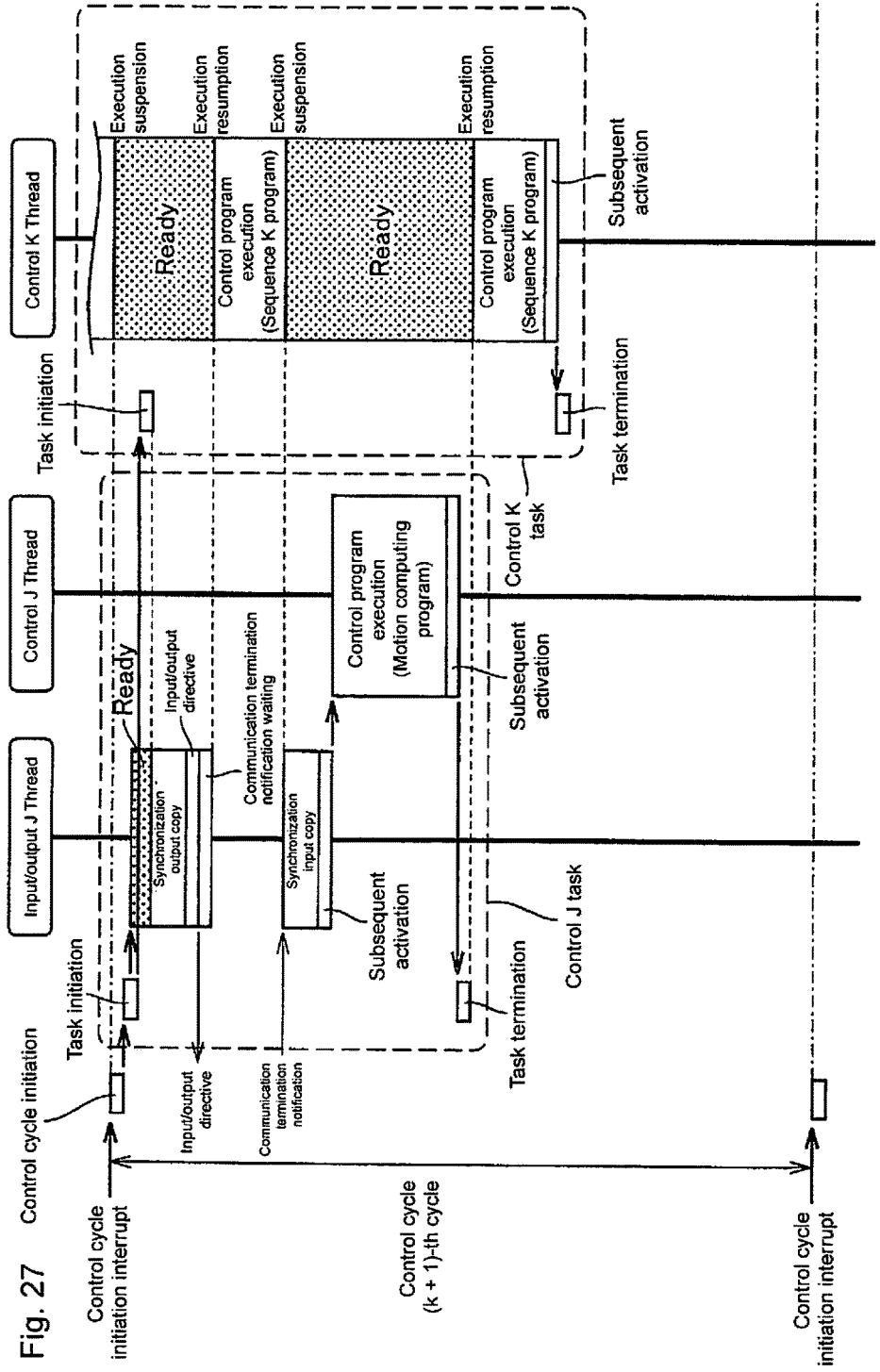

Fig. 28

(1)
| Control cycle initiation conditions | Control cycle initiation interrupt |
|---|---|
| Priority | 1 |

(2)
| Task name | Control L task |
|---|---|
| Task initiation conditions | Execution cycle period (1) |
| Task initiation processing | Task initiation procedure, priority (2) |
| Thread specification | Input/output L Thread<br>Control L1 Thread<br>Control L2 Thread |
| Task termination conditions | Control L2 Thread |
| Task termination processing | Task termination procedure, priority (3) |
| Cycle overrun allowance count | 1 |

(3)
| Thread name | Input/output L Thread |
|---|---|
| Priority | 4 |
| Initiation conditions | Control L task |
| Procedure specification | Output copy procedure<br>Input/output directive procedure<br>Communication termination notification waiting procedure<br>Input copy procedure<br>Subsequent activation procedure |

(4)
| Thread name | Control L1 Thread |
|---|---|
| Priority | 5 |
| Initiation conditions | Input/output L Thread |
| Procedure specification | Data trace procedure<br>Control program execution procedure<br>Subsequent activation procedure |
| Control program specification | Sequence L program |
| Motion thread specification | Control L2 Thread |

(5)
| Thread name | Control L2 Thread |
|---|---|
| Priority | 6 |
| Initiation conditions | Control L1 Thread |
| Procedure specification | Control program execution procedure<br>Subsequent activation procedure |
| Control program specification | Motion computing program |

Fig. 32

(1)
| Control cycle initiation conditions | Control cycle initiation interrupt |
|---|---|
| Priority | 1 |

(2)
| Task name | Control R task |
|---|---|
| Task initiation conditions | execution cycle period (1) |
| Task initiation processing | Task initiation procedure, priority (2) |
| Thread specification | Input/output R Thread<br>Control R Thread |
| Task termination conditions | Control R Thread |
| Task termination processing | Task termination procedure, priority (3) |
| Cycle overrun allowance count | 1 |

(3)
| Thread name | Input/output R Thread |
|---|---|
| Priority | 4 |
| Initiation conditions | Control R task |
| Procedure specification | Synchronization output copy procedure<br>Input/output directive procedure<br>Communication termination notification waiting procedure<br>Synchronization input copy procedure<br>Subsequent activation procedure |
| Execution core specification | First core |

(4)
| Thread name | Control R Thread |
|---|---|
| Priority | 5 |
| Initiation conditions | Input/output R Thread |
| Procedure specification | Data trace procedure<br>Variable reference initiation procedure<br>Control program execution procedure<br>Variable distribution procedure<br>Subsequent activation procedure |
| Control program specification | Control R program |
| Execution core specification | First core |

(5)
| Task name | Control S task |
|---|---|
| Task initiation conditions | execution cycle period (2) |
| Task initiation processing | Task initiation procedure, priority (2) |
| Thread specification | Control S Thread |
| Task termination conditions | Control S Thread |
| Task termination processing | Task termination procedure, priority (3) |
| Cycle overrun allowance count | 1 |

(6)
| Thread name | Control S Thread |
|---|---|
| Priority | 6 |
| Initiation conditions | Input/output R Thread |
| Procedure specification | Variable reference initiation procedure<br>Control program execution procedure<br>Variable distribution procedure<br>Subsequent activation procedure |
| Control program specification | Control S program |
| Execution core specification | Second core |

| Control cycle initiation conditions | Control T task |
|---|---|
| Priority | 1 |

(2)

| Task name | Control T task |
|---|---|
| Task initiation conditions | Execution cycle period (1) |
| Task initiation processing | Task initiation procedure, priority (2) |
| Thread specification | Control T Thread |
| Task termination conditions | Control T Thread |
| Task termination processing | Task termination procedure, priority (3) |
| Cycle overrun allowance count | 1 |

(3)

| Thread name | Control T Thread |
|---|---|
| Priority | 4 |
| Initiation conditions | Control T Task |
| Procedure specification | Data trace procedure<br>Control program execution procedure<br>Output copy procedure<br>Input/output directive procedure<br>Communication termination notification waiting procedure<br>Input copy procedure<br>Subsequent activation procedure |
| Control program specification | Control T program |

Fig. 37

(1)
| Control cycle initiation conditions | Control U task |
|---|---|
| Priority | 1 |

(2)
| Task name | Control U task |
|---|---|
| Task initiation conditions | Execution cycle period (1) |
| Task initiation processing | Task initiation procedure, priority (2) |
| Thread specification | Control U Thread |
| Task termination conditions | Control U Thread |
| Task termination processing | Task termination procedure, priority (3) |
| Cycle overrun allowance count | 1 |

(3)
| Thread name | Control U Thread |
|---|---|
| Priority | 4 |
| Initiation conditions | Control U Task |
| Procedure specification | Input directive procedure<br>Communication termination notification waiting procedure<br>Input copy procedure<br>Data trace procedure<br>Control program execution procedure<br>Output copy procedure<br>Output directive procedure<br>Communication termination notification waiting procedure<br>Cycle timer procedure<br>Subsequent activation procedure |
| Control program specification | Control U program |

Fig. 39A

Explanation of thread set items (1/2)

| Set item | Explanation |
|---|---|
| Thread name | Specifies the name of a thread. |
| Priority | Specifies the priority value (at least 4 ordinarily) of a thread in execution. An integer is specified. The smaller the value is, the higher the priority is. The thread having the highest priority value in a queue is executed. |
| Initiation conditions | Conditions for initiation of a thread are specified. The following can be specified.<br>• "execution cycle period (n)" Starts a thread for each n number of times of control cycles.<br>• "control cycle initiation" Subject to subsequent activation in a "control cycle initiation procedure".<br>• "ssss"<br>ssss is a character string that represents the name of a thread. Subject to subsequent activation in a specified thread.<br>• "event (eeee)"<br>eeee is a character string that represents the name of an event. The event may come in a specific interrupt etc. If a specified event occurs, the relevant thread is activated. |
| Procedure specification | Specifies the names of procedures to be executed. A plurality of procedures can be specified. They are executed in order in which they are specified. |

Fig. 39B

Explanation of thread set items (2/2)

| Set item | Explanation |
|---|---|
| Control program specification | Specifies the name of a user program to be executed or a reserved word (motion computing program). A plurality of user program names can be specified. If a plurality of user program names are specified, they are executed in order in which they are enumerated. If a reserved word (motion computing program) is specified, the motion computing program is executed in the relevant thread for a user program of the other threads. It is impossible to specify both of a user program name and a reserved word (motion computing program). |
| Motion thread specification | If a user program is already specified in the set item of "Specification control program" and the specified user program includes a motion instruction, specifies the name of a thread in which a motion computing program is executed for the specified user program. If nothing is specified in the present set item, the motion computing program is executed in the relevant thread subsequent to execution of the user program specified in the set item of "Specification control program specification". |
| Cycle overrun allowance count | Specifies a cycle overrun allowance count in an integer. If a cycle overrun occurs in excess of the cycle overrun allowance count, error processing is executed. If "0" is specified, a period overrun is not allowed, so that the error processing is executed if the period overrun occurs once. |
| Execution core specification | Specifies a core at which a thread is to be executed in a case where a multicore processor is employed for execution. |

Fig. 40A

| Name | Function | | |
|---|---|---|---|
| Control cycle initiation procedure | · The following processing pieces are executed for each thread.<br>  · Counts up the execution cycle count of a thread.<br>  · If the execution cycle count upon count-up is in excess of "execution cycle period (n) + cycle overrun allowance count" and the thread ending flag is down, executes error processing for execution cycle overrun.<br>  · If the execution cycle count upon count-up is in excess of an execution cycle period (n) and the thread ending flag is up, executes the following processing pieces.<br>    · sets the thread execution cycle count to "1";<br>    · pushes down the thread ending flag;<br>    · starts a timer for use in measurement of a thread execution time; and<br>    · activates a thread subject to subsequent activation.<br>  · If the execution cycle count upon count-up is in excess of the execution cycle period (n) and the thread ending flag is down, activates a thread subject to subsequent activation. (However, if the thread subject to subsequent activation is already activated or a halted state is entered to wait for an event (communication termination notification), nothing is done. | | |
| | Set item | Explanation of set item | |
| | Control cycle initiation conditions | · "Control cycle initiation interrupt"<br>  Activated if a control cycle initiation interrupt occurs. (If the priority value is an initial value of 1, execution of the relevant procedure is immediately started.<br>· "ssss"<br>  ssss is a character string that represents the name of a thread. Subject to subsequent activation in termination processing for a specified thread. | |
| | Priority | The initial value is 1. It can be changed. | |

Fig. 40B

| Name | Function |
|---|---|
| Thread termination procedure | · pushes the thread termination flag up.<br>· Counts up the thread execution count.<br>· Measures a thread execution time. |

"Subsequent activation procedure" and the subsequent are the same as those in Figs. 11A and 11B.

Fig. 41

(1)
| Control cycle initiation conditions | Control cycle initiation interrupt |
|---|---|
| Priority | 1 |

(2)
| Thread name | Input/output V Thread |
|---|---|
| Priority | 2 |
| Initiation conditions | Execution cycle period (1)<br>Control cycle initiation |
| Procedure specification | Synchronization output copy procedure<br>Input/output directive procedure<br>Communication termination notification waiting procedure<br>Synchronization input copy procedure<br>Subsequent activation procedure |
| Cycle overrun allowance count | 0 |

(3)
| Thread name | Control V Thread |
|---|---|
| Priority | 3 |
| Initiation conditions | Execution cycle period (1)<br>Input/output V Thread |
| Procedure specification | Data trace procedure<br>Variable reference initiation procedure<br>Control program execution procedure<br>Variable distribution procedure<br>Subsequent activation procedure |
| Control program specification | Control A program |
| Cycle overrun allowance count | 1 |

(4)
| Thread name | Control W Thread |
|---|---|
| Priority | 4 |
| Initiation conditions | Control V Thread |
| Procedure specification | Variable reference initiation procedure<br>Control program execution procedure<br>Variable distribution procedure<br>Subsequent activation procedure |
| Control program specification | Control B program |
| Cycle overrun allowance count | 1 |

Fig. 45

| Name | Function | | |
|---|---|---|---|
| Control cycle initiation procedure | The following processing pieces are executed for each procedure.<br>• Counts up the execution cycle count of a procedure.<br>• If the execution cycle count upon count-up is in excess of "execution cycle period (n) and the executed flag is down, executes error processing for execution cycle overrun.<br>• If the execution cycle count upon count-up is in excess of "execution cycle period (n) and the executed flag is up, executes the following processing pieces.<br>  • sets the procedure execution cycle count to "1".<br>  • pushes down the executed flag.<br>• Activates the procedure having the smallest execution number. | | |
| | Set item | Explanation of set item | |
| | Control cycle initiation conditions | • "Control cycle initiation interrupt"<br>Activated if a control cycle initiation interrupt occurs. (If the priority value is an initial value of 1, execution of the relevant procedure is immediately started.<br>• "Circulation<br>Activated if execution of a procedure having the largest execution number ends. | |

Fig. 46A

| Name | Function |
|---|---|
| Output copy procedure | Copies pre-specified output data from the output synchronization buffer to the transmission buffer. |
| Synchronization output copy procedure | In the case of the execution cycle synchronization mode, only if the procedure execution cycle count is "1", copies pre-specified output data from the output synchronization buffer to the transmission buffer. |
| Output/input directive procedure | Directs the communication circuit to perform output and input operations on pre-specified output data and input data respectively. |
| Output directive procedure | Directs the communication circuit to perform output operations on pre-specified output data. |
| Input directive procedure | Directs the communication circuit to perform input operations on pre-specified input data. |
| Communication termination notification waiting procedure | Waits for interrupt of communication termination notification. |
| Input copy procedure | Copies pre-specified input data from the reception buffer to the input synchronization buffer. |
| Synchronization input copy procedure | In the case of the execution cycle synchronization mode, only if the procedure execution cycle count is "1", copies pre-specified input data from the reception buffer to the input synchronization buffer. |

Fig. 46B

| Name | Function |
|---|---|
| Variable reference initiation procedure | Prevents the variable synchronization buffer referenced by a referrer side control program from being rewritten. |
| Control program execution procedure | Starts execution of a control program. |
| Variable distribution procedure | Copies contents of a global variable owned by an owner side control program to the variable synchronization buffer of a referrer side control program. |
| Cycle timer procedure | Acquires a lapse of times that has elapsed from the initiation of a control cycle to calculate a remaining time to the end of the control cycle, sets a timer in the processor such that if the remaining time elapses, a timer interrupt may occur, and configures the control cycle initiation procedure to be executed upon occurrence of the timer interrupt. |
| Data trace procedure | Records a pre-specified variable value in a log file. |

| Control cycle initiation conditions | Control cycle initiation interrupt |
|---|---|

(2)

| Procedure | Execution number | Execution cycle period | Subject control program |
|---|---|---|---|
| Synchronization output copy procedure | 1 | 1 | |
| Input/output directive procedure | 2 | 1 | |
| Communication termination notification waiting | 3 | 1 | |
| Synchronization input copy procedure | 4 | 1 | |
| Data trace procedure | 5 | 1 | |
| Variable reference initiation procedure | 6 | 1 | |
| Control program execution procedure | 7 | 1 | Control A program |
| Variable distribution procedure | 8 | 1 | |
| Variable reference initiation procedure | 9 | 2 | |
| Control program execution procedure | 10 | 2 | Control B program |
| Variable distribution procedure | 11 | 2 | |

CPU UNIT FOR PLC, PLC-USE SYSTEM PROGRAM, RECORDING MEDIUM IN WHICH PLC-USE SYSTEM PROGRAM IS STORED, PLC SYSTEM, PLC SUPPORT DEVICE, PLC SUPPORT PROGRAM, AND RECORDING MEDIUM IN WHICH PLC SUPPORT PROGRAM IS STORED

TECHNICAL FIELD

The invention relates to scheduling of control actions in a PLC (referred to as programmable logic controller or programmable controller also) used to control the operations of machines and facilities.

BACKGROUND ART

A PLC is made up of, for example, a central processing unit (CPU) unit which has a microprocessor configured to execute a control program and a plurality of units such as an input/output (IO) unit which handles the input of signals from external switches and sensors and their output to external relays and actuators. The CPU unit controls a control target by repeating the output of output data to the other units and the input of input data from them and also the execution of the control program configured to create the output data by using the input data. The control program includes a user program which is created in compliance with a control purpose on the side of the user. The control program may include a motion computing program whose execution is directed in the user program.

In the PLC, the input of the input data, the output of the output data, and the execution of the control program as well as the PLC's system program may be scheduled in various forms as illustrated below.

As indicated in Patent Document 1 (JP-A 2000-105604 (KOKAI)), in the conventional and typical PLC, in each control cycle, one sequence program (the control program) and a pair of output refresh and input refresh processes are executed. In this case, a control cycle is equal to an execution cycle of the control program.

It is also known that in the PLC, the plurality of control programs are executed by using the time-sharing system.

Patent Document 2 (JP-A2007-140655 (KOKAI)) describes that in a device in which one CPU implements a motion control function configured to control a motor and a PLC function configured to perform sequence operations, for each cycle of a basic clock signal, "fixed-cycle motion control processing and axis-specific processing" and "high-speed sequence processing" are executed and, in the remaining lapse of time of each cycle of the basic clock signal, "low-speed sequence processing" or "unfixed-cycle motion control processing" is executed. It is also described that if the low-speed sequence processing does not end in the basic clock signal cycle, the remaining processing will be executed after a halt period of a predetermined number of the basic clock signal cycles (see, for example, paragraph 0004).

Patent Document 3 (JP-A 2000-293210 (KOKAI)) describes about the operations of a control device that aside from a period task (the control program), a plurality of refresh blocks are prepared for each of input processing and output processing to be executed such that several refresh blocks and several periodic tasks may be performed selectively in each control cycle.

PRIOR ART LITERATURE

Patent Documents

Patent Document 1: JP-A 2000-105604 (KOKAI))
Patent Document 2: JP-A 2007-140655 (KOKAI))
Patent Document 3: JP-A 2000-293210 (KOKAI))

SUMMARY OF THE INVENTION

Problems to be Solved by the Invention

In the recent years, in the field of information technologies, the processing of a microprocessor and a communication network has been speeding up more and more. Consequently, those technologies can now be utilized also in a PLC to execute a plurality of control programs by time sharing and employ high-speed PLC system bus and/or field network. Therefore, the device processing speed has fewer limitations caused by a need to enhance the degree of freedom in scheduling of control actions including the input of input data, the output of output data, and the execution of the control programs and PLC system programs. The degree of freedom in scheduling of the control actions, referred to here, includes whether the inputting or the outputting at which timing can be related to the execution of which one of the control programs. Further, the degree of freedom in scheduling of the control actions by PLC products should preferably be higher because optimal scheduling of the control actions varies with specific control purposes.

However, currently, scheduling of the control actions by an actual PLC product is determined by the system program of the PLC product, so that although it is possible to select any one of several schedule patterns and adjust parameters for the execution, it is still impossible for the user to arbitrarily build a schedule of the control actions.

The selection from among several schedule patterns, as referred to here, roughly means providing the option for, for example, whether to perform "outputting, inputting, control program execution, and other system processing" in this order or "inputting, control program execution, outputting, and other system processing" in this order in a control program execution cycle. Further, the adjustment of execution parameters roughly means adjusting execution priorities to be assigned to a plurality of control programs when executing the control programs by time sharing.

To change the pattern of a control action schedule greatly or include processing to be executed by a newly added program schedule (for example, temperature control program module or image processing program module) into the control action schedule, it is necessary to replace at least some of the system programs of a PLC product. In such a case, the PLC product becomes of a different model, so that management burdens increase on the side of the PLC product manufacturer and the user. Further, if the optimal schedule pattern for a user control purpose is special, the user will actually find it difficult to get a PLC product in which such a schedule pattern is installed.

Further, once PLC products are provided to the user, even in a case where it is made impossible to change a control action schedule pattern, a configuration configured to realize various schedule patterns as using a common system program may be used as a platform commonly included in a plurality of models of the PLC products in order to improve development efficiency and reduce production costs of the PLC products in the manufacturer.

It is an object of the invention to realize a high degree of freedom in scheduling of PLC control actions without replacing system programs or by using common system programs.

Means for Solving the Problem

According to one aspect of the invention, a PLC's CPU unit is provided which is configured to control a control target. The PLC's CPU unit includes a microprocessor, a storage section, and a communication circuit. The storage section is used to store a system program, a control program, and schedule-building data. The microprocessor executes the system program and the control program stored in the storage section. The communication circuit transmits output data generated through execution of the control program and receives input data to be used in execution of the control program. The system program includes a procedure library in which at least a procedure for controlling execution of the control program and a procedure for controlling output of output data and input of input data are included. If schedule-building data including execution order specifications for the procedures included in the procedure library is stored in the storage section, the system program causes the microprocessor to execute the procedures included in the procedure library in accordance with the procedure execution order specifications included in schedule-building data.

Preferably, the schedule-building data includes specifications which are used to generate threads by using the procedures included in the procedure library. The system program includes processing for generating the threads in accordance with specifications for generating the threads included in the schedule-building data, as preparatory processing for performance of control actions by the PLC.

More preferably, the schedule-building data includes, as data about the thread, specifications necessary to activate any other threads when the thread is being executed.

Alternatively preferably, the schedule-building data includes specifications necessary to set a task which includes one or a plurality of the threads and provides a unit for repetitive execution and the system program includes processing configured to set the task in accordance with specifications necessary to set the task included in the schedule-building data, as preparatory processing for performance of control actions by the PLC.

Preferably, the PLC's CPU unit further includes a schedule-building data acquisition section configured to acquire the schedule-building data.

Preferably, the schedule-building data including the procedure execution order specifications necessary to repeat transmission of the output data, reception of the input data, and execution of the control program configured to generate the output data by using the input data is stored in the storage section.

More preferably, the PLC's CPU unit further includes a section configured to set a period of a control cycle, the communication circuit transmits the output data and receives the input data for each control cycle, and the schedule-building data includes specifications of the procedure execution order necessary to cause the microprocessor to start execution of the control program after transmission of the output data and reception of the input data by the communication circuit in the control cycle next to that in which execution of the control program is finished and execute an unexecuted portion of the control program in the control cycle next to that in which execution of the control program is not finished.

Alternatively preferably, the system program includes, as preparatory processing for performance of control actions by the PLC, processing configured to generate in the storage section a reception buffer in which the received input data is stored and processing configured to generate in the storage section an input synchronization buffer to be used as a reference destination when the control program references the input data for each of the input data pieces and the schedule-building data includes specifications of the procedure execution order necessary to cause the microprocessor to execute input copy processing configured to copy the received input data from the reception buffer to the input synchronization buffer compatible with this input data and control program initiation processing configured to start execution of the control program.

More preferably, the input data is received for each of the control cycles and the schedule-building data includes specifications of the procedure execution order necessary to cause the microprocessor to start the control program initiation processing for each execution cycle which includes an integral multiple of the control cycle and execute the input copy processing on the input data received in the control cycle in which the execution cycle of the control program is started.

Alternatively preferably, the system program further includes, as the preparatory processing for performance of the control actions by the PLC, processing configured to generate in the storage section a transmission buffer configured to store output data to be transmitted and processing configured to generate in the storage section an output synchronization buffer in which the output data to be copied to the transmission buffer is stored for each of the output data pieces and the schedule-building data further includes specifications of the procedure execution order necessary to cause the microprocessor to execute output copy processing configured to copy the output data from the output synchronization buffer to the transmission buffer.

Further preferably, the schedule-building data includes specifications of the procedure execution order necessary to cause the microprocessor to execute the control program initiation processing in each execution cycle which includes an integral multiple of the control cycle and execute the output copy processing at timing when the output data generated through execution of the control program in the previous execution cycle is transmitted from the transmission buffer in the first control cycle of the execution cycle of the control program.

Alternatively preferably, the storage section is further used to store attribute data about a variable to be used by the control program, the attribute data can include specifications of one owner side control program that can rewrite a variable if the variable is a global variable referenced by a plurality of the control programs and specifications of one or a plurality of referrer side control programs that can reference only this variable, the system program includes, as the preparatory processing for performance of the control actions by the PLC, processing configured to generate in the storage section a global variable region in which the global variables are stored and processing configured to generate in the storage section a variable synchronization buffer to be used as a reference destination in place of the global variable region by each of the referrer side control programs when the referrer side control program references the global variables for each of the global variables referenced by the referrer side control program, and the schedule-building data includes specifications of the procedure execution order necessary to cause the microprocessor to execute owner side initiation processing configured to start execution of an owner side control program, variable copy processing configured to copy the global variable to be rewritten by the owner side control program from the global variable region to the variable synchronization buffer compatible with this global variable if execution of the owner side control program ends, and referrer side initiation processing configured to start execution of the referrer side control program.

Alternatively preferably, the control program includes a motion computing program configured to calculate a motion command value used to control motion of a motor and a user program which is created in compliance with a user's control purpose and includes processing configured to supply the motion computing program with directives necessary for its execution and the schedule-building data includes specifications of the procedure execution order necessary to cause the PLC's CPU unit to repeatedly perform transmission of the output data as well as reception of the input data by use of the communication circuit, execution of the user program, and execution of the motion computing program in this order.

Alternatively preferably, the communication circuit transmits the output data and receives the input data in a period of the control cycle, the control program includes a first control program and a second control program, the first control program includes a first motion computing program configured to generate first motion command value data necessary to control motion of a motor, the second control program includes a second motion computing program configured to generate second motion command value data necessary to control motion of the motor, at least one of the first control program and the second control program includes a user program which is created in compliance with a user's control purpose and supplies the first motion computing program and the second motion computing program with directives necessary for their execution, and the schedule-building data includes specifications of the procedure execution order necessary to cause the microprocessor to start execution of the first control program for each first execution cycle having the same period as that of the control cycle and execution of the second control program for each second execution cycle having twice or a larger integral multiple of the period of the control cycle and start execution of the second control program after execution of the first control program ends in the control cycle in which the second execution cycle starts and, if the second control program fails to end before this control cycle ends, start execution of an unexecuted portion of the second control program in the next control cycle after execution of the first control program ends.

Alternatively preferably, the microprocessor includes at least a first core and a second core, the control program includes a first control program and a second control program, and the schedule-building data includes specifications of the procedure execution order necessary to cause the first core to execute the first control program after transmission of the output data and reception of the input data end and the second core to execute the second control program concurrently with execution of the first control program.

According to another aspect of the invention, in a PLC's CPU unit including a microprocessor, a storage section, and a communication circuit and configured to control a control target, a PLC-use system program is provided which is to be stored in the storage section and executed by the microprocessor. The storage section is used to store a system program, a control program, and schedule-building data. The microprocessor is configured to execute the system program and the control program stored in the storage section. The communication circuit is configured to transmit output data generated through execution of the control program and receive input data to be used in execution of the control program. The system program includes a procedure library which includes at least a procedure configured to control execution of the control program and a procedure configured to control output of output data and input of input data. The system program, if the schedule-building data including specifications of order in which the procedures included in the procedure library are executed is stored in the storage section, causes the microprocessor to execute the procedures included in the procedure library in accordance with the procedure execution order specifications included in the schedule-building data.

Preferably, the schedule-building data includes specifications necessary to generate threads by using the procedures included in the procedure library and the system program includes processing configured to generate the threads in accordance with these thread generating specifications included in the schedule-building data as preparatory processing for performance of control actions by the PLC.

More preferably, the schedule-building data includes, as data about a thread, specifications necessary to activate any other threads when the thread is being executed.

According to a further aspect of the invention, in a PLC's CPU unit including a microprocessor, a storage section, and a communication circuit and configured to control a control target, a recording medium is provided which stores a PLC-use system program to be stored in the storage section and executed by the microprocessor. The storage section is used to store system programs, control programs, and schedule-building data. The microprocessor is configured to execute the system programs and the control programs stored in the storage section. The communication circuit is configured to transmit output data generated through execution of the control programs and receive input data to be used in execution of the control programs. The system programs include a procedure library which includes at least a procedure configured to control execution of the control programs and a procedure configured to control output of output data and input of input data. The system program, if the schedule-building data including specifications of order in which the procedures included in the procedure library are executed is stored in the storage section, causes the microprocessor to execute the procedures included in the procedure library in accordance with the procedure execution order specifications included in the schedule-building data.

Preferably, the schedule-building data includes specifications necessary to generate threads by using the procedures included in the procedure library and the system program includes processing configured to generate the threads in accordance with these thread generating specifications included in the schedule-building data as preparatory processing for performance of control actions by the PLC.

More preferably, the schedule-building data includes, as data about a thread, specifications necessary to activate any other threads when the thread is being executed.

According to a still further aspect of the invention, a PLC system is provided which includes the PLC's CPU unit and a PLC support device configured to support use of the PLC. The PLC support device includes a storage unit and a computing unit. The storage unit is used to store a PLC support program and schedule-building data. The PLC support program causes the computing unit to execute output processing configured to output the schedule-building data so that it can be acquired by the PLC's CPU unit.

According to an additional aspect of the invention, a PLC support device is provided which is configured to support use of a PLC's CPU unit configured to control a control target. The PLC's CPU unit includes a procedure library including at least a procedure configured to control execution of control programs and a procedure configured to control output of output data generated through execution of the control programs and input of input data used in execution of the control programs and a schedule-building data acquisition section configured to acquire schedule-building data including specifications of order in which the procedures included in the procedure library are executed. The PLC support device includes a storage unit and a computing unit. The storage unit is used to store a PLC support program and the schedule-building data. The PLC support program causes the computing unit to execute output processing configured to output the schedule-building data so that it can be acquired by the PLC's CPU unit.

According to another additional aspect of the invention, a PLC support program is provided which is configured to be executed in a PLC support device configured to support use of a PLC's CPU unit configured to control a control target. The PLC's CPU unit includes a procedure library including at least a procedure configured to control execution of control programs and a procedure configured to control output of output data generated through execution of the control programs and input of input data used in execution of the control programs and a schedule-building data acquisition section configured to acquire schedule-building data including specifications of order in which the procedures included in the procedure library are executed. The PLC support device includes a storage unit and a computing unit. The storage unit is used to store the PLC support program and the schedule-building data. The PLC support program causes the computing unit to execute output processing configured to output the schedule-building data so that it can be acquired by the PLC's CPU unit.

According to still additional aspect of the invention, a recording medium is provided which stores a PLC support program configured to be executed in a PLC support device configured to support use of a PLC's CPU unit configured to control a control target. The PLC's CPU unit includes a procedure library including at least a procedure configured to control execution of control programs and a procedure configured to control output of output data generated through execution of the control programs and input of input data used in execution of the control programs and a schedule-building data acquisition section configured to acquire schedule-building data including specifications of order in which the procedures included in the procedure library are executed. The PLC support device includes a storage unit and a computing unit. The storage unit is used to store the PLC support program and the schedule-building data. The PLC support program causes the computing unit to execute output processing configured to output the schedule-building data so that it can be acquired by the PLC's CPU unit.

Effect of the Invention

According to the invention, it is possible to realize a high degree of freedom in scheduling of PLC control actions without replacing system programs or by using common system programs.

BRIEF DESCRIPTION OF THE DRAWINGS

FIG. 8 is a table-format view showing set task items prepared in the first embodiment of the invention and explanations of the set task items.

FIG. 9A is a table-format view showing set thread items prepared in the first embodiment of the invention and explanations of the set thread items.

FIG. 9B is another table-format view showing set thread items prepared in the first embodiment of the invention and explanations of the set thread items.

FIG. 10 is a table showing functions, set items, and explanations of the set items about a control cycle initiation procedure, which is one of procedures prepared in the first embodiment of the invention.

FIG. 11A is a table showing names and functions of the procedures other than the control cycle initiation procedure prepared in the first embodiment of the invention.

FIG. 11B is another table showing the names and the functions of the procedures other than the control cycle initiation procedure prepared in the first embodiment of the invention.

FIG. 12 is a table showing schedule-building data 234 corresponding to schedule example 1 in the first embodiment of the invention.

FIG. 20 is a table showing schedule-building data 234 corresponding to schedule example 2 in the first embodiment of the invention.

FIG. 22 is a table showing schedule-building data corresponding to schedule example 3 in the first embodiment of the invention.

FIG. 25 is a table showing schedule-building data corresponding to schedule example 4 in the first embodiment of the invention.

FIG. 27 is a sequence diagram of the (k+1)-th cycle in schedule example 4 in the first embodiment of the invention.

FIG. 28 is a table showing schedule-building data corresponding to schedule example 5 in the first embodiment of the invention.

FIG. 32 is a table showing schedule-building data corresponding to schedule example 7 in the first embodiment of the invention.

FIG. 35 is a table showing schedule-building data corresponding to schedule example 8 in the first embodiment of the invention.

FIG. 37 is a table showing schedule-building data corresponding to schedule example 9 in the first embodiment of the invention.

FIG. 39A is a table-format view showing set thread items prepared in a second embodiment of the invention and explanations of the set thread items.

FIG. 39B is another table-format view showing the set thread items prepared in the second embodiment of the invention and explanations of the set thread items.

FIG. 40A is a table showing names and functions of procedures prepared in the second embodiment of the invention.

FIG. 40B is another table showing the names and the functions of the procedures prepared in the second embodiment of the invention.

FIG. 41 is a table showing schedule-building data corresponding to a schedule example in the second embodiment of the invention.

FIG. 45 is a table showing functions, set items, and explanations of the set items about a control cycle initiation procedure, which is one of procedures prepared in the third embodiment of the invention.

FIG. 46A is a table showing names and functions of the procedures other than the control cycle initiation procedure prepared in the third embodiment of the invention.

FIG. 46B is another table showing the names and the functions of the procedures other than the control cycle initiation procedure prepared in the third embodiment of the invention.

FIG. 47 is a table showing schedule-building data corresponding to a schedule example in the third embodiment of the invention.

MODE FOR CARRYING OUT THE INVENTION

Figure 1:
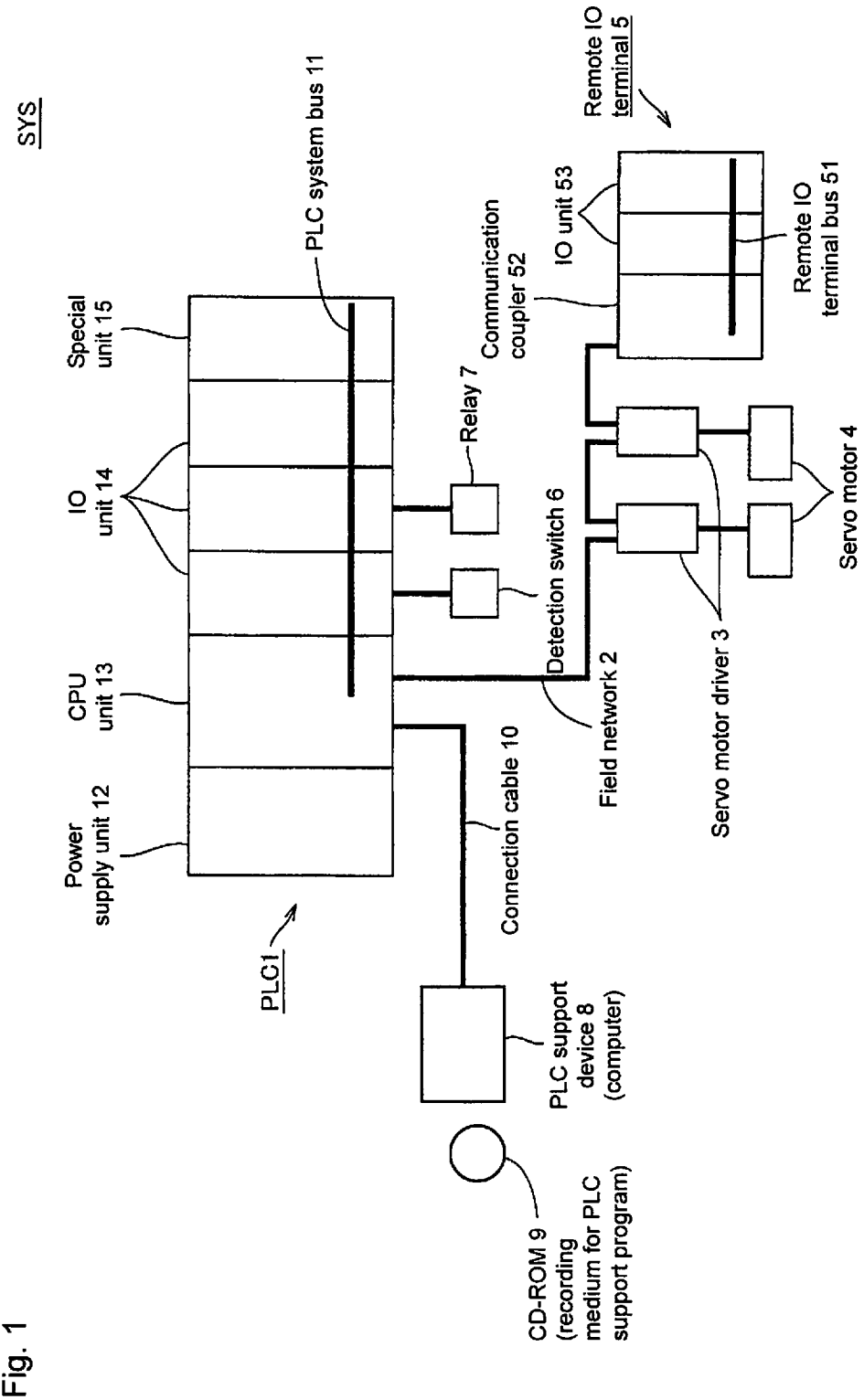
FIG. 1 is a schematic diagram showing an outlined configuration of a PLC system according to an embodiment of the invention.

A description will be given in detail of embodiments of the invention with reference to the drawings. Identical reference numerals are given to identical or corresponding components in the figures, and repetitive description on the identical or corresponding components will be omitted.

A. System Configuration

A PLC according to the present embodiment is configured to control targets such as machines and facilities. The PLC according to the present embodiment includes a CPU unit as its component. The CPU unit includes a microprocessor, a storage section, and a communication circuit. The storage section is used to store system programs configured to control execution of programs, control programs, and schedule-building data. The schedule-building data includes set values configured to schedule control actions by the PLC according to the present embodiment at a high degree of freedom. The schedule-building data will be described in detail later.

The microprocessor is configured to execute the system programs and control programs stored in the storage section. The communication circuit is configured to transmit output data generated through execution of the control programs and receive input data to be used in execution of the control programs. First, a description will be given to a system configuration of a PLC 1 according to the present embodiment with reference to FIG. 1.

FIG. 1 is a schematic diagram showing the outlined configuration of a PLC system according to an embodiment of the invention. As shown in FIG. 1, a PLC system SYS includes the PLC 1, a servo motor driver 3 and a remote 10 terminal 5 which are connected to the PLC 1 via a field network 2, and detection switch 6 and a relay 7, which are field equipment. Further, to the PLC 1, a PLC support device 8 is connected via a connection cable 10 etc.

The PLC 1 includes a CPU unit 13 configured to execute main computing processing, at least one IO unit 14, and a special unit 15. Those units are configured to give data to and get it from each other via a PLC system bus 11. Further, those units are supplied with an appropriate voltage of power from a power supply unit 12. Since the units of the PLC 1 are provided from a PLC manufacturer, the PLC system bus 11 is typically developed individually by each PLC manufacturer and used. In contrast, as described later, in many cases, the field network 2 has its standards etc. made public such that it can be used to interconnect products made by different manufacturers.

Figure 2:
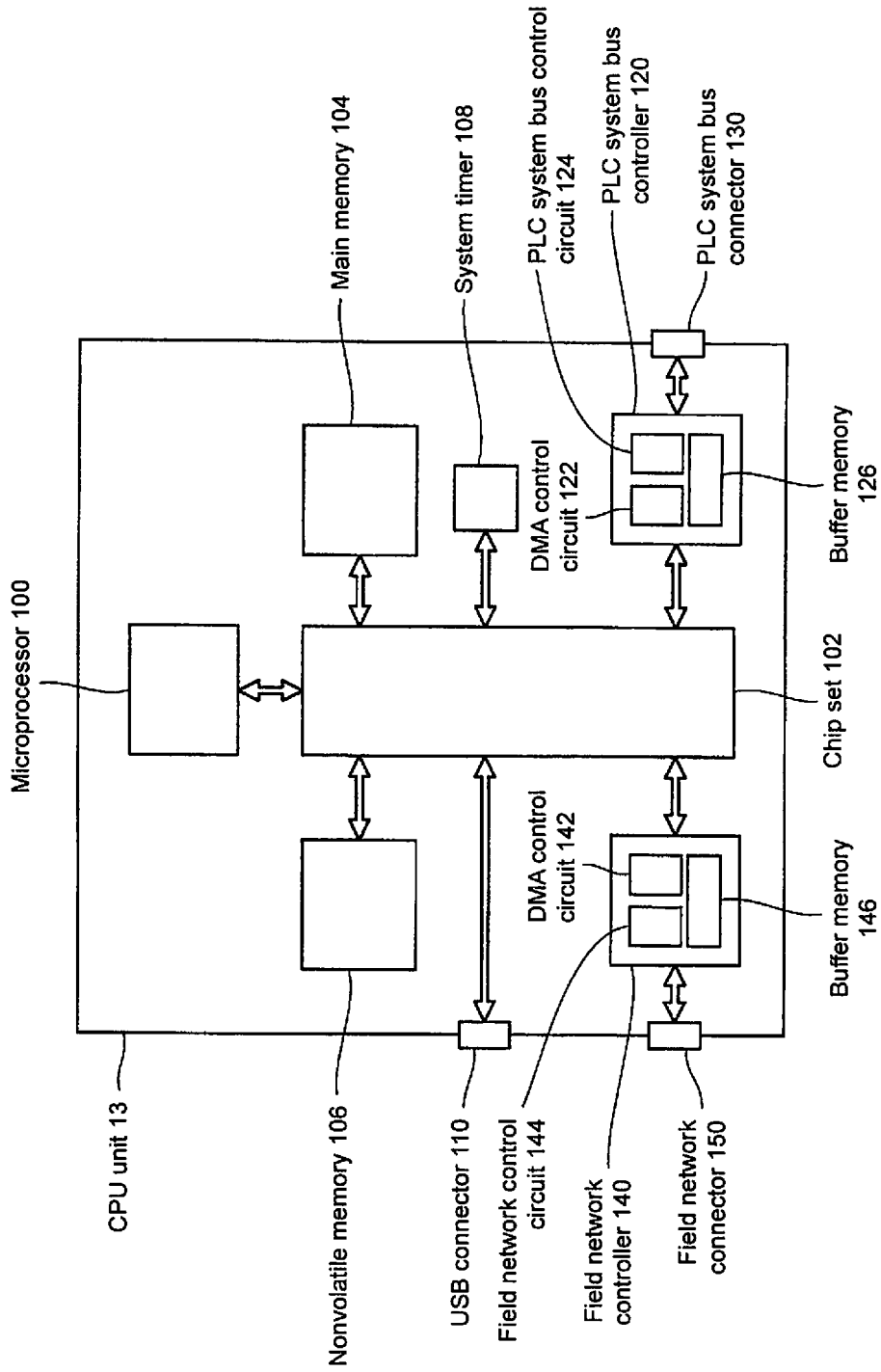
FIG. 2 is a schematic diagram showing a hardware configuration of a CPU unit according to the embodiment of the invention.

The CPU unit 13 will be described in detail with reference to FIG. 2 later.

The IO unit 14 relates to general input/output processing and manages input/output of binarized data such as on/off action data. That is, the IO unit 14 collects information such as a state (on-state) where a sensor such as the detection switch 6 has detected a target or a state (off-state) where the sensor has detected no target. Further, the IO unit 14 supplies an output destination such as the relay 7 or an actuator with an activating command (turn-on command) or a deactivating command (turn-off command).

The special unit 15 has functions not supported by the IO unit 14, namely analog data input/output, temperature control, and communication by use of a certain communication method.

The field network 2 is configured to transfer various kinds of data exchanged with the CPU unit 13. As the field network 2, typically, various kinds of industrial Ethernet (registered trademark) products can be used. Any one of the known Ethernet (registered trademark) products can be employed such as EthernetCAT (registered trademark), Profinet IRT, MECHATROLINK (registered trademark)-III, Powerlink, SERCOS (registered trademark)-III, or CIP Motion, for example. Besides, a field network other than the industrial Ethernet (registered trademark) may be used. For example, a DeviceNet or CompoNet/IP (registered trademark) may be used if no motion control is conducted.

Although the PLC system SYS having both of the PLC system bus 11 and the field network 2 is illustrated in FIG. 1, a system configuration having only one of them can be employed. For example, all the units can be connected via the field network 2. Alternatively, without using the field network 2, the servo motor driver 3 may be directly connected to the PLC system bus 11. Further, a communication unit of the field network 2 may be connected to the PLC system bus 11 to perform communication by way of this communication unit between the CPU unit 13 and the equipment units connected to the field network 2.

Another configuration may be employed in which the CPU unit 13 is provided with the functions of the IO unit 14 and the servo motor driver 3 such that the CPU unit 13 would directly control a control target not by way of the IO unit 14 or the servo motor driver 3.

The servo motor driver 3 is connected to the CPU unit 13 over the field network 2 and configured to drive a servo motor 4 in accordance with command values from the CPU unit 13. More specifically, the servo motor driver 3 is supplied at a constant frequency from the PLC 1 with command values such as a position command value, a speed command value, and a torque command value. Further, the servo motor driver 3 acquires from detectors such as a position sensor (rotary encoder) and a torque sensor connected to the shaft of the servo motor 4 actual measurement values on operations of the servo motor 4 such as a position, a speed (which is typically calculated from a difference between the current position and the previous position), and torque. Then, the servo motor driver 3 conducts feedback control by setting the command value from the CPU unit 13 as a target value and using the actual measurement values as feedback values. That is, the servo motor driver 3 adjusts a current driving the servo motor 4 such that the actual measurement value may near the target value. The servo motor driver 3 is referred to also as a servo motor amplifier.

Although a system example combining the servo motor 4 and the servo motor driver 3 is illustrated in FIG. 1, any other configuration may be employed in which, for example, the system combines a pulse motor and a pulse motor driver.

To the field network 2 of the PLC system SYS shown in FIG. 1, further, the remote IO terminal 5 is connected. The remote IO terminal 5 basically executes processing related to general input/output processing similar to the IO unit 14. More specifically, the remote IO terminal 5 includes a communication coupler 52 configured to execute processing related to data transfer over the field network 2 and at least one IO unit 53. Those units are configured to be able to exchange data with each other via a remote IO terminal bus 51.

The PLC support device 8 will be detailed later.

B. Hardware Configuration of CPU Unit

Next, a description will be given of a hardware configuration of the CPU unit 13 with reference to FIG. 2. FIG. 2 is a schematic diagram showing the hardware configuration of the CPU unit 13 according to the embodiment of the invention. As shown in FIG. 2, the CPU unit 13 includes a microprocessor 100, a chip set 102, and main memory 104, a nonvolatile memory 106, a system timer 108, a PLC system bus controller 120, a field network controller 140, and a USB connector 110. The chip set 102 is connected to the other components via the respective buses.

The microprocessor 100 and the chip set 102 are typically configured in compliance with a general-purpose computer architecture. That is, the microprocessor 100 is configured to interpret instruction codes sequentially supplied from the chip set 102 based on an internal clock signal and executes the instruction codes. The chip set 102 is configured to exchange internal data with the various connected components and generate instruction codes necessary for the microprocessor 100. Further, the chip set 102 has a function to cache data obtained as a result of execution of computing processing in the microprocessor 100.

The microprocessor 100 is assumed to be of the single-core configuration unless clearly specified to be of the multi-core configuration in the following first through third embodiments. The multi-core configuration refers to that in which at least two cores are combined (including the case of two cores//).

The CPU unit 13 has the main memory 104 and the nonvolatile memory 106 as storage sections.

The main memory 104 is composed of a volatile storage region (RAM) to hold various programs to be executed by the microprocessor 100 after power is applied to the CPU unit 13. Further, the main memory 104 is used also as a working memory when the microprocessor 100 is executing any one of the various programs. As such a main memory 104, a device is used such as a dynamic random access memory (DRAM) or a static random access memory (SRAM).

The nonvolatile memory 106 holds in the nonvolatile manner the real-time operating system (OS), the PLC 1's system program, the user program, the motion computing program, and data such as system set parameters. Those programs and data are copied to the main memory 104 such that they can be accessed by the microprocessor 100 as necessary. As such a nonvolatile memory 106, a semiconductor memory such as a flash memory can be used. Alternatively, a magnetic recording medium such as a hard disk drive or an optical recording medium such as a digital versatile disk random access memory (DVD-RAM) can be used.

The system timer 108 generates an interrupt signal and provides it to the microprocessor 100 at a constant frequency. Although the system timer 108 is typically configured to respectively generate interrupt signals at a plurality of frequencies depending on hardware specifications, the system timer 108 can be set to generate the interrupt signal at an arbitrary frequency by using the operating system (OS) or the basic input/output system (BIOS). By utilizing the interrupt signal generated by the system timer 108, control actions for each of control cycles to be described later are realized.

The CPU unit 13 has the PLC system bus controller 120 and the field network controller 140 as communication circuits. Those communication circuits are configured to transmit output data and receive input data.

In a case where the CPU unit 13 itself is configured to carry the functions of the IO unit 14 and the servo motor driver 3, transmission of output data and reception of input data by the communication circuits will be performed with portions carrying the respective functions as communication partners inside the CPU unit 13.

The PLC system bus controller 120 is configured to control exchange of data via the PLC system bus 11. More specifically, the PLC system bus controller 120 includes a dynamic memory access (DMA) control circuit 122, a PLC system bus control circuit 124, and a buffer memory 126. The PLC system bus controller 120 is internally connected with the PLC system bus 11 via a PLC system bus connector 130.

The buffer memory 126 functions as a transmission buffer for data (hereinafter referred to also as "output data") output to any other units via the PLC system bus 11 and a reception buffer for data (hereinafter referred to also as "input data") input from any other units via the PLC system bus 11. The output data created through computing processing by the microprocessor 100 is stored in the main memory 104 at the beginning. Then, the output data to be transferred to a specific one of the units is read from the main memory 104 and temporarily held in the buffer memory 126. The input data transferred from any other unit is temporarily held in the buffer memory 126 and then shifted to the main memory 104.

The DMA control circuit 122 is configured to transfer output data from the main memory 104 to the buffer memory 126 and input data from the buffer memory 126 to the main memory 104.

The PLC system bus control circuit 124 is configured to execute processing of transmitting output data from the buffer memory 126 to the other units connected to the PLC system bus 11 and processing of receiving input data from these units and storing the input data to the buffer memory 126. Typically, the PLC system bus control circuit 124 provides functions of a physical layer and a data link layer in the PLC system bus 11.

The field network controller 140 is configured to control exchange of data over the field network 2. That is, the field network controller 140 controls transmission of output data and reception of input data in accordance with the standard of the field network 2 used. For example, if the field network 2 in accordance with the EtherCAT (registered trademark) standard is employed, the field network controller 140 including hardware necessary for ordinary Ethernet (registered trademark) communication is used. According to the EtherCAT (registered trademark) standard, a typical Erhernet (registered trademark) controller can be utilized which is configured to realize a communication protocol in accordance with the ordinary Ethernet (registered trademark) standard. Some types of the industrial Ethernet (registered trademark) products employed as the field network 2 use a special-specification Ethernet (registered trademark) controller compatible with a dedicated-specification communication protocol different from the ordinary communication protocol. Further, if a field network other than the industrial Ethernet (registered trademark) one is employed, a dedicated field network controller compatible with the standard of this field network is used.

A buffer memory 146 functions as a transmission buffer for data (also hereinafter referred to "output data") output to any other devices via the field network 2 and a reception buffer for data (also hereinafter referred to as "input data") input from any other devices via the field network 2. As described above, the output data created through computing processing by the microprocessor 100 is stored in the main memory 104 at the beginning. Then, the output data to be transferred to a specific one of the devices is read from the main memory 104 and temporarily held in the buffer memory 146. The input data transferred from any other device is temporarily held in the buffer memory 146 and then shifted to the main memory 104.

A DMA control circuit 142 is configured to transfer output data from the main memory 104 to the buffer memory 146 and input data from the buffer memory 146 to the main memory 104.

A field network control circuit 144 is configured to execute processing of transmitting output data from the buffer memory 146 to the other devices connected to the field network 2 and processing of receiving input data from these devices and storing the input data to the buffer memory 146. Typically, the field network control circuit 144 provides functions of a physical layer and a data link layer in the field network 2.

The USB connector 110 is an interface configured to connect the PLC support device 8 and the CPU unit 13 to each other. Typically, programs transferred from the PLC support device 8 and executable by the microprocessor 100 of the CPU unit 13 are fetched into the PLC 1 via the USB connector 110.

C. Software Configuration of CPU Unit

Next, a description will be given of a software group necessary to provide various functions according to the present invention with reference to FIG. 3. Instruction codes included in the software pieces are read at appropriate timing and executed by the microprocessor 100 in the CPU unit 13.

Figure 3:
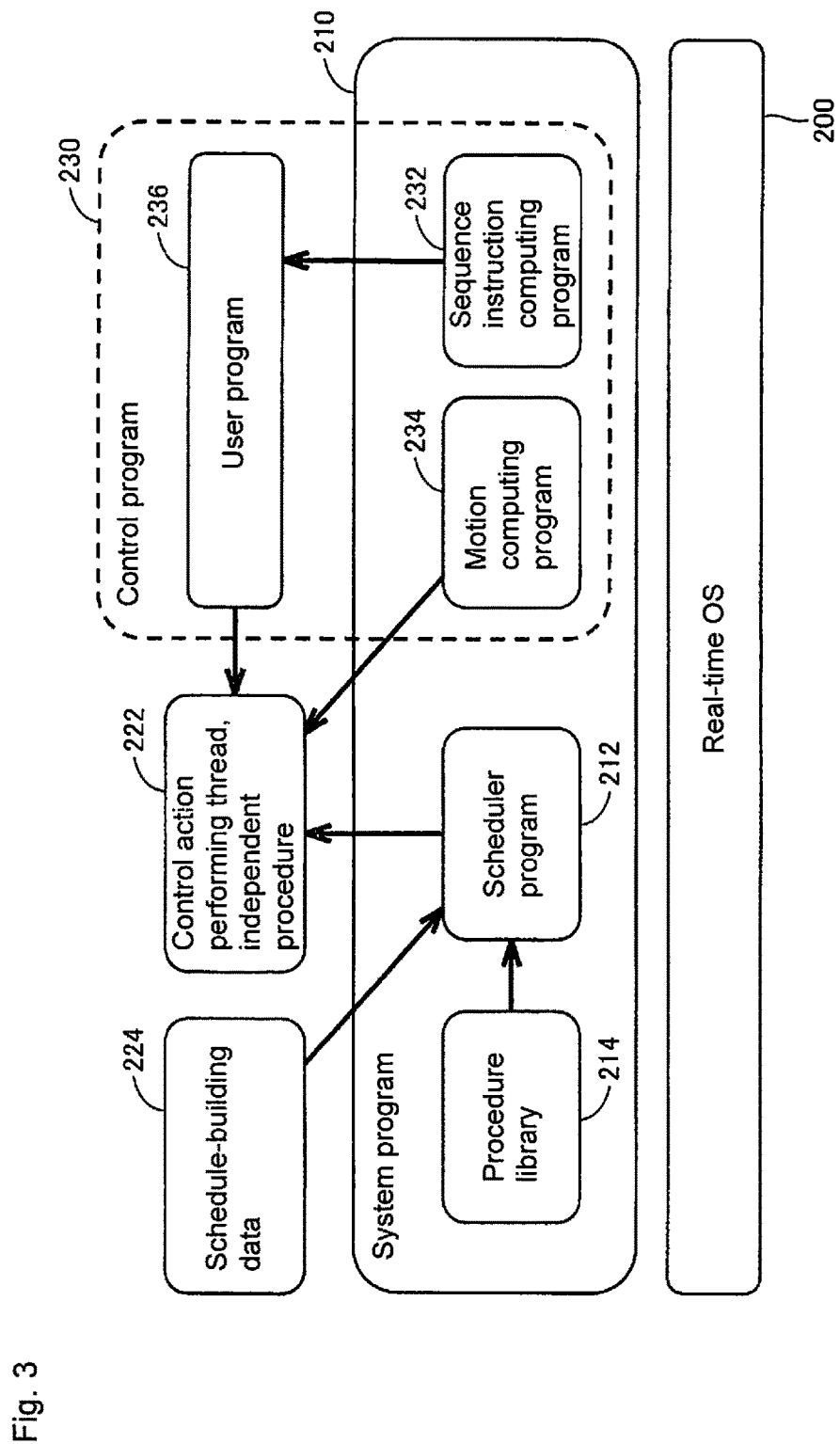
FIG. 3 is a schematic diagram showing a configuration of software which is executed in the CPU unit according to the embodiment of the invention.

FIG. 3 is a schematic diagram showing a configuration of software which is executed by the CPU unit 13 according to the embodiment of the invention. As shown in FIG. 3, the software executed by the CPU unit 13 has three layers, namely a real-time OS 200, a system program 210, and a user program 236. A control action performing thread and an independent procedure 222 are generated prior to initiation of control actions and executed at the time of the control action. To generate the control action performing thread and the independent procedure 222, schedule-building data 234 is used. The schedule-building data 234 will be detailed later.

The real-time OS 200 is designed in accordance with a computer architecture of the CPU unit 13, to provide a basic execution environment necessary for the microprocessor 100 to execute the system program 210 and the user program 236. The real-time OS 200 is typically provided from a PLC manufacturer or a dedicated software house.

The system program 210 is a software group necessary to provide functions as the PLC 1. Specifically, the system program 210 includes a procedure library 214, a scheduler program 212, a sequence instruction computing program 232, and a motion computing program 234.

The user program 236 is created in compliance with a user's control purpose. That is, the user program 236 is arbitrarily designed in accordance with a target line (process) etc. to be controlled using the PLC system SYS.

As described later, the user program 236 realizes control purposes on the side of the user by cooperating with the sequence instruction computing program 232 and the motion computing program 234. That is, the user program 236 realizes programmed operations by utilizing instructions, functions, and function modules provided by the sequence instruction computing program 232 and the motion computing program 234. Therefore, the user program 236, the sequence instruction computing program 232, and the motion computing program 234 may be generically referred to as a control program 230.

Thus, the microprocessor 100 in the CPU unit 13 executes the system program 210 and the user program 236 stored in the storage section.

The following will describe in more detail each of the programs.

As described above, the user program 236 is created in compliance with a user's control purpose, for example, a target line or process. The user program 236 is typically given in the format of an object program executable by the microprocessor 100 in the CPU unit 13. The user program is generated by compiling a source program described in a ladder language etc. in the PLC support device 8 etc. Then, the generated object program-format user program is transferred from the PLC support device 8 via the connection cable 10 to the CPU unit 13 and stored in the nonvolatile memory 106 etc.

The procedure library 214 includes various procedures that provide components of a control action performing thread or an independent procedure. A procedure refers to a series of instructions aggregated as one sequence in order to execute processing which occurs repeatedly in a program. As an implementation example, a procedure in condition where it is included in a library is an object class and a procedure in condition where it is a component of a control action performing thread or an independent procedure is an object instance.

The scheduler program 212 generates the control action performing thread and the independent procedure 222 in accordance with specifications included in schedule-building data 224.

The schedule-building data 224 is input from the PLC support device 8. The schedule-building data 224 may be stored in the nonvolatile memory 106 when the CPU unit 13 is manufactured. The schedule-building data 224 includes specifications of order in which the procedures included in the procedure library 214 are executed.

The control action performing thread of a group of the control action performing threads and the independent procedure 222 includes as components a procedure necessary to control execution of the control program and a procedure necessary to control output of output data and input of input data. The independent procedure of the group of the control action performing threads and the independent procedure 222 is executable without belonging to any thread.

The sequence instruction computing program 232 is called when a certain kind of sequence instruction used in a user program is being executed, to realize contents of the instruction.

The motion computing program 234 is executed in accordance with instructions by the user program to compute a command value to be output to the servo motor driver 3 or a motor driver such as a pulse motor driver each time it is executed.

The real-time OS 200 is configured to provide an environment necessary to execute a plurality of programs as switching them as time passes.

The procedure library 214, the scheduler program 212, the schedule-building data 224, and the control program 230 are stored in the main memory 104 and the nonvolatile memory 106, which are storage sections.

D. Main Memory Configuration

Next, a description will be given of storage regions allocated in the main memory 104 of the CPU unit 13 with reference to FIG. 3.

Figure 4:
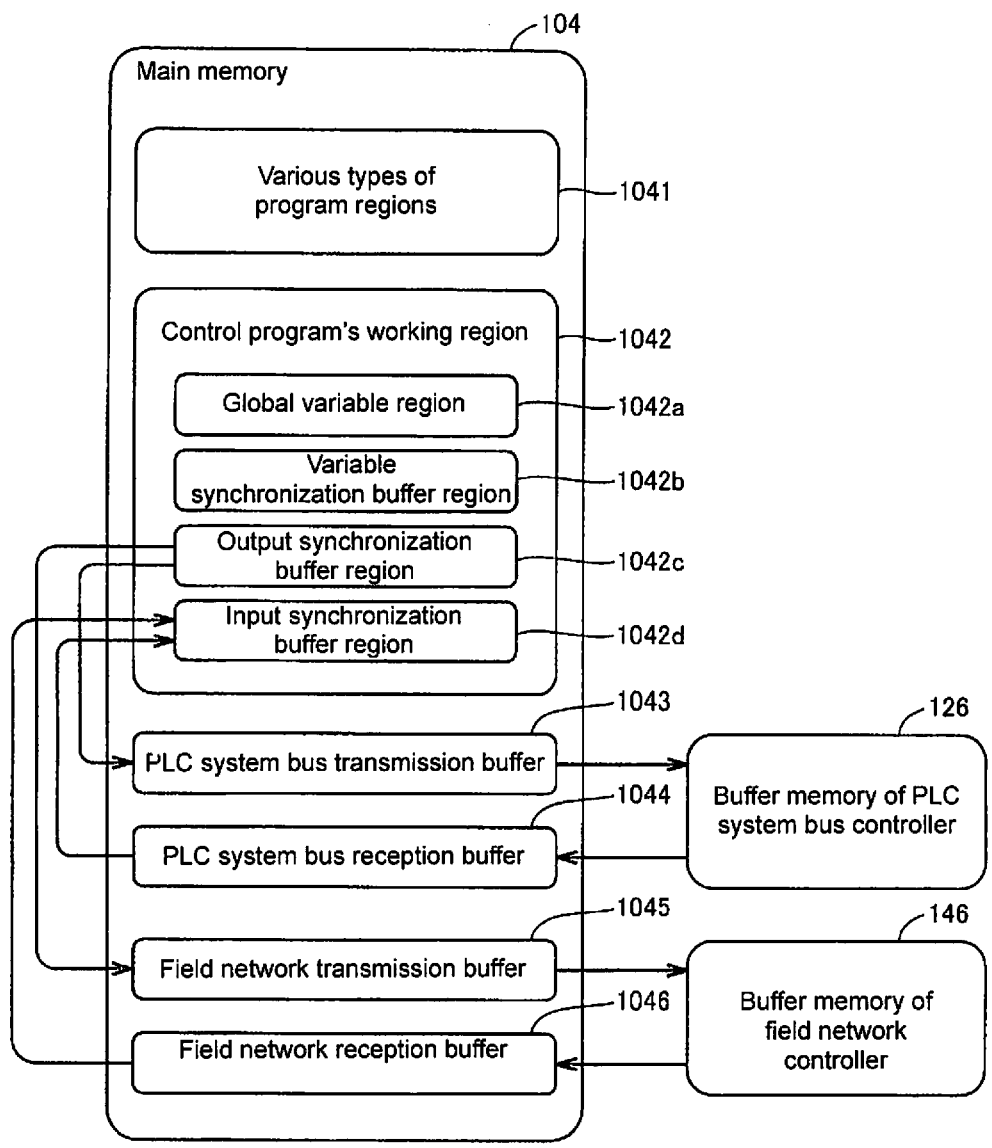
FIG. 4 is a schematic diagram showing a region configuration of a main memory of the CPU unit according to the embodiment of the invention.

FIG. 4 is a schematic diagram showing a region configuration of the main memory 104 in the CPU unit 13 according to the embodiment of the invention. As shown in FIG. 4, the main memory 104 has formed regions of a various-programs' region 1041, a control program's working region 1042, a PLC system bus transmission buffer 1043, a PLC system bus reception buffer 1044, a field network transmission buffer 1045, and a field network reception buffer 1046.

The control program's working region 1042 includes local variable regions for the various control programs, as well as a global variable region 1042a and a variable synchronization buffer region 1042b generated by the system program 210. The control program's working region 1042 further includes two regions generated by the system program 210, namely an output synchronization buffer region 1042c in which an output synchronization buffer for each output data piece is generated and an input synchronization buffer region 1042d in which an input synchronization buffer for each input data piece is generated.

Further, the PLC system bus transmission buffer 1043 and the field network transmission buffer 1045 (which will both be hereinafter generically referred to as "transmission buffer") as well as the PLC system bus reception buffer 1044 and the field network reception buffer 1046 (which will both be hereinafter generically referred to as "reception buffer") are also generated by the system program 210.

The DMA control circuit 122 in the PLC system bus controller 120 transfers output data stored in the PLC system bus transmission buffer 1043 to the buffer memory 126 of the PLC system bus controller 120 and input data stored in the buffer memory 126 to the PLC system bus reception buffer 1044. The transferred input data is stored in the PLC system bus reception buffer 1044.

The DMA control circuit 142 in the field network controller 140 transfers output data stored in the field network transmission buffer 1045 to the buffer memory 146 of the field network controller 140 and input data stored in the buffer memory 146 to the field network reception buffer 1046. The transferred input data is stored in the field network reception buffer 1046.

The control program's working region 1042, the PLC system bus transmission buffer 1043, the PLC system bus reception buffer 1044, the field network transmission buffer 1045, and the field network reception buffer 1046 are configured such that their accesses can be controlled independently of each other. Consequently, for example, a plurality of operations such as the following accesses (1) through (3) can be executed concurrently.

(1) access gained by the microprocessor 100 to the control program's working region 1042 accompanying execution of a user program;

(2) access gained by the DMA control circuit 122 in the PLC system bus controller 120 to the PLC system bus transmission buffer 1043 and/or the PLC system bus reception buffer 1044 in the main memory 104 for the purpose of data transfer between the buffer memory 126 in the PLC system bus controller 120 and the PLC system bus transmission buffer 1043 and/or the PLC system bus reception buffer 1044 in the main memory 104; and (3) access gained by the DMA control circuit 142 in the field network controller 140 to the field network transmission buffer 1045 and/or the field network reception buffer 1046 in the main memory 104 for the purpose of data transfer between the buffer memory 146 in the field network controller 140 and the field network transmission buffer 1045 and/or the field network reception buffer 1046 in the main memory 104.

E. Support Device

Next, a description will be given of the PLC support device 8 according to the present embodiment. The PLC support device 8 is used to support use of the CPU unit 13 of the PLC 1, specifically by providing functions of creation of programs to be executed in the PLC 1 and maintenance of the PLC 1.

Figure 5:
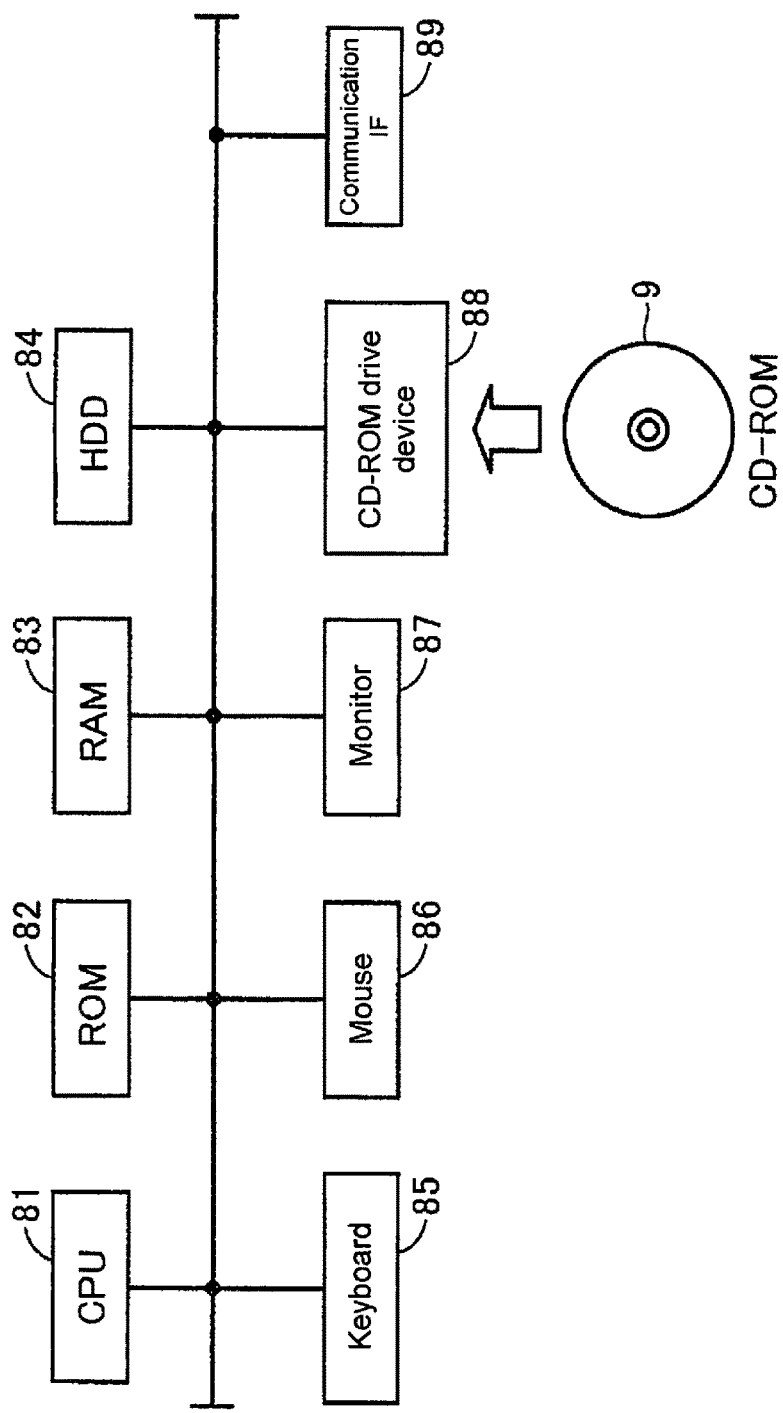
FIG. 5 is a schematic diagram showing a hardware configuration of a PLC support device which is used in condition where it is connected to the CPU unit according to the embodiment of the invention.

FIG. 5 is a schematic diagram showing a hardware configuration of the PLC support device 8 which is used in condition where it is connected to the CPU unit according to the embodiment of the invention. As shown in FIG. 5, the PLC support device 8 is typically composed of a general-purpose computer. From the viewpoint of maintenance performance, a laptop personal computer excellent in portability is preferable.

As shown in FIG. 5, the PLC support device 8 includes a CPU 81 configured to execute the OS and other various kinds of programs, a read only memory (ROM) 82 configured to store a BIOS and various kinds of data, a memory RAM 83 configured to provide a working region for storing data necessary for the CPU 81 to execute the programs, and a hard disk (HDD) 84 configured to store the programs executed by the CPU 81 in the nonvolatile manner.

The PLC support device 8 further includes a keyboard 85 and a mouse 86 which receive user operations and a monitor 87 configured to present information to the user. Further, the PLC support device 8 includes a communication interface (IF) 89 configured to establish communication with the PLC 1 (CPU unit 13) etc.

As described later, the various programs executed by the PLC support device 8 are stored in a compact disk-read only memory (CD-ROM) 9 from which they are distributed. The programs stored in the CD-ROM 9 are read by a CD-ROM drive 88 and stored in the hard disk (HDD) 84. Alternatively, the programs may be downloaded from a higher-order host computer via the network.

As described above, the PLC support device 8 is realized using a general-purpose computer, so that no more detailed description will be given thereto.

Figure 6:
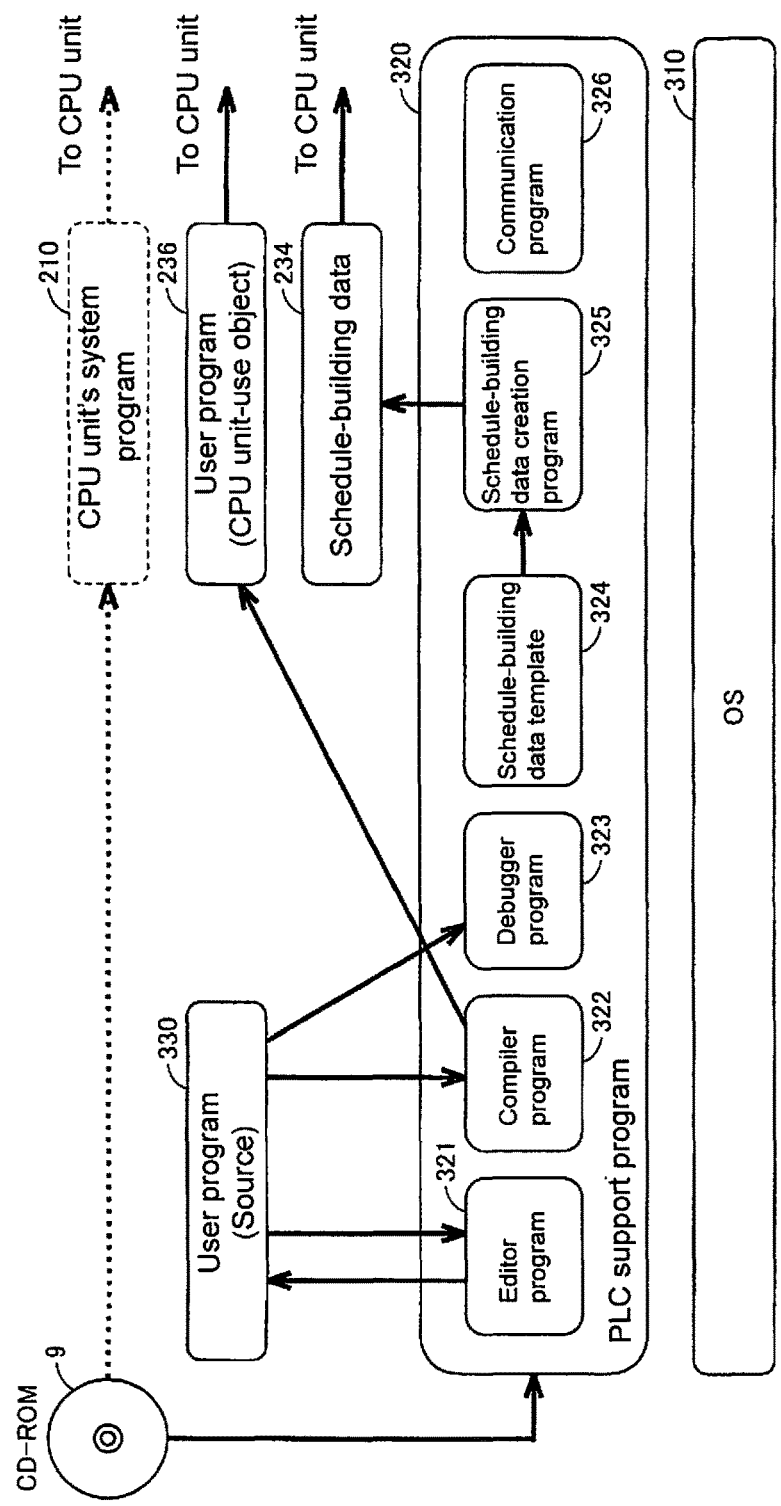
FIG. 6 is a schematic diagram showing a software configuration of the PLC support device which is used in condition where it is connected to the CPU unit according to the embodiment of the invention.

FIG. 6 is a schematic diagram showing a software configuration of the PLC support device 8 which is used in condition where it is connected to the CPU unit according to the embodiment of the invention. As shown in FIG. 6, the PLC support device 8 is provided with an environment in which an OS 310 is executed and various programs included in a PLC support program 320 can be executed.

The PLC support program 320 includes an editor program 321, a compiler program 322, a debugger program 323, a schedule-building data template 324, a schedule-building data creation program 325, and a communication program 326. The various programs included in the PLC support program 320 are typically distributed in condition where they are stored in the CD-ROM 9 and installed in the PLC support device 8.

The editor program 321 provides input and edit functions necessary to create user programs. More specifically, the editor program 321 provides the function to permit the user to create a source program 330 of the user program by operating the keyboard 85 and the mouse 86 and, additionally, the function to save and edit the created source program 330. Further, the editor program 321 receives a source program of an externally supplied control program (especially of a user program) or edits a source program of the existing control program through user operations.

The compiler program 322 provides the function of compiling a source program of the control program to create an object program-format user program executable by the microprocessor 100 in the CPU unit 13.

The debugger program 323 provides a function necessary to debug a source program of the control program. Specifically, the debugger involves an operation to execute a user-specified portion of the source program, an operation to trace time-wise changes in value of a variable during execution of the source program, etc.

The schedule-building data template 324 is an aggregate of schedule-building data pieces used to realize several schedule patterns which are probably used by many users. User-created schedule-building data may be added as a template.

The schedule-building data creation program 325 provides a function to create the schedule-building data 234 by executing one of processing to accept a user's decision of using any one of schedule-building data pieces registered as the schedule-building data template 324 as it is, processing to cause the user to change a portion of such registered schedule-building data, and processing to cause the user to newly input schedule-building data. In this case, the operation of using the schedule-building data registered as the template as it is also is supposed to be included in the concept of the processing to create the schedule-building data 234.

The communication program 326 provides a function to transfer to the CPU unit 13 in the PLC 1 the schedule-building data 234 and an object program (user program 236), for use in the CPU unit 13, of the control program.

The PLC support device 8 may hold only one kind of schedule-building data without having the schedule-building data creation program 325 and transfer the schedule-building data to the CPU unit.

That is, the PLC support device 8 includes a storage unit (the hard disk (HDD) 84 etc. in FIG. 5) and a computing unit (the CPU 81 in FIG. 5). The storage unit is used to store the PLC support program 320 and the schedule-building data 234. The PLC support program 320 causes the computing unit to execute output processing of outputting the schedule-building data such that this schedule-building data can be acquired by the CPU unit 13 in the PLC 1.

The operation of outputting the schedule-building data such that this schedule-building data can be acquired by the PLC 1 is performed in the case shown in FIG. 1 of outputting via the connection cable 10 shown in FIG. 1 as well as also the case of directly outputting via a network not shown, the case of indirectly outputting via a server computer connected to the network not shown, and further the case of outputting to a portable type recording medium readable by the PLC 1.

The schedule-building data acquisition section with which the CPU unit 13 in the PLC 1 acquires the schedule-building data 234 includes a communication circuit for communication via the connection cable 10, a communication circuit for network communication, and a reading circuit for the recording medium which are used to acquire the schedule-building data 234 output by way of any one of the paths.

The CPU unit 13 in the PLC 1 may employ a configuration in which the schedule-building data 234 is stored in the storage section by the manufacturer at the phase of manufacture and, after shipment from the manufacturer, cannot be changed, the schedule-building data 234 cannot be changed.

Typically, the system program 210 to be installed in the PLC 1 is stored in the nonvolatile memory 106 of the CPU unit 13 at the phase of manufacture of the CPU unit 13. However, by storing the system program 210 in the CD-ROM 9 beforehand, the user can also copy the system program 210 in the CD-ROM 9 to the PLC support device 8 and then transfer the copied system program 210 to the CPU unit 13 by utilizing the function provided by the communication program 326. Further, by storing the real-time OS 200 to be executed by the CPU unit 13 of the PLC 1 in the CD-ROM 9, it is possible to re-install also the real-time OS 200 to the PLC 1 by user operations.

The following will describe first through third embodiments as typical examples of scheduling control actions by the PLC 1 by use of the schedule-building data 234.

F. First Embodiment

In a first embodiment described below, a schedule-building mechanism is used which has a hierarchy structure of tasks and threads. The task includes one or a plurality of threads and provides a unit in which processing is repeated.

f1. Overall Processing

Figure 7:
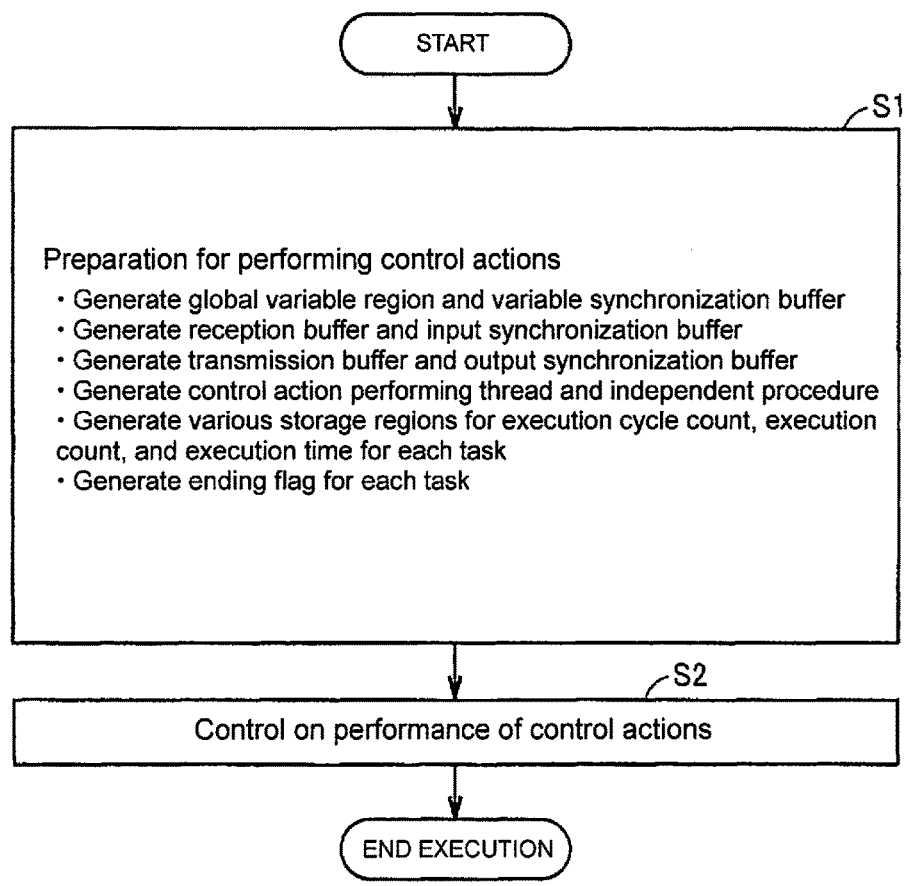
FIG. 7 is a flowchart showing overall processing by a system program in the CPU unit according to a first embodiment of the invention.

FIG. 7 is a flowchart showing overall processing by a system program 210 in a CPU unit 13 according to the first embodiment of the invention. As shown in FIG. 7, first, preparatory processing for performance of control actions by the PLC 1 is executed (step S1) and, subsequently, performance control processing for the control actions by the PLC 1 is executed (step S2).

The preparatory processing for performance of control actions (step S1) includes processing configured to generate a global variable region 1042a and a variable synchronization buffer, processing configured to generate a reception buffer (PLC system bus reception buffer 1044 and/or field network reception buffer 1046) and an input synchronization buffer, processing configured to generate a transmission buffer (PLC system bus transmission buffer 1043 and/or field network transmission buffer 1045) and an output synchronization buffer, processing configured to generate threads and an independent procedure 222 for control actions, processing configured to generate storage regions for the number of execution cycles, the number of times, and an execution lapse of time of each of the tasks, and processing configured to generate an ending flag for each task. Order in which those processing pieces are executed is designed appropriately.

f2. Tasks and Threads

As described above, in the first embodiment, a description will be given of a processing example which uses the schedule-building mechanism having the hierarchy structure of tasks and threads. The tasks and the threads will be described in detail as follows.

FIG. 8 is a table-format view showing set task items prepared in the first embodiment of the invention and explanations of the set task items. FIGS. 9A and 9B are table-format views showing set thread items prepared in the first embodiment of the invention and explanations of the set thread items. A PLC support program 320 according to the present embodiment is configured to be able to set contents described in "Set item" field in FIG. 8 for each of the tasks. Further, the PLC support program 320 is configured to be able to set contents described in "Set item" field in FIGS. 9A and 9B for each of the threads.

In FIGS. 8, 9A, and 9B, the term "activate" used about threads and procedures means to add a target thread or procedure to a queue for the real-time OS 200. The real-time OS 200 causes the microprocessor 100 to execute threads or procedures registered in a queue in ascending order of priorities. The threads or procedures registered in a queue and waiting for their execution are said to be in a "ready state". The threads or procedures being executed by the microprocessor 100 are said to be in a "run state". The threads or procedures not registered in any queue are said to be in a "sleep state".

FIG. 10 is a table showing functions, set items, and explanations of the set items about a control cycle initiation procedure, which is one of procedures prepared in the first embodiment of the invention. FIGS. 11A and 11B are tables showing names and functions of the procedures other than the control cycle initiation procedure prepared in the first embodiment of the invention.

Instances of the control cycle initiation procedure (FIG. 10), a task initiation procedure (FIG. 11A), and a task termination procedure (FIG. 11A) of the procedures shown in FIGS. 10, 11A, and 11B are each generated as an independent procedure.

The following will describe schedule examples 1 to 10 according to the present embodiment along with examples of the corresponding schedule-building data, etc.

f3: Schedule Example 1: In a Case where Execution Ends in an Execution Cycle Period In schedule example 1 of the first embodiment of the invention, a control A task and a control B task are executed. It is assumed that the control A task includes an input/output A thread and a control A thread and a control B task includes a control B thread. One execution cycle of the control A task is equivalent to one control cycle and one execution cycle of the control B task is equivalent to two control cycles. In the k-th cycle, one execution cycle of the control A task and that of the control B task are initiated.

Figure 13:
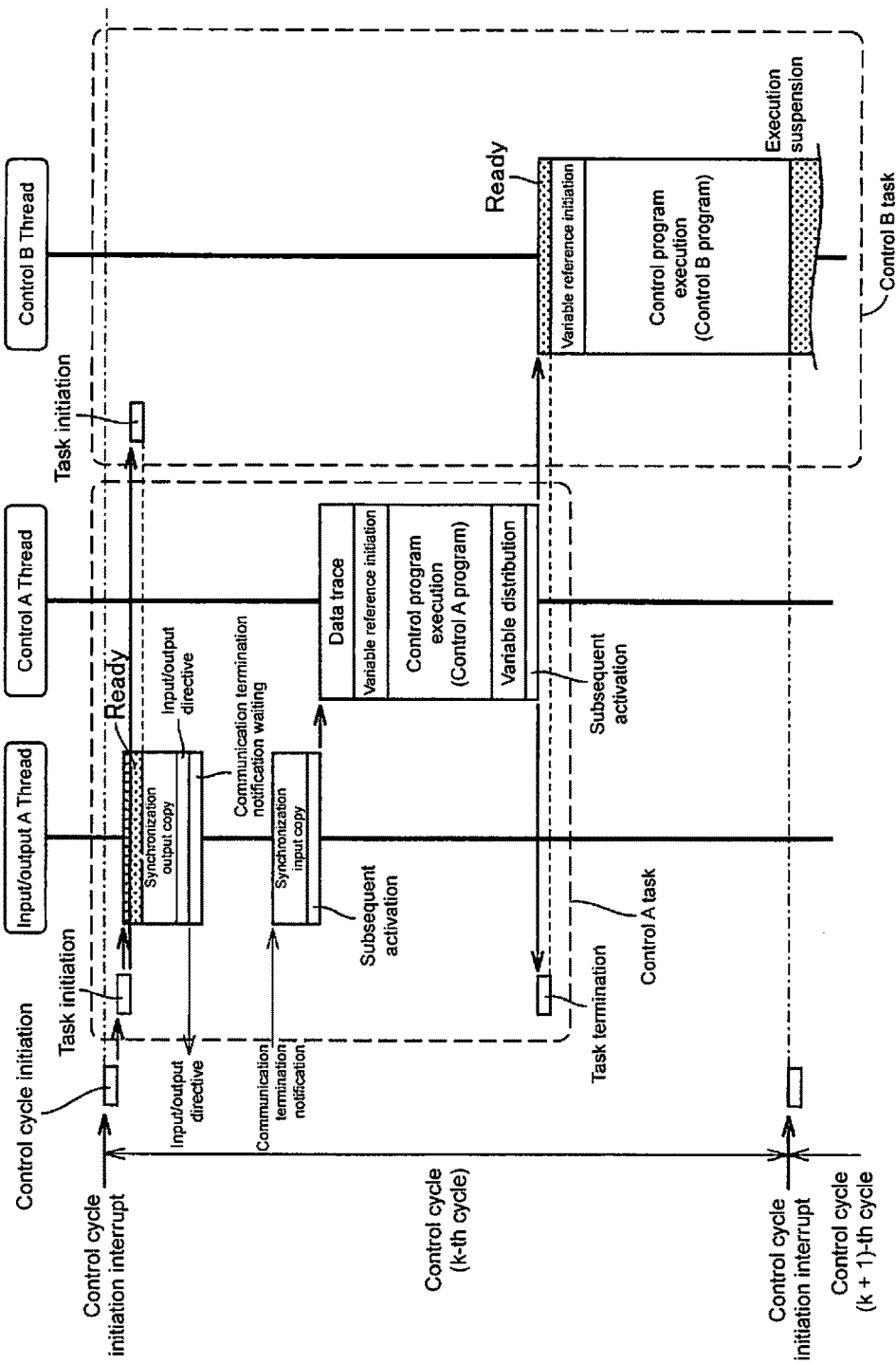
FIG. 13 is a sequence diagram of the k-th cycle in schedule example 1 in the first embodiment of the invention.
Figure 14:
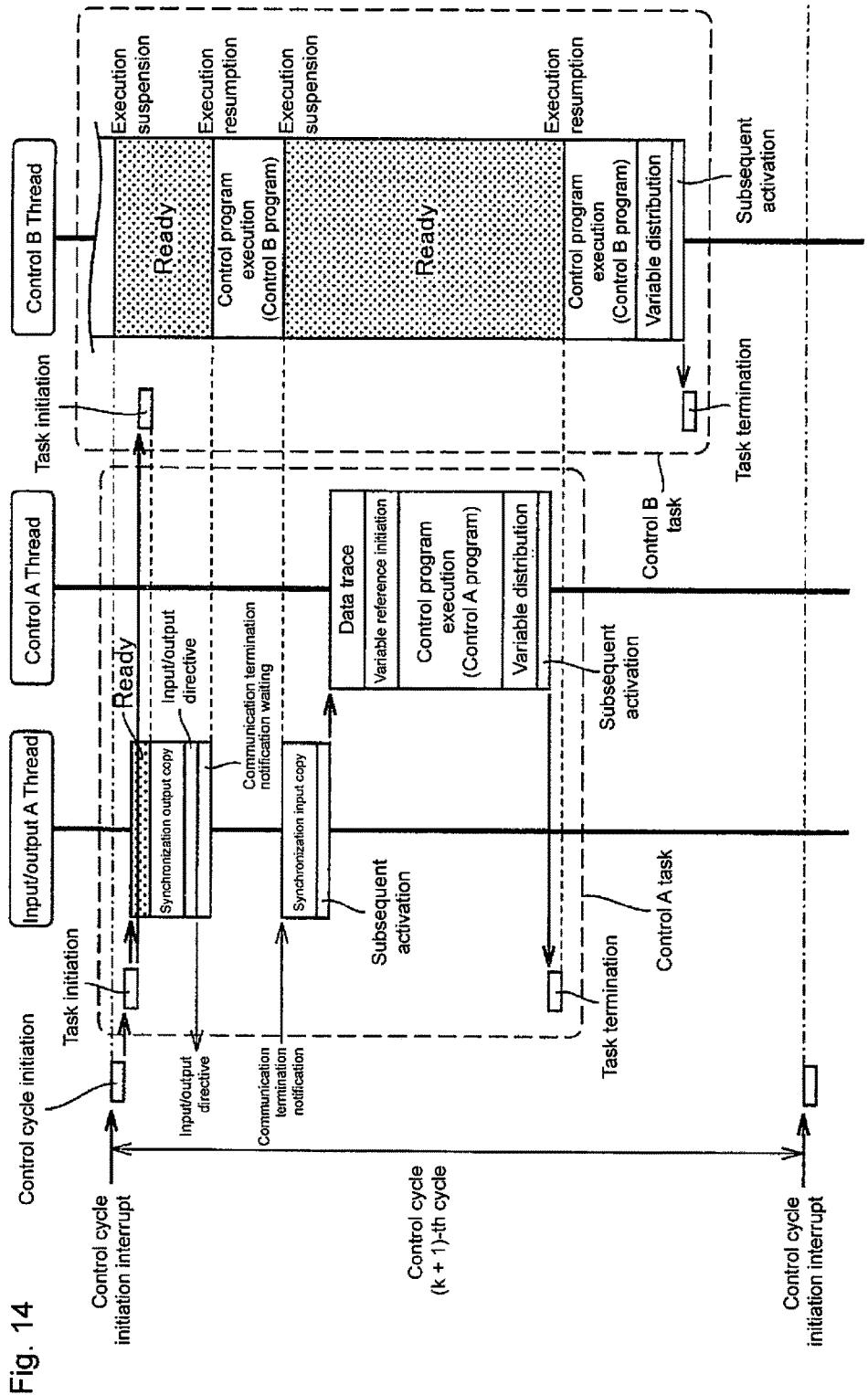
FIG. 14 is a sequence diagram of the (k+1)-th cycle in schedule example 1 in the first embodiment of the invention.

FIG. 12 is a table showing schedule-building data 234 corresponding to schedule example 1 in the first embodiment of the invention. FIG. 13 is a sequence diagram of the k-th cycle in schedule example 1 in the first embodiment of the invention. FIG. 14 is a sequence diagram of the (k+1)-th cycle in schedule example 1 in the first embodiment of the invention.

Although contents of the schedule-building data 234 are schematically shown in a table format In FIG. 12, the schedule-building data 234 actually used is described in a format that can be processed by the microprocessor 100 by using, for example, the extensible markup language (XML).

The schedule-building data 234 in schedule example 1 includes set contents of a control cycle initiation procedure such as shown in FIG. 12(1), set contents of a task such as shown in FIGS. 12(2) and (5), and set contents of a thread such as shown in FIGS. 12(3), (4), and (6).

As shown in FIG. 12(1), in schedule example 1 of the first embodiment, as a control cycle initiation condition of the control cycle initiation procedure, a "control cycle initiation interrupt" is set. Therefore, as described in FIG. 10, the control cycle initiation procedure is activated if the control cycle initiation interrupt (control cycle initiation interrupt that initiates the k-th cycle in FIG. 13) occurs. Further, "1" is set as the priority, so that the control cycle initiation procedure is executed immediately when activated in priority to any other threads and procedures. Further, the control cycle initiation procedure has a function to activate a procedure specified in the set item of "Task initiation processing" in "Each task". Specifically, in "Task initiation processing" of each of FIGS. 12(2) and (5), "Task initiation procedure" is specified, so that the control cycle initiation procedure activates a task initiation procedure for the control A task and a task initiation procedure for the control B task and terminates its own execution.

If the execution of the control cycle initiation procedure ends, the task initiation procedure for the control A task enters the run state. The task initiation procedure performs the functions described in FIG. 11A. As specified in "Thread specification" in FIG. 12(2), the control A task includes "input/output A thread" and "control A thread". As shown in FIG. 12(3), the condition for initiation of the input/output A thread is "control A task", so that the input/output A thread may be activated subsequent to the task initiation procedure. On the other hand, the condition for initiation of the control A thread is not "control A task", so that the control A thread is not to be activated subsequent to the task initiation procedure. The task initiation procedure activates the input/output A thread and terminates its own execution.

If the execution of the task initiation procedure for the control A task ends, the task initiation procedure for the control B task enters the run state. The task initiation procedure performs the functions described in FIG. 11A and then terminates its own execution. As specified in "Thread specification" in FIG. 12(5), the control B task includes "control B thread". As shown in FIG. 12(6), the condition for initiation of the control B thread is not "control B task", so that the control B thread is not to be activated subsequent to the task initiation procedure and, therefore, the task initiation procedure for the control B task does nothing.

If the execution of the task initiation procedure for the control B task ends, the input/output A thread enters the run state. The procedures enumerated in "Procedure specification" in FIG. 12(3) are executed in order in which they are enumerated.

If the input/output A thread enters the run state, first a synchronization output copy procedure is executed. The synchronization output copy procedure has such functions as described in FIG. 11A and the control A task and the control B task both have a current number of the execution cycles of "1", so that pre-specified output data is copied from the output synchronization buffer to the transmission buffer for both of the control A task and the control B task. Details of the synchronization output copy procedure will be described later with reference to FIG. 18.

Next, an input/output directive procedure is executed. That is, if having given an input/output directive signal to the communication circuit, the communication circuit transmits output data stored in the transmission buffer, stores received input data in the reception buffer, and gives the microprocessor 100 a transmission termination notification signal. For example, in the case of using an EtherCAT (registered trademark) product as the field network 2, a frame transmitted from the field network controller 140 goes around slave equipment pieces and returns while exchanging data with the slave equipment pieces. The returned frame is automatically received by the field network controller 140. Therefore, the input/output directive signal has a meaning as a transmission directive signal directly but directs reception indirectly.

Subsequent to the execution of the input/output directive procedure, a communication termination notification waiting procedure is executed. That is, if a communication termination notification is given, the communication termination notification waiting procedure sets re-activation of the input/output A thread and puts the input/output A thread in the sleep state.

While the input/output A thread is in the sleep state, various system processing pieces registered in the queue and given lower priorities than the threads and procedures belonging to the control task are executed.

If a communication termination notification is given, a synchronization input copy procedure is executed. The synchronization input copy procedure has such functions as described in FIG. 11B and the control A task and the control B task both have a current number of the execution cycles of "1", so that pre-specified input data is copied from the reception buffer to the input synchronization buffer for both of the control A task and the control B task. Details of the synchronization input copy procedure will be described later with reference to FIG. 17.

What are pre-specified about output data subject to output copy and input data subject to input copy are given from a PLC support device 8 as set information of a control program 230.

Next, a subsequent-activation procedure is executed. The input/output A thread is specified in "Initiation condition" for the control A thread as shown in FIG. 12(4), so that the subsequent-activation procedure activates the control A thread.

If the execution of the input/output A thread ends, the control A thread enters the run state. The procedures enumerated in "Procedure specification" in FIG. 12(4) are executed in order in which they are enumerated.

If the control A thread enters the run state, first a data trace procedure is executed. As described in FIG. 11B, the data trace procedure records a pre-specified variable value in a log file. What are pre-specified about the variable are also given from the PLC support device 8 as set information of the control program 230.

Next, a variable reference initiation procedure is executed. That is, processing is executed to prevent the variable synchronization buffer from being rewritten about variables to be referenced by a control A program (specified in "Control program specification" to be described later) as the referrer side control program. Such variable synchronization functions realized by the variable reference initiation procedure and a variable distribution procedure (control B thread) will be described with reference to FIG. 19 later.

Next, a control program execution procedure is executed. "Control A program" is specified in "Control program specification" of the control A thread as shown in FIG. 12(4), so that the control A program is executed. The control A program may be a sequence program created in compliance with a user's control purpose and, if such a sequence program includes motion instructions, may include a sequence program and the subsequently executed motion computing program.

If the execution of the control A program ends, the variable distribution procedure is executed. That is, the variable distribution procedure copies the contents of global variables which are updated by the control A program as the owner side control program and referenced by the control B program as the referrer side control program, to the variable synchronization buffer for the control B program. Details of the owner side control program and the referrer side control program will be described with reference to FIG. 19 later.

Next, the subsequent-activation procedure is executed. The control A thread is specified in "Task termination condition" for the control A thread as shown in FIG. 12(2). Further, the control A thread is specified in "Initiation condition" for the control B thread as shown in FIG. 12(6) and currently a task termination flag for the control B task is off. Therefore, the subsequent-activation procedure activates the control B thread and the task termination procedure for the control A task.

If the execution of the control A thread ends, the task termination procedure for the control A task enters the run state. The task termination procedure executes functions described in FIG. 11A.

If the execution of the task termination procedure for the control A task ends, the control B thread enters the run state. The procedures enumerated in "Procedure specification" in FIG. 12(6) are executed in order in which they are enumerated.

If the control B thread enters the run state, first the variable reference initiation procedure is executed. That is, processing is executed to prevent the variable synchronization buffer from being rewritten about variables to be referenced by the control B program (specified in "Control program specification" to be described later) as the referrer side control program.

Next, the control program execution procedure is executed. "Control B program" is specified in "Control program specification" of the control B thread as shown in FIG. 12(6), so that the control B program is executed. The control B program may be a sequence program created in compliance with a user's control purpose and, if such a sequence program includes motion instructions, may include a sequence program and the subsequently executed motion computing program.

FIG. 13 shows a case where a control cycle initiation interrupt configured to start the (k+1)-cycle is caused during execution of the control B program. Due to the control cycle initiation interrupt, the control B program is suspended in execution.

As shown in FIG. 14, in the (k+1)-th cycle, the processing of the control A task and the task initiation procedure for the control B task are executed in much the same way as the case of the k-th cycle.

During a communication termination notification waiting time for the input/output A thread, execution of the control program B is restarted because the control B thread is higher in priority than the system processing executed in the k-th cycle, and if a communication termination notification is given, the execution of the control program B is suspended again.

If execution of the task termination procedure for the control A task ends, the execution of the control program B is restarted.

If the execution of the control B program ends, the variable distribution procedure is executed. That is, the contents of global variables which are updated by the control B program as the owner side control program and referenced by the control A program as the referrer side control program are copied to the variable synchronization buffer for the control A program.

Next, the subsequent-activation procedure is executed. "Control B thread" is specified in "Task termination condition" of the control B task as shown in FIG. 12(5), so that the subsequent-activation procedure activates the task termination procedure for the control B task.

If the execution of the control B thread ends, the task termination procedure for the control B task enters the run state. The task termination procedure performs functions described in FIG. 11A.

If the execution of the task termination procedure for the control B task ends, various system processing pieces are executed during a time until the control cycle initiation interrupt occurs next.

As hereinabove described, the system program 210 of the CPU unit 13 in the PLC 1 according to the first embodiment of the invention has the following characteristics. That is, the system program 210 includes a procedures' library (procedure library 214) including at least a procedure necessary to control execution of the control program and a procedure necessary to control output of the output data and input of the input data. With this, if the schedule-building data 234 including specifications of order in which the procedures included in the procedure library are executed is stored in the storage section (the main memory 104 or the nonvolatile memory 106), the system program 210 causes the microprocessor 100 to execute the procedures included in the procedure library in accordance with the specifications of the procedure execution order included in the schedule-building data. The characteristics are common also to second and third embodiments to be described later.

As examples of the procedure necessary to control the execution of the control program 230, there are the variable reference initiation procedure, the control program execution procedure, and the variable distribution procedure. As examples of the procedure necessary to control the output of the output data and the input of the input data, there are the synchronization output copy procedure, the input/output directive procedure, the communication termination notification waiting procedure, and the synchronization input copy procedure.

Those characteristics are realized in the first embodiment specifically as follows. That is, the schedule-building data 234 includes specifications (FIGS. 12(3), (4), and (6)) necessary to generate threads by using the procedures included in the procedures' library (procedure library 214). The system program 210 includes processing (step S1 in FIG. 7) configured to generate threads in accordance with thread generating specifications included in the schedule-building data 234. Consequently, it is possible to control the performance of control actions by the PLC 1 by utilizing a queue for the real-time OS 200 and a mechanism of priorities. The characteristics are common also to the second embodiment to be described later.

In the first embodiment, the schedule-building data 234 includes, as thread-related data, specifications (specifications of "initiation conditions" for threads shown in FIG. 12 etc.) necessary to activate any other threads during execution of a thread. Consequently, it is possible to control performance of control actions by the PLC 1 at a higher degree of freedom that cannot be given only by the priority mechanism. The characteristics are common also to the second embodiment to be described later.

Further, in the first embodiment, the schedule-building data 234 includes specifications necessary to set a task which includes one or a plurality of threads and provides a unit for repetitive execution. The system program 210 includes processing (typically, processing configured to generate an independent procedure in step S1 in FIG. 7) configured to set the task in accordance with specifications necessary to set the task included in the schedule-building data 234, as preparatory processing for performance of control actions by the PLC. Consequently, the repetitive execution unit can be understood more easily. Further, by setting an execution cycle period not to a thread but to a task, the execution cycle can be set more easily. It is also made easier to count the number of times of execution and measure the execution lapse of time of the repetitive execution unit (task).

Further, the CPU unit 13 can conduct control in a case where the schedule-building data 234 including specifications of procedure execution order necessary to repeat transmission of output data, reception of input data, and execution of the control program configured to generate the output data by using the input data is stored in the storage section (the main memory 104 or the nonvolatile memory 106).

f4: Schedule Example 1: In a Case where Execution Fails to End in an Execution Cycle Period Next, a description will be given of operations to be performed in a case where execution of a task is not terminated in an execution cycle period set to the task, namely in the case of execution cycle overrun.

Figure 15:
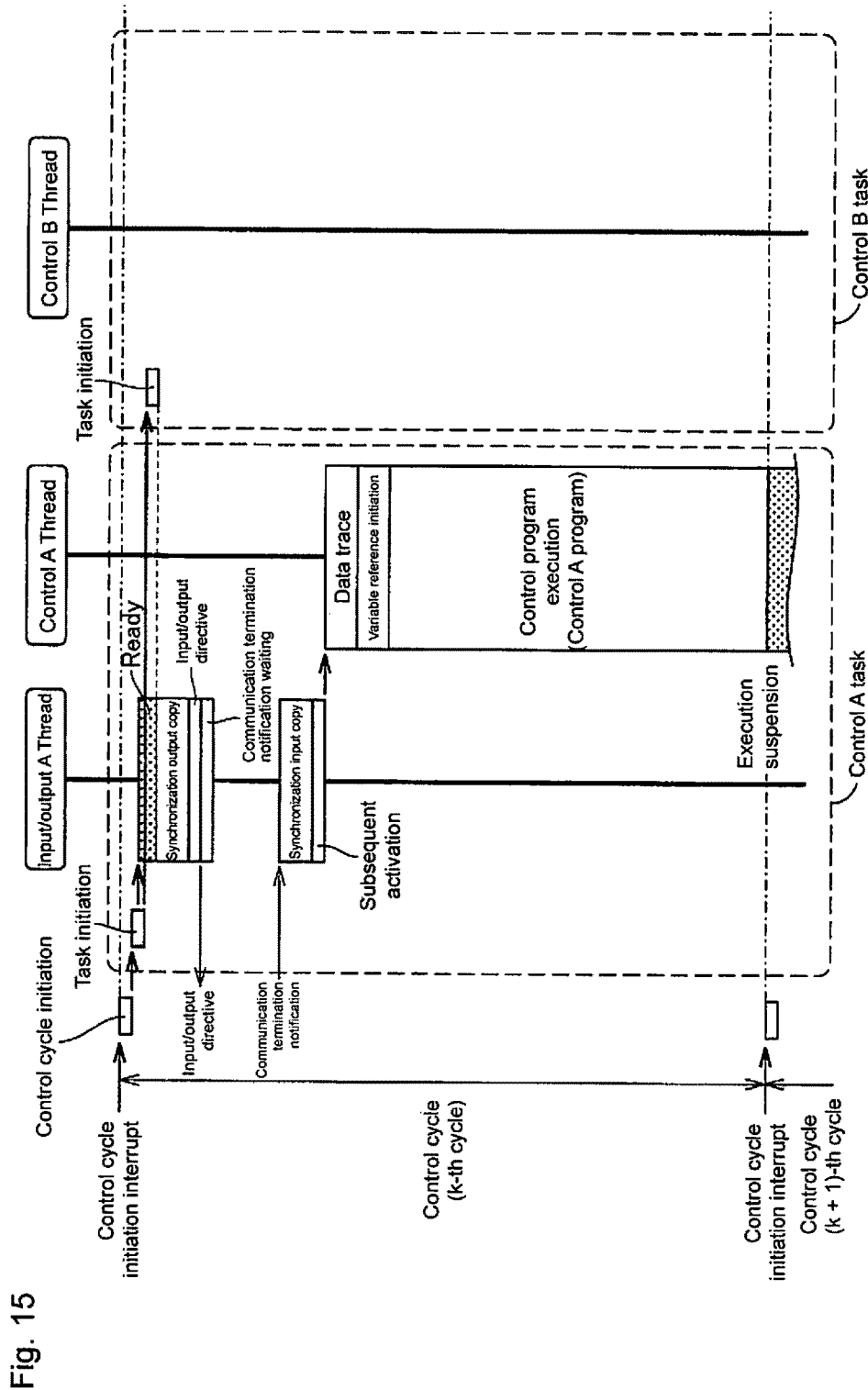
FIG. 15 is a sequence diagram showing operations to be performed in a case where execution of a control A thread fails to end in the k-th cycle in schedule example 1 in the first embodiment of the invention.
Figure 16:
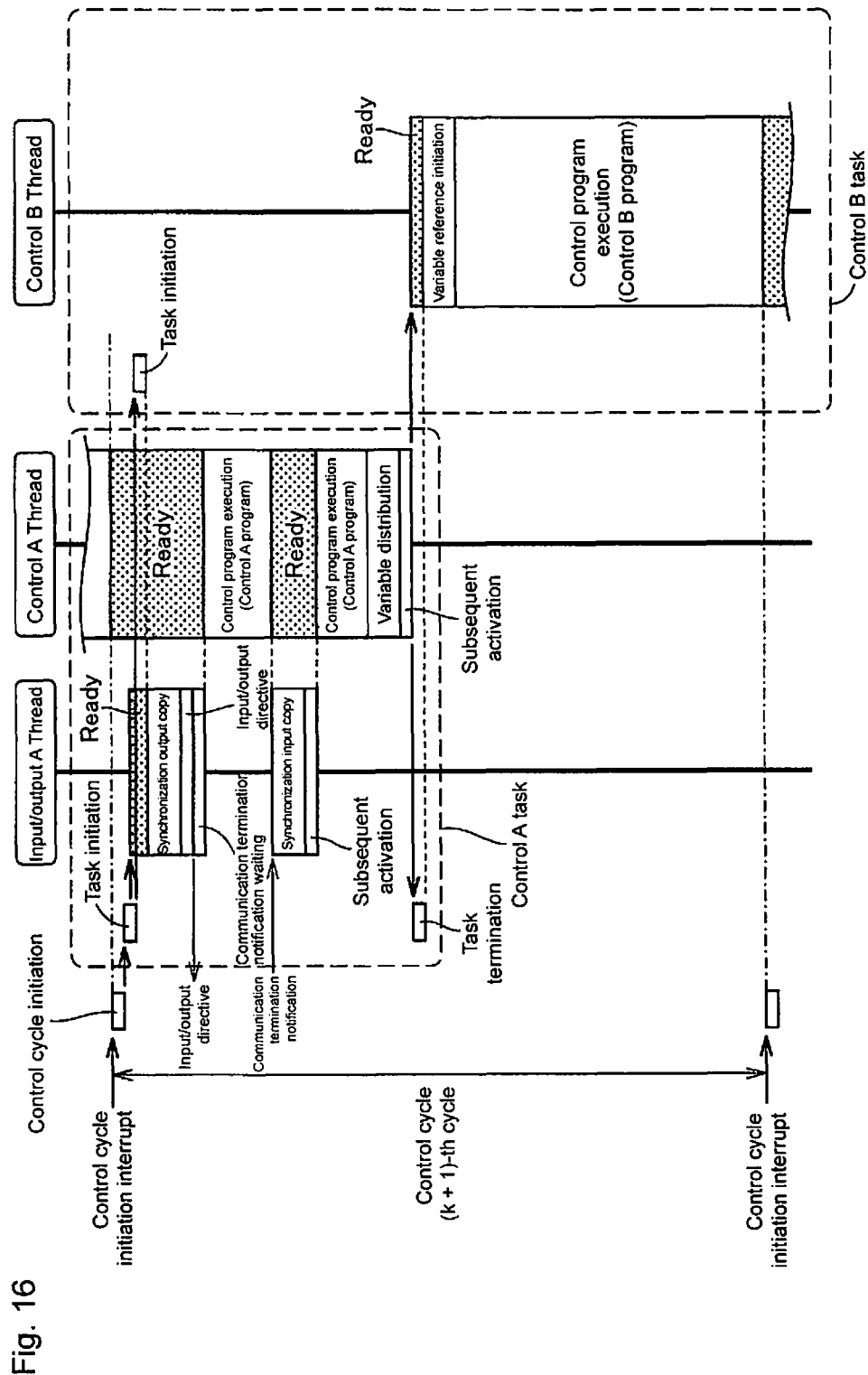
FIG. 16 is another sequence diagram showing the operations to be performed in the case where execution of the control A thread fails to end in the k-th cycle in schedule example 1 in the first embodiment of the invention.

FIGS. 15 and 16 are sequence diagrams showing operations to be performed in a case where execution of the control A thread fails to end in the k-th cycle in schedule example 1 in the first embodiment of the invention.

As shown in FIGS. 12(2) and (5) described above, "1" is specified in "Cycle overrun allowance count" for each of the control A task and the control B task, so that the execution cycle period is allowed to be extended by one control cycle for each of the control A task and the control B task.

As shown in FIG. 15, execution of the control A program is not completed by a time when the control cycle initiation interrupt configured to start the (k+1)-th cycle occurs, so that the execution is suspended by the real-time OS 200.

As shown in FIG. 16, in the (k+1)-th cycle, the control cycle initiation procedure is executed in much the same way as the k-th cycle. At the point in time when the (k+1)-th cycle is started, the execution of the control A task whose execution is started in the k-th cycle is not yet to be finished, but the condition that "the execution cycle count upon count-up is in excess of an execution cycle period (n) and the task ending flag is off" for the task initiation procedure described in FIG. 11A is met, so that the control cycle initiation procedure activates the input/output A thread. In such a manner, the input/output A thread is executed in all of the control cycles except in a case where cycle-overrun error processing is executed and a case where the input/output A thread in the previous control cycle is not yet to be finished. The input/output A thread waiting for a communication termination notification in the (k+1)-th cycle is executed at a position where execution of the control A program was suspended. Moreover, after the execution of the input/output A thread ends, the execution of the control A program is restarted. Although the subsequent activation procedure for the input/output A thread originally activates the control A thread, the control A thread is already activated, so that the control A thread cannot be activated redundantly.

If the task termination procedure for the control A task ends in the (k+1)-th cycle, the control B thread enters the run state. Although execution of the control B task is already started in the k-th cycle, the k-th cycle is not long enough to execute the control B thread, so that execution of the control B thread is started in the (k+1)-th cycle.

Although the execution cycle of the control B task originally ends in the (k+1)-th cycle, execution of the control B thread fails to end in the (k+1)-th cycle, so that the control B task also encounters execution cycle overrun.

As described in FIG. 11A, the execution cycle-overrun error processing is executed if the execution of a task fails to end within a control cycle count obtained by adding a cycle overrun allowance count to an execution cycle period. For example, the control actions are stopped to notify the higher-order computer of the occurrence of execution cycle overrun via a network not shown.

The CPU unit 13 in the PLC 1 according to the first embodiment is provided with sections configured to set a control cycle period. The sections configured to set the control cycle period may include control cycle period setting elements such as a section configured to communicate with the PLC support device 8 and used to acquire information that specifies the control cycle period, a program included in the system program 210 to set the control cycle period, and a system timer structure configured to be able to arbitrarily set a period of the control cycle interrupt signal. Instead of acquiring the control cycle period specifying information from the PLC support device 8, an input device such as an operation switch for accepting an input for specification of the control cycle period may be fitted to the CPU unit 13 itself.

A communication circuit (a PLC system bus controller 120 and/or a field network controller 140) in the CPU unit 13 of the PLC 1 according to the first embodiment transmits output data and receives input data for each control cycle. More specifically, the communication circuit performs transmission and reception if it receives an input/output directive signal generated due to execution of an input/output directive procedure. Alternatively, the communication circuit may be configured to perform transmission and reception for each control cycle if it is triggered by a constant-period signal generated by a system timer. Further, a timer circuit may be provided to the communication circuit itself such that the transmission and reception would be performed for each control cycle in accordance with a constant-period signal generated by the timer circuit.

As hereinabove described, the CPU unit 13 of the PLC 1 according to the first embodiment has the section configured to set the control cycle period. The communication circuit transmits output data and receives input data for each control cycle. The schedule-building data 234 includes specifications of procedure execution order necessary to cause the microprocessor 100 to start execution of the control program (control A program) to be executed in an execution cycle period equivalent to a control cycle period after transmission of the output data and reception of the input data by the communication circuit in a control cycle next to that in which execution of the control program is finished and execute an unexecuted portion of the control program in a control cycle next to that in which execution of the control program is not finished. By using such a CPU unit 13, the user of the PLC 1 can set the period of communication to be performed by the CPU unit 13 of the PLC 1 in synchronization with the control cycle in order to output and input control data to a constant time shorter than the maximum execution lapse of time of the control program, in a situation where the control program execution time may be prolonged sporadically.

One example of such a situation is a case where the control program 230 includes a motion computing program configured to compute a command value output to the motor driver for each execution. The motion computing program may in some cases need a longer execution time than a time required by the subsequent execution owing to execution of initial processing necessary to start calculation of the command value in the first-time execution activated by a user program 236 (sequence program) created in compliance with a user's control purpose. In such a situation also, the period of communication to be performed by the CPU unit 13 in synchronization with the control cycle in order to output and input the control data can be set to a constant time shorter than the maximum execution lapse of time of the control program 230.

f5: Synchronization Input Copy Procedure

Figure 17:
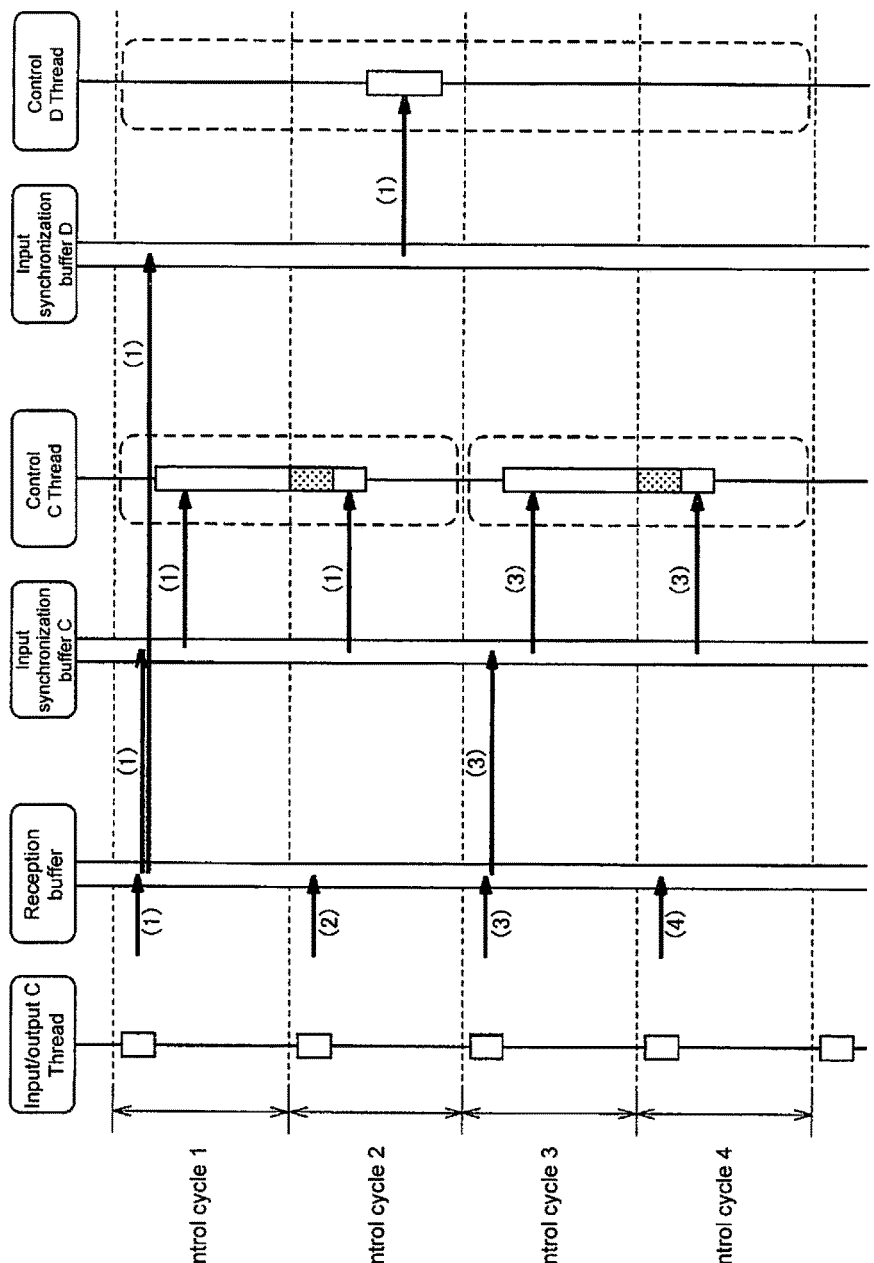
FIG. 17 is an explanatory sequence diagram of operations of a synchronous input copy procedure prepared in the first embodiment of the invention.

Next, functions of the synchronization input copy procedure will be described in detail. FIG. 17 is an explanatory sequence diagram of operations of the synchronous input copy procedure prepared in the first embodiment of the invention.

In a schedule example shown in FIG. 17, a case is shown in which a total of three threads are executed, namely an "input/output C thread" whose execution cycle includes one control cycle, a "control C thread" whose execution cycle includes two control cycles, and a "control D thread" whose execution cycle includes four control cycles.

The configuration of the input/output C thread is supposed to be the same as that of the input/output A thread shown in FIGS. 13 and 14. The control C thread and the control D thread are supposed to be the same in configuration as but different in execution cycle period from the control A thread and the control B thread shown in FIGS. 13 and 14 respectively. Further, it is supposed that in the control C thread, the control C program is executed, and in the D thread, the control D program is executed. The threads in FIG. 17 are supposed to belong to the mutually different tasks.

A reception buffer in FIG. 17 represents the PLC system bus reception buffer 1044 and the field network reception buffer 1046 in FIG. 4. An input synchronization buffer C in FIG. 17 is provided for each piece of input data referenced by the control C program which is executed in the control C thread. Similarly, an input synchronization buffer D in FIG. 17 is provided for each piece of input data referenced by the control D program which is executed in the control D thread. The input synchronization buffers C and D are provided in an input synchronization buffer region 1042*d* in FIG. 4. A variable region for use by the control programs may be utilized as it is as the input synchronization buffer.

As shown in FIG. 17, each time the input/output C thread is executed, new input data received by the PLC system bus controller 120 and/or the field network controller 140 is overwritten and stored in the reception buffer. The synchronization input copy procedure copies the input data stored in the reception buffer to the input synchronization buffers (input synchronization buffers C and D) for the control programs which use this input data. In this case, the input data is relocated into a format suited for use by the control programs.

As described in FIG. 11B, the synchronization input copy procedure has a function to copy input data pre-specified about a task from the reception buffer to the input synchronization buffer only if the task has an execution cycle count of "1", that is, the current control cycle is the first control cycle among the execution cycles for the task. Therefore, as shown in FIG. 17, over a range of the control cycles 1 through 4, copy from the reception buffer to the input synchronization buffer C is performed only in the control cycles 1 and 3 and copy from the reception buffer to the input synchronization buffer D is performed only in the control cycle 1. This is because the execution cycle for the control C thread is set to include two control cycles and the execution cycle for the control D thread is set to include four control cycles.

In such a manner, the input data stored in the input synchronization buffer is prevented from being overwritten by new input data during a period in which the control program referencing the input data is being executed, so that the control program can acquire the same value no matter how many times it references the input data, to provide consistent calculations. Moreover, the input copy is performed only in the first control cycle among the control thread (control program) execution cycles, so that the update cycle for input data to be used by the control program can be set constant.

Although one input synchronization buffer has been provided for each control program and each input data piece in FIG. 17, two or three input synchronization buffers may be provided for each control program and each input data piece to design the procedures such that the procedures may be managed as exchanging roles (states) of these input synchronization buffers. For example, the procedures may be designed such that one of the buffers would be in a state (reference state) in which it is referenced by the control program and another would be in a state (write state) in which new input data can be written. With this, if new input data is stored in the writable buffer before execution of the control program starts, the roles of the two buffers are exchanged. Consequently, input copy is possible any time during the period, so that data loss can be prevented. However, in a schedule example in FIG. 17, the respective numbers of the execution cycle periods of the threads are in a relationship of integral multiples, so that loss of the input data to be used by the control program does not occur originally. Instead of directly exchanging the reference state and the write state of the input synchronization buffer, three buffers may be used such that the buffer in which new input data is stored would shift from the write state via a third state (standby state) to the reference state.

As described in FIG. 11B, an input copy procedure is also prepared which has a function to copy pre-specified input data from the reception buffer to the input synchronization buffer and makes no decision about the number of execution cycles for each task (the procedure itself have no function to be synchronized with any other task's execution cycle). An example of using such an input copy procedure will be described in schedule example 3 to be described later.

The characteristics of the CPU unit 13 using the reception buffer and the input synchronization buffer or the CPU unit 13 using the input copy processing by the input copy procedure or the synchronization input copy procedure can be summarized as follows.

As preparatory processing for performance of control actions by the PLC 1, the system program 210 includes processing (step S1 in FIG. 7) configured to generate in a storage section (the main memory 104 etc.) a reception buffer for storage of received input data and processing (step S1 in FIG. 7) configured to generate in the storage section (the main memory 104 etc.) an input synchronization buffer to be used as a reference destination when the control program 230 references the input data for each piece of the input data referenced by the control program 230.

The schedule-building data 234 includes specifications of procedure execution order necessary to cause the microprocessor 100 to execute input copy processing configured to copy received input data from the reception buffer to an input synchronization buffer compatible with the input data and control program initiation processing configured to start execution of the control program 230. In such a manner, the input data stored in the input synchronization buffer is prevented from being overwritten by new input data during a period in which the control program referencing the input data is being executed, so that the control program 230 can acquire the same value no matter how many times it references the input data, to provide consistent calculations.

Moreover, the characteristics of the CPU unit 13 using the synchronization input copy processing by the synchronization input copy procedure can be summarized as follows.

The input data is received for each control cycle. The schedule-building data 234 includes specifications of procedure execution order necessary to cause the microprocessor 100 to execute the control program initiation processing for each execution cycle having an integral multiple of the control cycle and execute the input copy processing on the input data received in the control cycle in which the control program's execution cycle is started. In such a manner, the update cycle for input data to be used by the control program 230 can be set constant.

f6: Synchronization Output Copy Procedure

Figure 18:
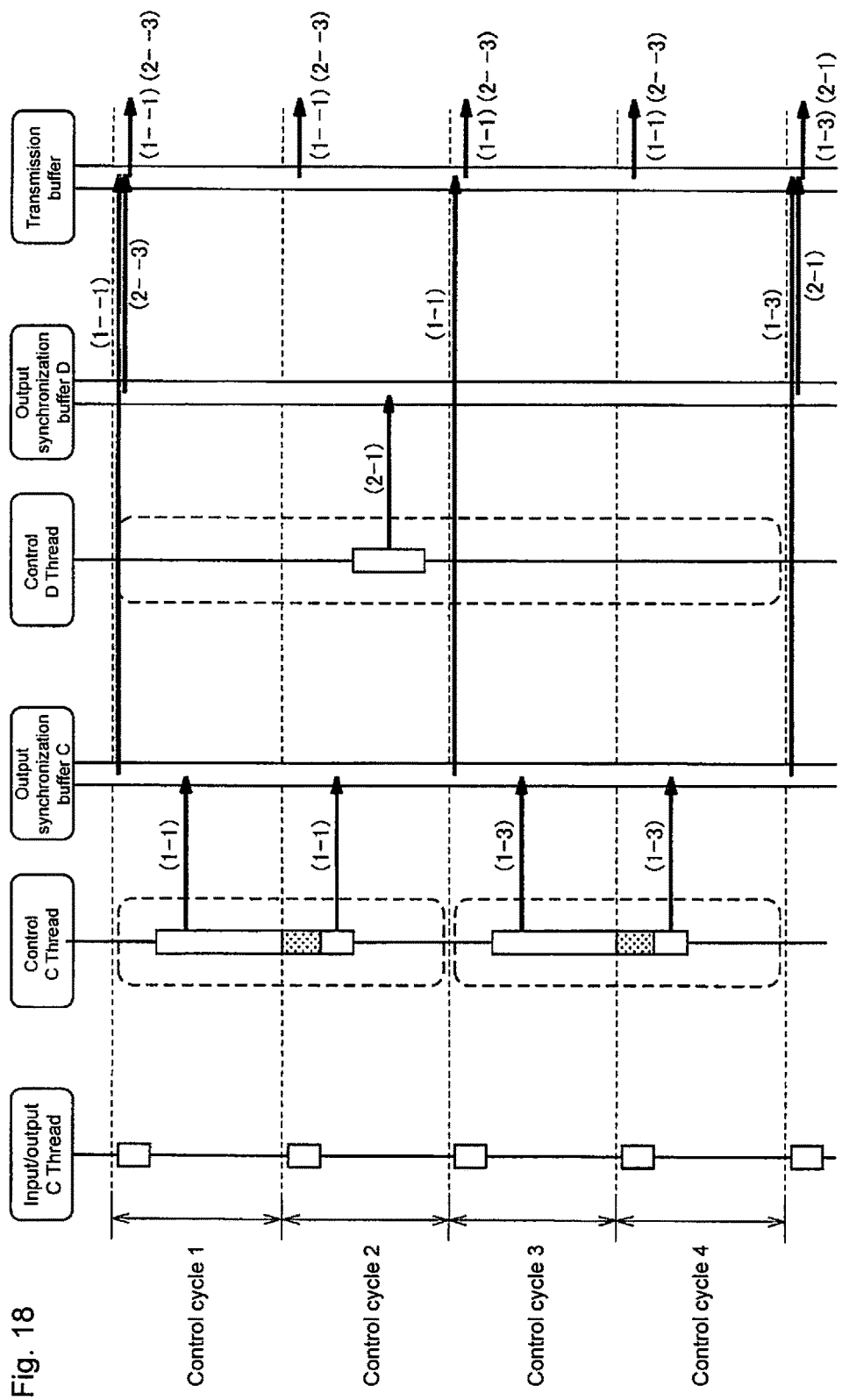
FIG. 18 is an explanatory sequence diagram of the operations of a synchronous output copy procedure prepared in the first embodiment of the invention.

Next, functions of the synchronization output copy procedure will be described in detail. FIG. 18 is an explanatory sequence diagram of the operations of the synchronous output copy procedure prepared in the first embodiment of the invention.

In a schedule example shown in FIG. 18, a case is shown in which a total of three threads are executed, namely the "input/output C thread", the "control C thread", and the "control D thread". The example of a schedule of those threads is the same as that in FIG. 17.

A transmission buffer in FIG. 18 represents the PLC system bus transmission buffer 1043 and the field network transmission buffer 1045 in FIG. 4. An output synchronization buffer C in FIG. 18 is provided for each piece of output data generated through execution of the control C program which is executed in the control C thread. Similarly, an output synchronization buffer D is provided for each piece of output data generated through execution of the control D program which is executed in the control D thread. The output synchronization buffers C and D are provided in an output synchronization buffer region 1042c in FIG. 4. A variable region for use by the control programs may be utilized as it is as the output synchronization buffer.

As shown in FIG. 18, each time the input/output directive procedure included in the input/output C thread is executed, the PLC system bus controller 120 and/or the field network controller 140 transmit the output data stored in the transmission buffer. The synchronization output copy procedure is executed prior to the input/output directive procedure, to copy the output data stored in the output synchronization buffers (output synchronization buffers C and D) to the transmission buffer. In this case, in the PLC system bus transmission buffer 1043, the output data is relocated into a format such that the output data is integrally located for each transmission destination unit, and, in the field network transmission buffer 1045, the output data is relocated into a format such that the output data can be transmitted as a serial frame.

As described in FIG. 11A, the synchronization output copy procedure has a function to copy output data pre-specified about a task from the output synchronization buffer to the transmission buffer only if the task has an execution cycle count of "1", that is, the current control cycle is the first control cycle among the execution cycles for the task. Therefore, as shown in FIG. 18, over the range of the control cycles 1 through 4, copy from the output synchronization buffer C to the transmission buffer is performed only in the control cycles 1 and 3 and copy from the output synchronization buffer D to the transmission buffer is performed only in the control cycle 1. This is because the execution cycle for the control C thread is set to include two control cycles and the execution cycle for the control D thread is set to include four control cycles.

In such a manner, the output data stored in the transmission buffer is copied from the output synchronization buffer immediately before transmission in the first control cycle among the execution cycles of the control programs. The output data is generated in the immediately previous execution cycle, so that at a point in time when the output data is copied to the transmission buffer, execution of the control program in the immediately previous execution cycle is already terminated. Therefore, any more output data with the potentiality of being updated is not to be transmitted during the execution of the control program. Moreover, the output copy is performed only in the first control cycle among the control thread (control program) execution cycles, so that the update cycle for output data to be transmitted can be set constant.

As described in FIG. 11A, an output copy procedure is also prepared which has a function to copy pre-specified output data from the output synchronization buffer to the transmission buffer and makes no decision about the number of execution cycles for each task (the procedure itself have no function to be synchronized with any other task's execution cycle). An example of using such an output copy procedure will be described in schedule example 3 to be described later.

The characteristics of the CPU unit 13 using the output synchronization buffer and the transmission buffer or the CPU unit 13 using the output copy processing by the output copy procedure or the synchronization output copy procedure can be summarized as follows.

As preparatory processing for performance of control actions by the PLC 1, the system program 210 includes processing (step S1 in FIG. 7) configured to generate in the storage section (the main memory 104 etc.) a transmission buffer for storage of output data to be transmitted and processing (step S1 in FIG. 7) configured to generate, along with output data to be copied to the transmission buffer, an output synchronization buffer in which the output data is stored, in the storage section (the main memory 104 etc.).

The schedule-building data 234 includes specifications of procedure execution order necessary to cause the microprocessor 100 to execute output copy processing configured to copy output data from the output synchronization buffer to the transmission buffer. In such a manner, any more output data with the potentiality of being overwritten and updated is not to be transmitted during the execution of the control program.

Moreover, the characteristics of the CPU unit 13 using the synchronization output copy processing by the synchronization output copy procedure can be summarized as follows.

Figure 19:
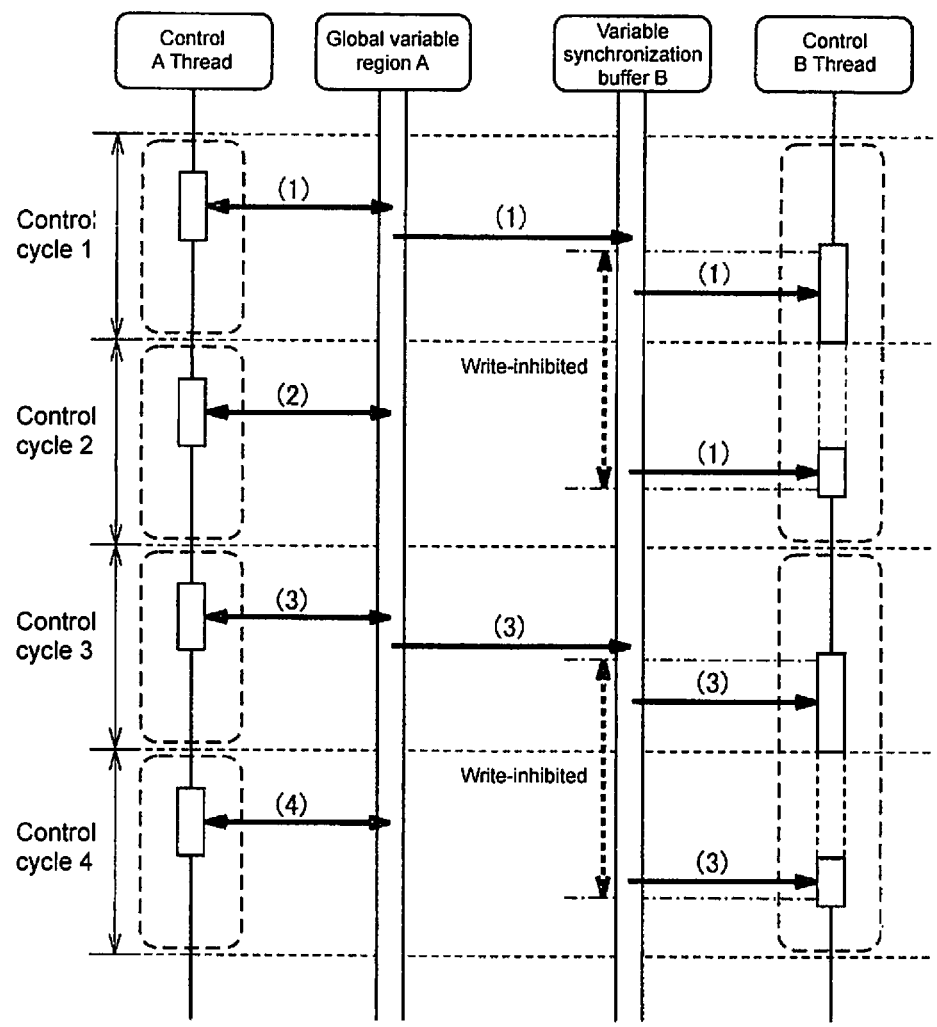
FIG. 19 is an explanatory sequence diagram of operations of a variable distribution procedure and a variable reference initiation procedure prepared in the first embodiment of the invention.

The schedule-building data 234 includes specifications of procedure execution order necessary to cause the microprocessor 100 to execute the control program initiation processing for each execution cycle having an integral multiple of the control cycle and execute in the first control cycle among execution cycles of the control program 230 the output copy processing at timing when output data generated through execution of the control program 230 in the previous execution cycle is transmitted from the transmission buffer. In such a manner, the update cycle for the output data to be transmitted can be set constant.

f7: Variable Distribution Procedure and Variable Reference Initiation Procedure Next, functions (variable synchronization functions) of a variable distribution procedure and a variable reference initiation procedure will be described in detail. FIG. 19 is an explanatory sequence diagram of operations of the variable distribution procedure and the variable reference initiation procedure prepared in the first embodiment of the invention.

A schedule example shown in FIG. 19 is assumed to be almost the same as schedule example 1 shown in FIGS. 13 and 14 described above, so that only those portions of the control A thread and the control B thread that are related to the variable synchronization function are shown.

A global variable region A in FIG. 19 is a main memory region configured to store variables which are used by the control program A for control A threads and referenced by the control program for any other threads (specifically, the control B program for control B threads). The global variable region A is allocated in the global variable region 1042a in FIG. 4. A variable region used by the control program 230 may be utilized as it is as the global variable region.

A control program (the control program A in the example in FIG. 19) permitted to rewrite the global variable region A is referred to as an "owner side control program" and a control program (the control program B in FIG. 19) permitted only to reference the global variable region A is referred to as a "referrer side control program". For one global variable, one owner side control program is given but two or more referrer side control programs may be given.

For each global variable which is referenced by the control B program for control B threads as a referrer side control program, a variable synchronization buffer B is allocated in a variable synchronization buffer region 1042b in FIG. 4. The variable region for use by the control program 230 may be utilized as it is as the variable synchronization buffer.

Which control program 230 is an owner side control program or a referrer side control program is specified as variable attributes for each global variable. Data of the variable attributes including the specification is created in the PLC support device 8 based on user's input operations. The created variable attribute data is sent from the PLC support device 8 to the CPU unit 13 and stored in the nonvolatile memory 106 in the CPU unit 13.

Although not shown, a global variable is also present such that the control B program may be an owner side control program and the control A program may be a referrer side control program and provided with a global variable region B correlated to the control B program and a variable synchronization buffer A correlated to the control A program.

The variable distribution procedure copies a value of a global variable that the control program 230 executed in a thread to which the variable distribution procedure belongs is an owner side from the global variable region to a variable synchronization buffer correlated to a control program on the referrer side of the global variable. FIG. 19 shows that the control A thread's variable distribution procedure copies contents (data) of the global variable region A to the variable synchronization buffer B.

The variable reference initiation procedure executes processing necessary to inhibit updating contents of the variable synchronization buffer which is referenced by the control program executed in a thread to which the variable reference initiation procedure belongs. In FIG. 19, the control B thread's variable reference initiation procedure puts the variable synchronization buffer B in the write-inhibited state. Therefore, in control cycle 1, the control A thread's variable distribution procedure can perform copy operations to the variable synchronization buffer B, whereas in control cycle 2 after the control B thread's variable reference initiation procedure is executed, the control A thread's variable distribution procedure cannot perform copy operations to the variable synchronization buffer B. A function to cancel the write-inhibited state of the variable synchronization buffer may be left to the task termination procedure or a variable reference termination procedure may be prepared which has the function to cancel the write-inhibited state.

Thus, even if the global variable region A is rewritten by the control program A during a period from a point in time when execution of the control B program is started to a point in time when its execution is terminated, contents of the variable synchronization buffer B referenced by the control program B are not rewritten, so that the control program B can acquire the same value no matter how many times the global variable is referenced, to provide consistent calculations.

Although one variable synchronization buffer has been provided in FIG. 19 for each control program and for each global variable referenced by the control program as a referrer side, two or three variable synchronization buffers may be provided for each control program and for each global variable referenced by the control program as a referrer side to design the procedure such that the procedure may be managed as exchanging the roles (states) of the variable synchronization buffers. For example, one buffer is placed in a state (reference state) where it may be referenced by a referrer side control program and the other buffer is placed in a state (write state) where new data can be written into it. Then, if new input data is stored in the writable buffer before execution of the referrer side control program starts, the roles of the two buffers are exchanged. Consequently, the variables can be distributed in any periods, so that it is possible to prevent the leakage of distribution of the most recent global variable values generated by the owner side control program. In the case of FIG. 19, the global variable value generated by the control A program in control cycles 2 and 4 is not the most recent at each point in time when execution of the control B program is started, so that there is no problem even if the variable is not distributed. However, in the case of executing the control A program and the control B program concurrently at different cores by using a multi-core microprocessor, there is a possibility that distribution leakage may occur with one variable synchronization buffer. In such a case, distribution leakage can be prevented by managing the variable synchronization buffer as exchanging its couple of states, namely the reference state and the write state. Instead of directly exchanging the reference state and the write state of the variable synchronization buffer, three buffers may be used such that the buffer in which a newly distributed global variable value is stored may shift from the write state via the third state (standby state) to the reference state.

Characteristics of the CPU unit 13 using the global variable region and the variable synchronization buffer or those of the CPU unit 13 using the variable distribution processing for the variable distribution procedure can be summarized as follows.

The storage section (the nonvolatile memory 106) is used to store attribute data about variables used by the control program 230. In a case where the variables are global variables to be referenced by a plurality of the control programs 230, the attribute data can include specifications of one owner side control program permitted to rewrite the variables and specifications of one or a plurality of referrer side control programs permitted only to reference the variables.

As preparatory processing for performance of control actions by the PLC 1, the system program 210 includes processing (step S1 in FIG. 7) configured to generate in the storage section (main memory 104 etc.) the global variable region 1042a for storage of global variables and processing (step S1 in FIG. 7) configured to generate in the storage section (the main memory 104 etc.) the variable synchronization buffer to be used as a reference destination in place of the global variable region by each of the referrer side control programs when the referrer side control program references the global variables for each of the global variables referenced by the referrer side control program.

The schedule-building data 234 includes specifications of procedure execution order necessary to cause the microprocessor 100 to execute owner side initiation processing configured to start execution of the owner side control program, copy processing configured to copy a global variable to be rewritten by the owner side control program from the global variable region to the variable synchronization buffer compatible with this global variable if execution of the owner side control program ends, and referrer side initiation processing configured to start execution of the referrer side control program.

Thus, even if the global variable region is rewritten by the owner side control program during a period from a point in time when execution of the referrer side control program is started to a point in time when its execution is terminated, contents of the variable synchronization buffer referenced by the referrer side control program are not rewritten, so that the referrer side control program can acquire the same value no matter how many times the global variable is referenced, to provide consistent calculations.

f8: Schedule Example 2

Next, a description will be given of schedule example 2 of the first embodiment of the invention.

Figure 21:
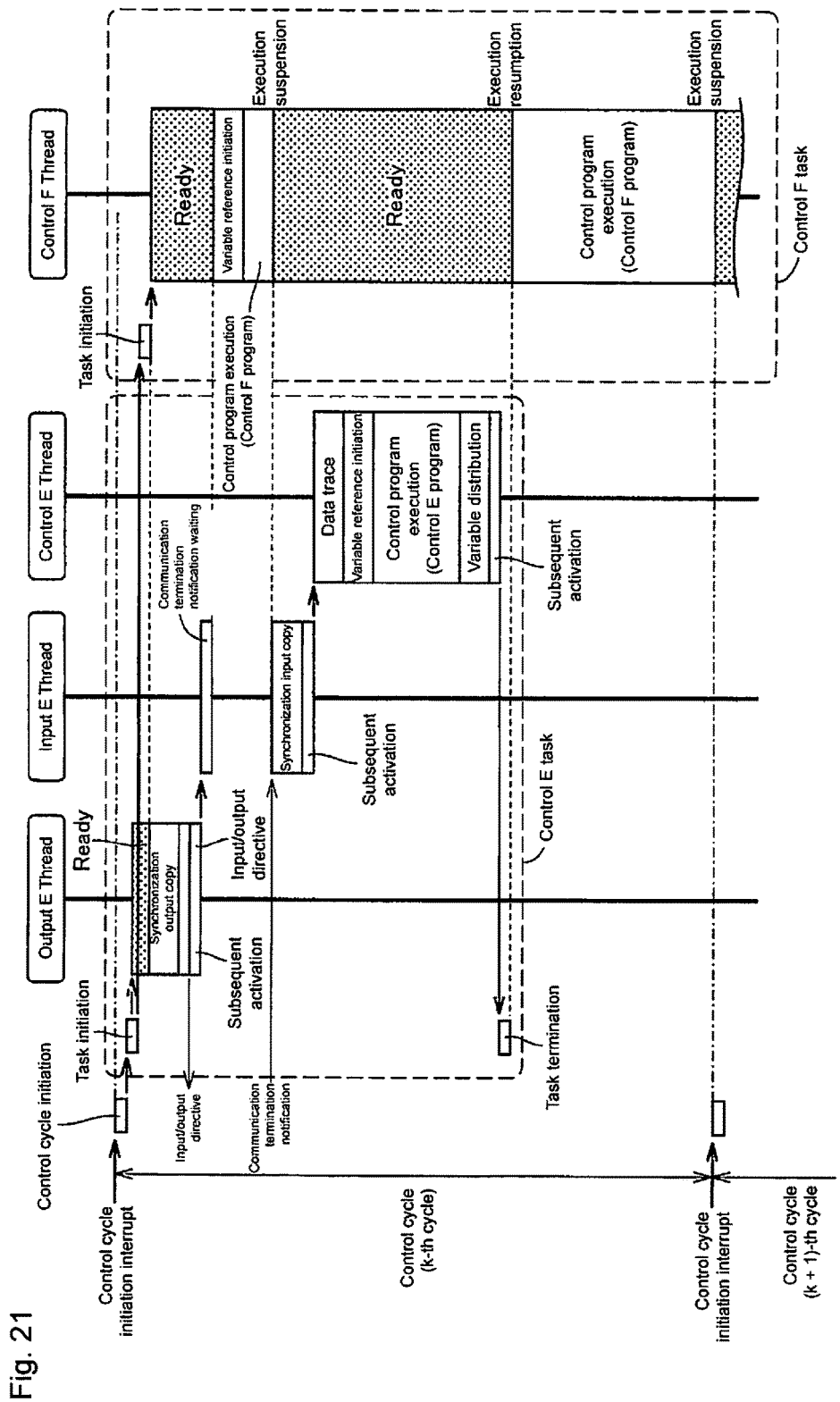
FIG. 21 is a sequence diagram of the k-th cycle in schedule example 2 in the first embodiment of the invention.

FIG. 20 is a table showing the schedule-building data 234 corresponding to schedule example 2 in the first embodiment of the invention. FIG. 21 is a sequence diagram of the k-th cycle in schedule example 2 in the first embodiment of the invention. How the sequence in FIG. 21 is generated from the schedule-building data 234 in FIG. 20 is obvious from schedule example 1, so that no detailed description is given to a relationship between the schedule-building data 234 in FIG. 20 and the sequence in FIG. 21.

Schedule example 2 is different from schedule example 1 described above in that an input/output thread (input/output A thread in schedule example 1) is subdivided into an output thread (output E thread) and an input thread (input E thread). Further, schedule example 2 is different from the case of the control B thread in schedule 1 in that a control F task is specified in conditions for starting a control F thread, so that the control F thread is activated by the task initiation procedure for the control F task. In a case where the control F thread does not use input data, termination of the control F thread can be accelerated by starting execution of the control F thread while waiting for a communication termination notification of an input E thread without waiting for the termination of the input E thread in such a manner.

A description will be given of a respect of schedule example 2 that the output E thread and the input E thread are provided independently of each other. Consider a case, for example, where if an EtherCAT (trademark) product is used as a field network, a frame transmitted in the k-th cycle is lost due to the influence of noise while being transmitted through the network and, therefore, has failed to reach the CPU unit 13 after going around the network. In schedule examples 1 and 2, due to occurrence of no communication termination notification, the phenomenon of cycle overrun occurs in which the control A task or the control E task fails to end in the k-th cycle.

In such a case, if the number of the input/output threads is one as in the case of schedule example 1, the communication termination notification is further awaited in the (k+1)-th cycle, and if the frame itself is lost over the network, an error finally occurs owing to an excess of cycle overrun allowance count. However, in schedule example 2, the (k+1)-th cycle falls into condition "the execution cycle count upon count-up is in excess of an execution cycle period (n) and the task ending flag is off" to be described about the task initiation procedure in FIG. 11A". Therefore, the task initiation procedure in the (k+1)-th cycle activates the output E thread specified as a target of subsequent activation. Therefore, a new frame is transmitted, and if the frame goes around the network and returns, it is possible to continue processing of communication termination notification for the input E thread and the subsequent shown in FIG. 21.

In a case where a field network of such a type of the frame going around the network is employed, the output thread and the input thread can be separated from each other as in the case of the present schedule example, to easily continue a constant-cycle network communication even if the frame is lost over the network.

f9: Schedule Example 3

Next, a description will be given of schedule example 3 of the first embodiment of the invention.

Figure 23:
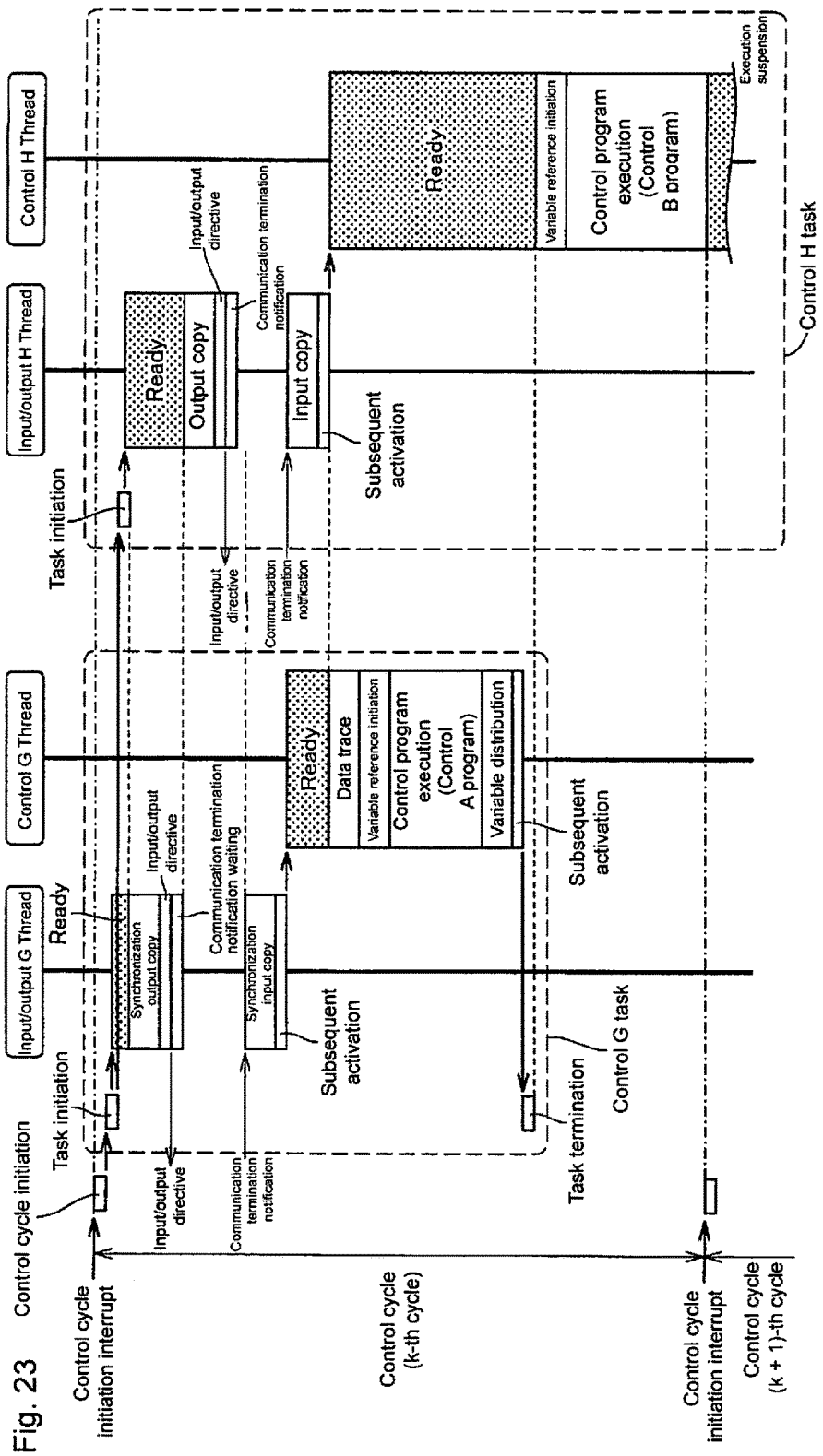
FIG. 23 is a sequence diagram of the k-th cycle in schedule example 3 in the first embodiment of the invention.
Figure 24:
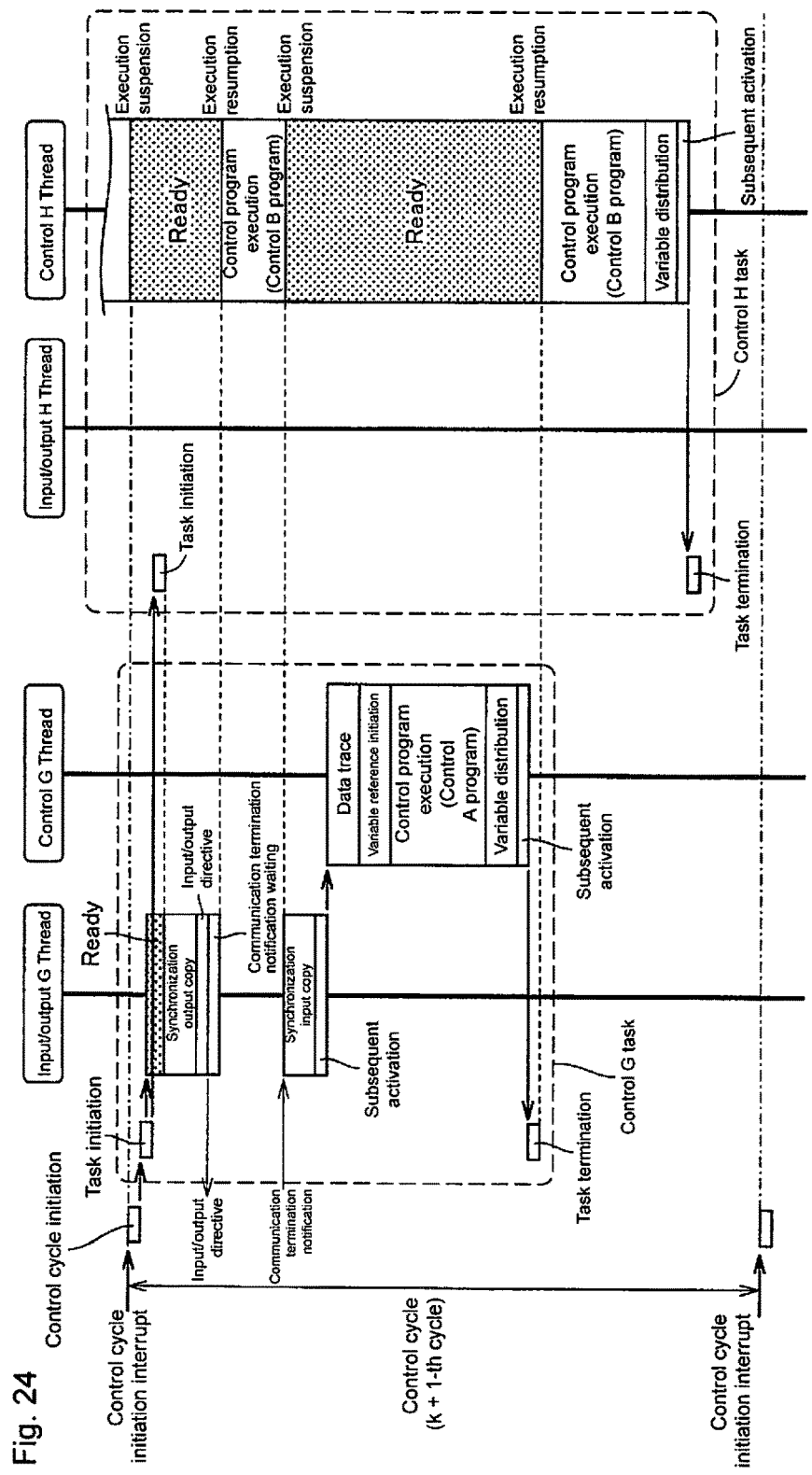
FIG. 24 is a sequence diagram of the (k+1)-th cycle in schedule example 3 in the first embodiment of the invention.

FIG. 22 is a table showing the schedule-building data 234 corresponding to schedule example 3 in the first embodiment of the invention. FIG. 23 is a sequence diagram of the k-th cycle in schedule example 3 in the first embodiment of the invention. FIG. 24 is a sequence diagram of the (k+1)-th cycle in schedule example 3 in the first embodiment of the invention. How the sequences in FIGS. 23 and 24 are generated from the schedule-building data 234 in FIG. 22 is obvious from schedule example 1, so that no detailed description is given to a relationship between the schedule-building data 234 in FIG. 22 and the sequences in FIGS. 23 and 24.

Schedule example 3 is different from schedule example 1 described above in that schedule example 3 has a long execution cycle period and an input/output thread (input/output H thread) is included also in a control task H (which corresponds to the control task B in schedule example 1), which has a low priority of the control thread included in schedule example 3.

An input/output G thread governs all of inputs/outputs required by the control A program of the control G thread and some of inputs/outputs required by the control program B of a control H thread by using, for example, a field network. The input/output H thread governs the other inputs/outputs required by the control B program of the control H thread by using, for example, a PLC system bus 11.

The input/output G thread uses the synchronization output copy procedure and the synchronization input copy procedure, whereas the input/output H thread performs input/output operations necessary for the control H threads belonging to the same task and, therefore, only uses an output copy procedure and an input copy procedure which make no decision about the number of execution cycles for each task (the procedures themselves have no function to be synchronized with execution cycles of any other tasks).

The input/output processing may thus be executed in a task having a prolonged execution cycle period. Further, a task may be given in which only the input/output processing is executed. By building a schedule such that the input/output processing may be executed using a period necessary for the control program 230 for its execution in accordance with the respective pieces of input data and output data, it is possible to avoid wasting communication time communicating a large amount of the data at a high frequency uselessly.

f10: Schedule Example 4

Next, a description will be given of schedule example 4 of the first embodiment of the invention.

Figure 26:
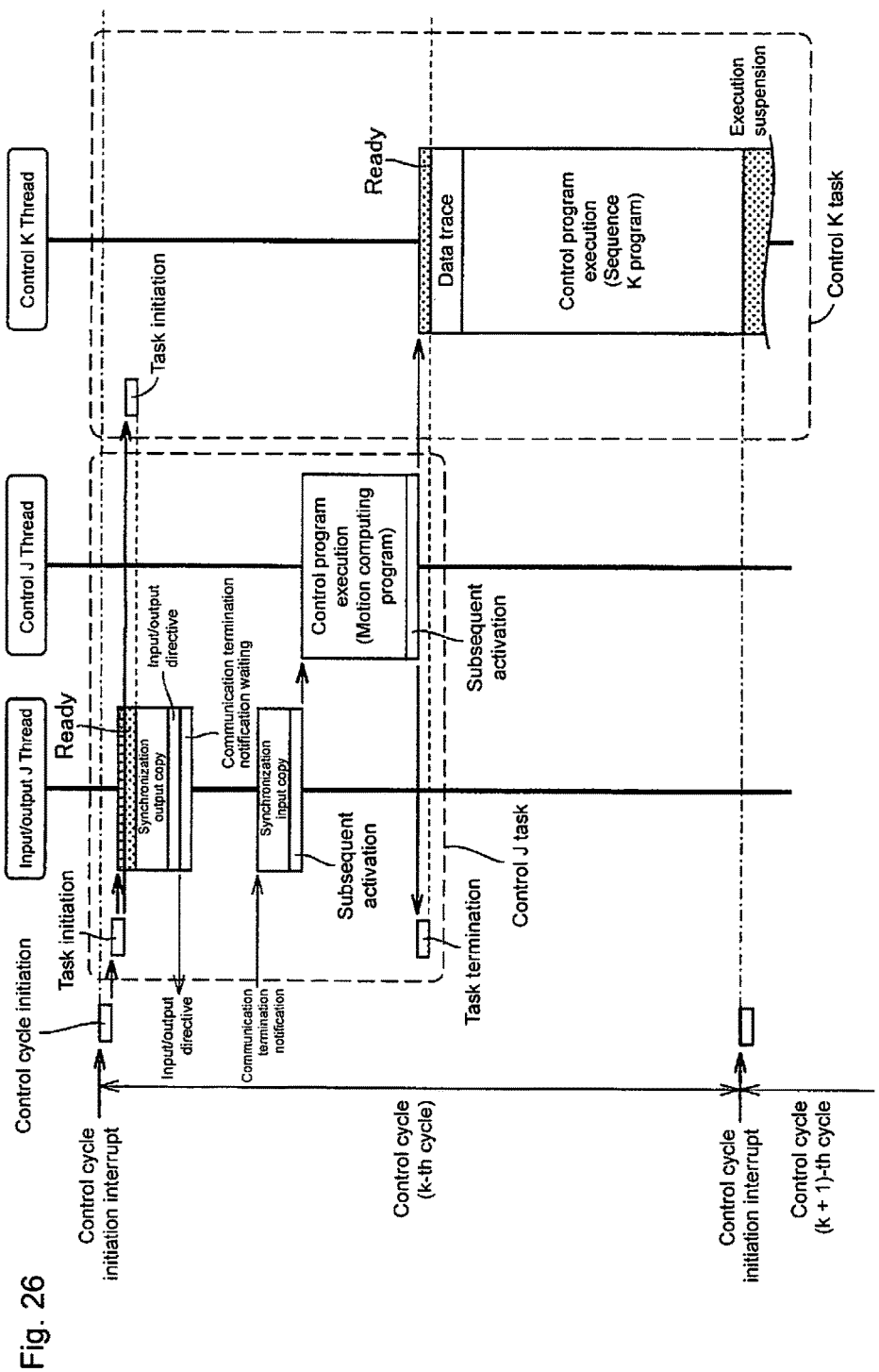
FIG. 26 is a sequence diagram of the k-th cycle in schedule example 4 in the first embodiment of the invention.

FIG. 25 is a table showing schedule-building data 234 corresponding to schedule example 4 in the first embodiment of the invention. FIG. 26 is a sequence diagram of the k-th cycle in schedule example 4 in the first embodiment of the invention. FIG. 27 is a sequence diagram of the (k+1)-th cycle in schedule example 4 in the first embodiment of the invention. How the sequences in FIGS. 26 and 27 are generated from the schedule-building data 234 in FIG. 25 is obvious from schedule example 1, so that no detailed description is given to a relationship between the schedule-building data 234 in FIG. 25 and the sequences in FIGS. 26 and 27.

Schedule example 4 is different from schedule example 1 described above in that the control program executed in a control J thread is a motion computing program and includes no sequence program and a sequence program created in compliance with a user's control purpose is executed only in a control K thread. Further, schedule example 4 is different from schedule example 1 also in that if the sequence program is executed only in the control K thread, a data trace procedure is also executed along with it in the control K thread and the variable distribution procedure and the variable reference initiation procedure are not used because global variables need not be synchronized between a plurality of the sequence programs.

Only the motion computing program is executed as a control program in the control J thread because "motion computing program" is specified in "Control program specification" in FIG. 25(4). In FIG. 25(6), "sequence K program" is specified as a control program to be executed in the control K thread in "Control program specification" and executing motion instructions included in the sequence K program in "control J thread" is specified in "Motion thread specification".

For example, if a motion instruction which says "move from coordinate X1 to coordinate X2 at speed V" is executed in the sequence K program, in response to it, the motion computing program for the control J thread in the first one of the subsequent control cycles is executed to perform initial computing and the first-time command value calculations necessary to repeatedly calculate position and speed command values to be given from the motion computing program to the servo motor driver hereafter. Then, even if nothing is done by the sequence K program, the motion computing program in the control J thread is executed until operations specified by the motion instructions are completed, to calculate the command values for each control cycle. The shorter the period in which the command values are calculated and output is, the smaller the error in motor motion can be made. By including only the motion computing program in a task whose execution cycle is one control cycle, the control cycle period can be easily set short. From this point of view, schedule example 4 is preferable.

f11: Schedule Example 5

Next, a description will be given of schedule example 5 of the first embodiment of the invention.

Figure 29:
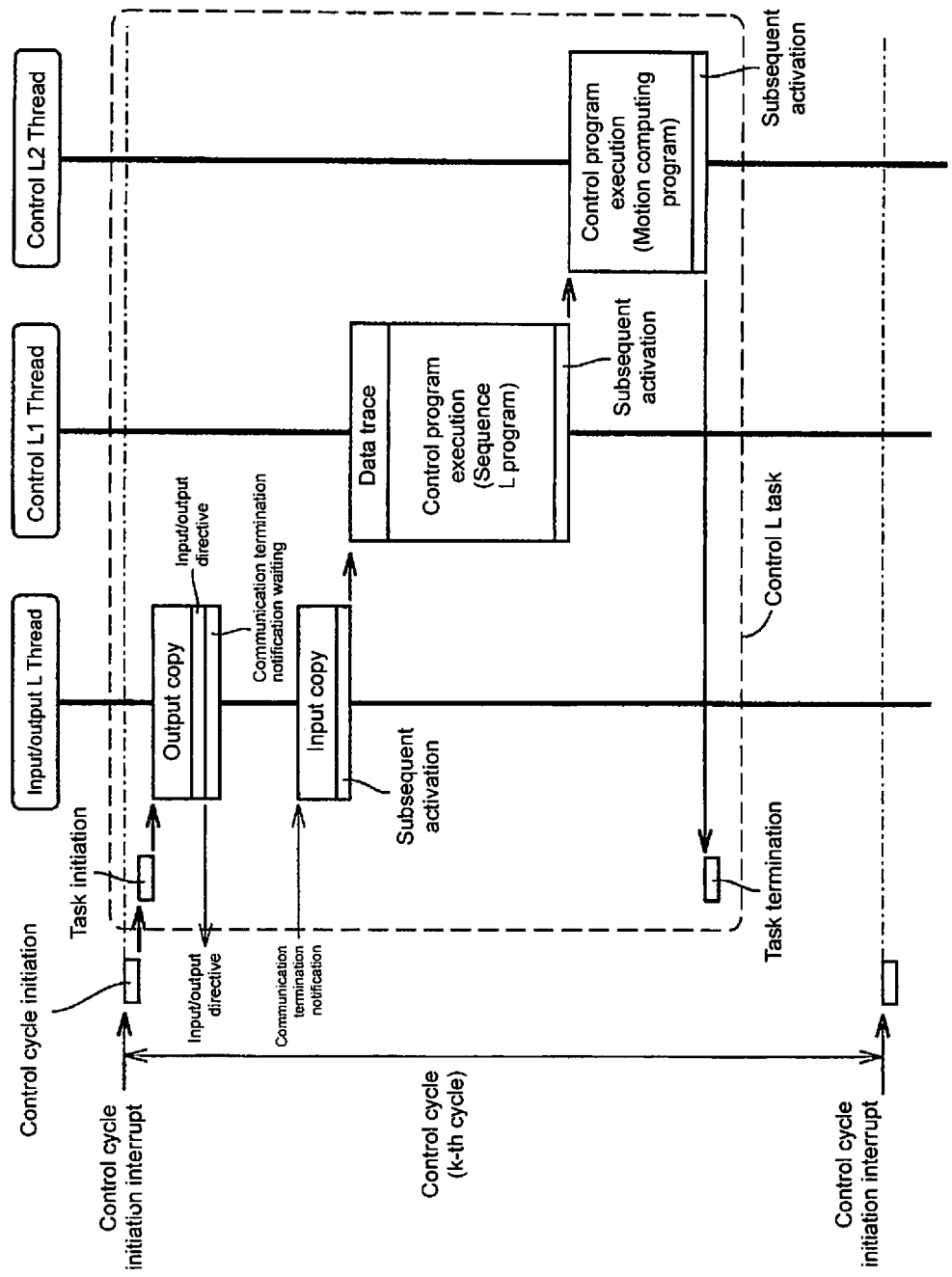
FIG. 29 is a sequence diagram of the k-th cycle in schedule example 5 in the first embodiment of the invention.

FIG. 28 is a table showing schedule-building data 234 corresponding to schedule example 5 in the first embodiment of the invention. FIG. 29 is a sequence diagram of the k-th cycle in schedule example 5 in the first embodiment of the invention. How the sequence in FIG. 29 is generated from the schedule-building data 234 in FIG. 28 is obvious from schedule example 1, so that no detailed description is given to a relationship between the schedule-building data 234 in FIG. 28 and the sequence in FIG. 29.

Schedule example 5 is different from schedule example 1 described above in that in a control L task whose execution cycle period includes one control cycle, an input/output L thread, a control L1 thread, and a control L2 thread are executed. The control program to be executed in the control L1 thread is a sequence L program but the motion computing program is not executed in the control L1 thread. The control program to be executed in the control L2 thread is only the motion computing program which is executed in accordance with motion instructions included in the sequence L program.

Schedule example 5 has characteristics that the input/output processing, the sequence program (user program) which includes the motion instructions, and the motion computing program are repeatedly executed in this order. The motion computing program, once started to be repeatedly executed in accordance with the motion instructions, can run without involving the sequence program until operations specified by the motion instructions are completed. However, there are some cases where before the operations specified by the motion instructions are completed, contents of the instructions to the motion computing program may be changed depending on the results of computing by the sequence program by use of new input data. In such a case, in the very schedule having the characteristics described above, it is possible to shorten a period of time from a point in time when input data is applied, via a point in time when sequence calculations are performed using the input data, to a point in time when the instructions on changes in operation are sent to the motion computing program and motion command values in which the instruction changes are reflected are output. Further, it is also possible to shorten a period of time from a point in time when input data configured to establish conditions for executing motion instructions is input to a point in time when the first motion command value to comply with the motion instructions is output.

Almost the same effects can be obtained also in a case where in schedule example 1 the control A program includes a sequence program and a motion computing program which is subsequently executed.

Characteristics of the CPU unit 13 having the processing order described above can be summarized as follows.

The control program 230 includes the motion computing program 234 configured to compute motion command values necessary to control motions of the motor and the user program 236 which is created in compliance with a user's control purpose and includes processing configured to supply the motion computing program 234 with instructions necessary for execution of the motion computing program 234.

The schedule-building data 234 includes specifications of procedure execution order necessary to cause the CPU unit 13 in the PLC 1 to repeatedly perform output data transmission and input data reception by use of a communication circuit (PLC system bus controller 120 and/or field network controller 140), execution of the user program 236, and execution of the motion computing program 234 in this order. However, order in which the output data transmission and the input data reception are performed is disregarded.

f12: Schedule Example 6

Next, a description will be given of schedule example 6 of the first embodiment of the invention. In schedule example 6, a case is shown in which a total of three threads are executed, namely an input/output P thread, a control P thread, and a control Q thread.

Figure 30:
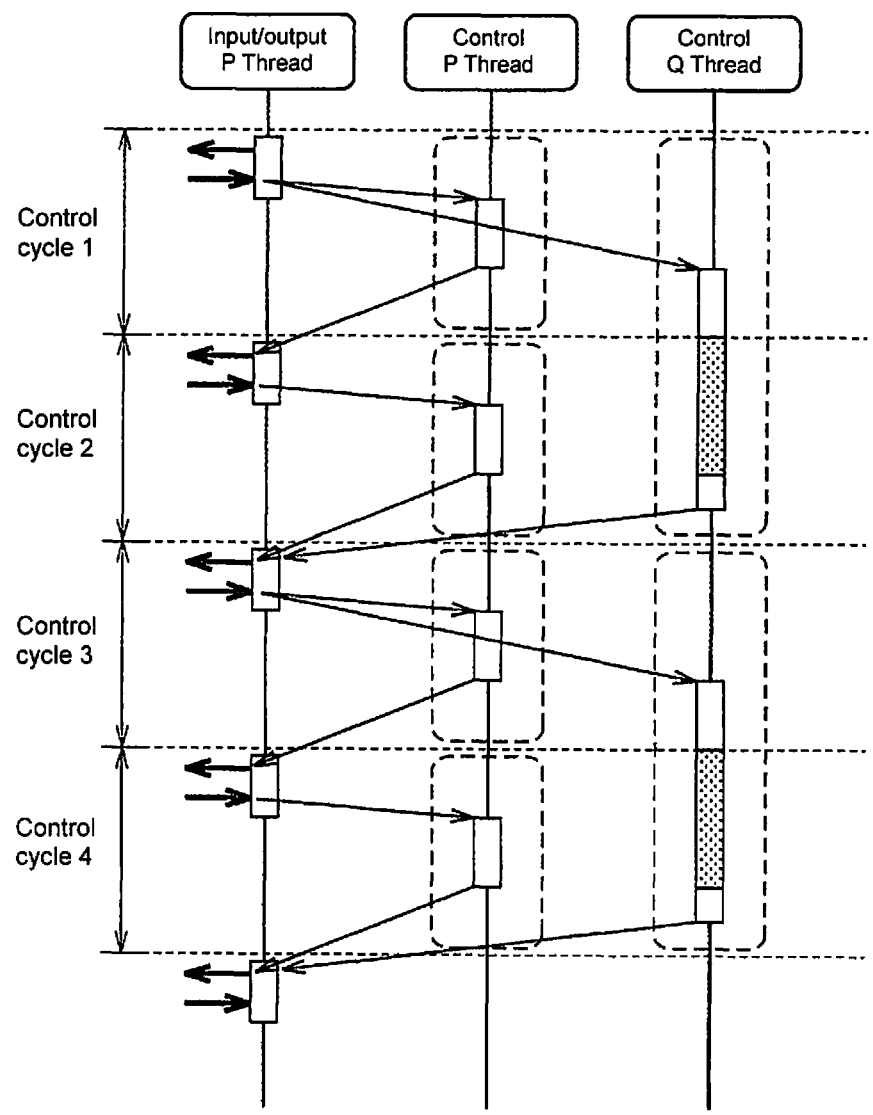
FIG. 30 is a sequence diagram corresponding to schedule 6 in the first embodiment of the invention.

FIG. 30 is a sequence diagram corresponding to schedule 6 in the first embodiment of the invention. It is supposed that as shown in FIG. 30 the input/output P thread and the control P thread are included in a task whose execution cycle period includes one control cycle and the control Q thread is included in a task whose execution cycle period includes two control cycles. It is also supposed that a first control program 230-1 to be executed in the control P thread and a second control program 230-2 to be executed in the control Q thread both include the motion computing program 234. It is further supposed that at least one of the first control program 230-1 and the second control program 230-2 includes the user program 236 which includes motion instructions.

In FIG. 30, arrows which extend from the input/output P thread toward the control P thread and the control Q thread respectively show the flow of input data. Specifically, the flow represents input data copy by the synchronization input copy procedure. In a case where the first control program 230-1 and/or the second control program 230-2 include the user program 236, the input data includes input data to be used by the user program 236 as well as, in some cases, input data to be used by the motion computing program 234 (the motion computing program 234 may perform computing without using input data in some cases).

Similarly, in FIG. 30, arrows which extend respectively from the control P thread and the control Q thread toward the input/output P thread show the flow of output data. Specifically, the flow represents output data copy by the synchronization output copy procedure. In a case where the first control program 230-1 and/or the second control program 230-2 include the user program 236, the output data includes output data generated by the user program 236 as well as, in some cases, motion command value data generated by the motion computing program 234 during a period when the motion computing program 234 is in the activated state (namely, calculates a command value each time it is executed).

Figure 31:
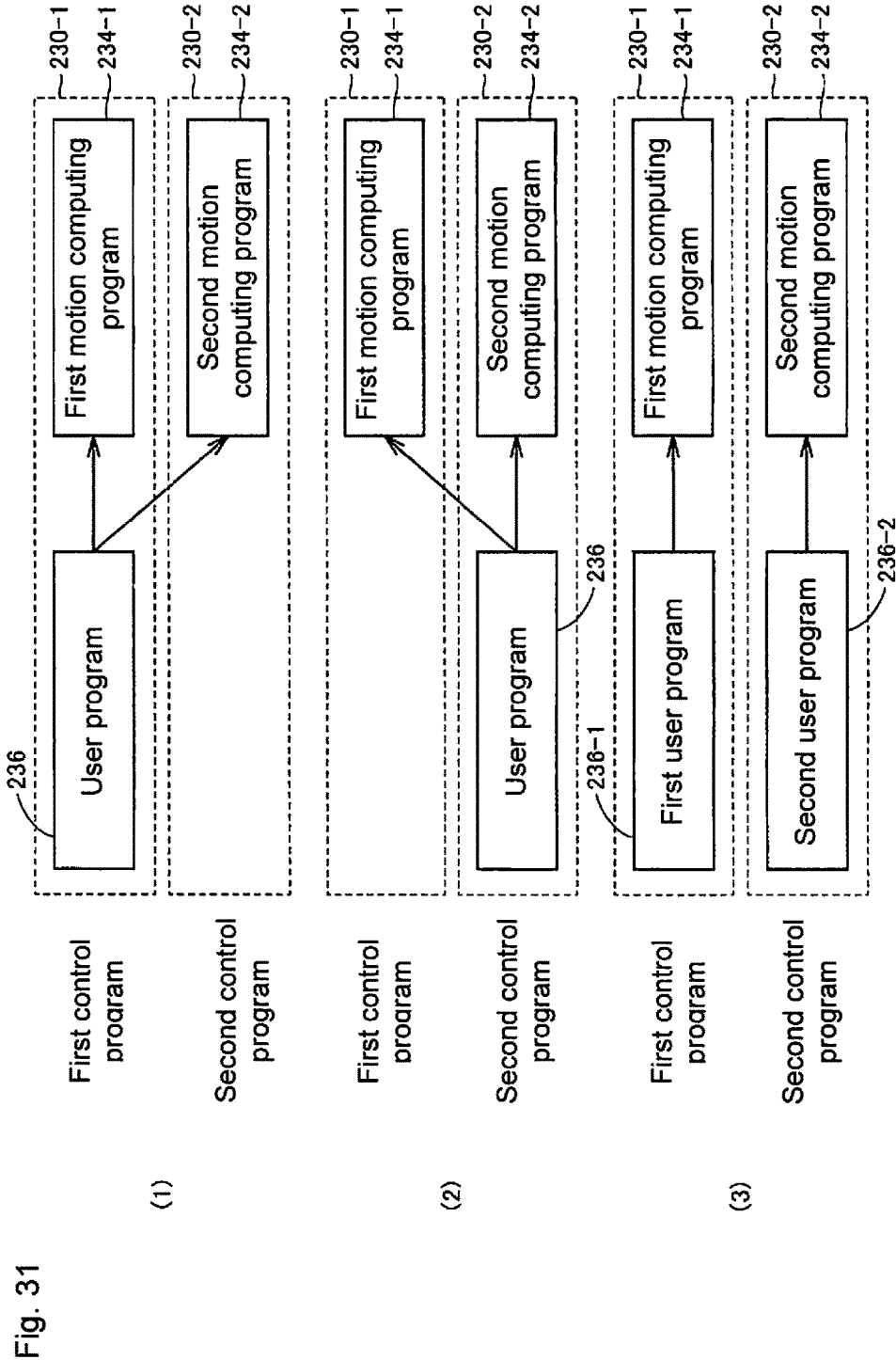
FIG. 31 is an explanatory schematic diagram of a program configuration and an instruction flow in a control program in schedule example 6 in the first embodiment of the invention.

FIG. 31 is an explanatory schematic diagram of a program configuration and an instruction flow in a control program in schedule 6 in the first embodiment of the invention. In FIG. 31, an example of variations of the user program 236 which may be included in the first control program 230-1 and the second control program 230-2 is shown. That is, FIG. 31(1) shows an example where only the first control program 230-1 has the user program 236, FIG. 31(2) shows an example where only the second control program 230-2 has the user program 236, and FIG. 31(3) shows an example where the first control program 230-1 and the second control program 230-2 both have the user program 236.

In FIG. 31, an arrow which extends from the user program 236 (a first user program 230-1 or a second user program 236-2 in FIG. 31 (3)) toward the motion computing program 234 (a first motion computing program 234-1 or a second motion computing program 234-2) shows the flow of directives necessary for execution of the motion computing program 234. For example, in the user programs 236, the directives are described as input parameters (input constants or input variables) to a motion function block (motion instruction) configured to define the contents of motion control. The input parameters are given to the motion computing program 234 if the motion function block is executed because conditions for starting motion control are met as the user program 236 is executed.

In a case where the control program includes the user program 236 and the motion computing program 234, either the user program 236 or the motion computing program 234 may be executed earlier than the other. The user program 236 should preferably be executed first because results of the execution of the user program 236 can be reflected rapidly in the execution of the motion computing program 234. If the motion computing program 234 is executed first, results of the execution of the user program 236 are reflected in the execution of the motion computing program 234 in the next execution cycle.

A description will be given of an aspect in which the user program 236 is included only in the first control program 230-1 with reference to FIG. 31(1). An example shown in FIG. 31(1) can be employed in a case where the user program 236 configured to give directives to both of the first motion computing program 234-1 and the second motion computing program 234-2 and the first motion computing program 234-1 can be executed in a desired control cycle time.

That is, in the example shown in FIG. 31(1), the first control program 230-1 includes the user program 236 which includes instructions supplying the first motion computing program 234-1 with directives necessary for its execution and instructions supplying the second motion computing program 234-2 with directives necessary for its execution.

According to the example shown in FIG. 31(1), it is possible to give new directives from the user program 236 in any execution cycle of the first motion computing program 234-1. Therefore, directives for changes in motion of the running motor can be rapidly reflected in motion control. The directives given to the second motion computing program 234-2 halfway through the execution cycle of the second motion computing program 234-2 are reflected in the next execution cycle of the second motion computing program 234-2. Moreover, according to the example shown in FIG. 31(1), the user programs 236 can be consolidated into one and, therefore, can be designed easily.

A description will be given of an aspect in which the user program 236 is included only in the second control program 230-2 with reference to FIG. 31(2). An example shown in FIG. 31(2) is suitable for use in a case where a lapse of time that can be assigned to the user program 236 for its execution, namely a lapse of time obtained by excluding the execution time of the first motion computing program 234-1 from the lapse of time of a desired control cycle is small.

That is, in the example shown in FIG. 31(2), the second control program 230-2 includes the user program 236 which includes instructions supplying the first motion computing program 234-1 with directives necessary for its execution and instructions supplying the second motion computing program 234-2 with directives necessary for its execution.

According to the example shown in FIG. 31(2), it is possible to shorten the control cycle time to a lapse of time just long enough to execute the first motion computing program 234-1. In this case, directives from the user program 236 to the first motion computing program 234-1 can be given only in an execution cycle period of the second control program 230-2. However, once having received from the user program 236 a directive which says, for example, "move from coordinate X1 to coordinate X2 at speed V" and entered the activated state, the motion computing program 234 can calculate motion command value data for each control cycle without any directives from the user program 236 until execution of the directive is completed. Therefore, in a case where it is unnecessary to give a directive configured to stop motor motions or change them to any other motions halfway through the execution of the directive for the purpose of rapid response, there is no problem if an aspect shown in FIG. 31(2) is employed. Moreover, according to an example shown in FIG. 31(2), the user programs 236 can be consolidated into one and, therefore, can be designed easily.

A description will be given of an aspect in which the first user program 236-1 is included in the first control program 230-1 and the second user program 236-2 is included in the second control program 230-2 with reference to FIG. 31(3).

That is, in an example shown in FIG. 31(3), the user program 236 is made up of the first user program 236-1 which includes instructions supplying the first motion computing program 234-1 with directives necessary for its execution and the second user program 236-2 which includes instructions supplying the second motion computing program 234-2 with directives necessary for its execution According to the example shown in FIG. 31(3), the first user program 236-1 included in the first control program 230-1 need not execute processing related to supply of the directives to the second motion computing program 234-2, to enable shortening the execution lapse of time comparatively. Therefore, it is possible to comparatively shorten the control cycle time which serves as a lapse of time in which the first user program 236-1 and the first motion computing program 234-1. Moreover, it is possible to supply new directives from each of the first user program 236-1 and the second user program 236-2 in any execution cycles of the first motion computing program 234-1 and the second motion computing program 234-2.

Characteristics of the CPU unit 13 that employs a schedule in which the motion computing program 234 is included in a plurality of the control programs as in schedule example 6 described above can be summarized as follows.

The communication circuits (PLC system bus controller 120 and/or field network controller 140) transmit output data and receive input data in a period of the control cycle. The control program 230 includes the first control program 230-1 and the second control program 230-2.

The first control program 230-1 includes the first motion computing program 234-1 configured to generate first motion command value data necessary to control motor motions. The second control program 230-2 includes the second motion computing program 234-2 configured to generate second motion command value data necessary to control motor motions. At least one of first control program 230-1 and the second control program 230-2 includes the user program 236 (first user program 236-1 or second user program 236-2) which is created in compliance with a user's control purpose and includes instructions supplying the first motion computing program 234-1 and the second motion computing program 234-2 with directives necessary for their execution.

The schedule-building data 234 causes the microprocessor 100 to start execution of the first control program 230-1 for each first execution cycle having the same period as that of the control cycle and start execution of the second control program 230-2 for each second execution cycle having twice or a larger integral multiple of the period of the control cycle. Further, the schedule-building data 234 includes specifications of procedure execution order necessary to cause the microprocessor 100 to start execution of the second control program 230-2 after execution of the first control program 230-1 ends in a control cycle in which the second execution cycle starts and, if the second control program 230-2 does not ends before the control cycle ends, start execution of an unexecuted portion of the second control program 230-2 after execution of the first control program 230-1 ends in the next control cycle.

Thus, in the PLC 1 having motion control function, it is possible to reserve execution cycles having a comparatively short period for some motion control processing pieces that need high-speed processing and, at the same time, execute the other motion control processing pieces at a constant cycle.

For example, in the case of controlling a processing machine configured to cut work pieces, it is possible to execute, at a short cycle, motion control processing that needs high-speed, high-precision control such as control on movements of a cutting tool and also execute at a certain frequency the motion control processing that need not be of high speed relatively as in the case of carrying-in and carrying-out of work pieces with respect to the processing machine.

f13: Schedule Example 7

Next, a description will be given of schedule example 7 of the first embodiment of the invention.

Figure 33:
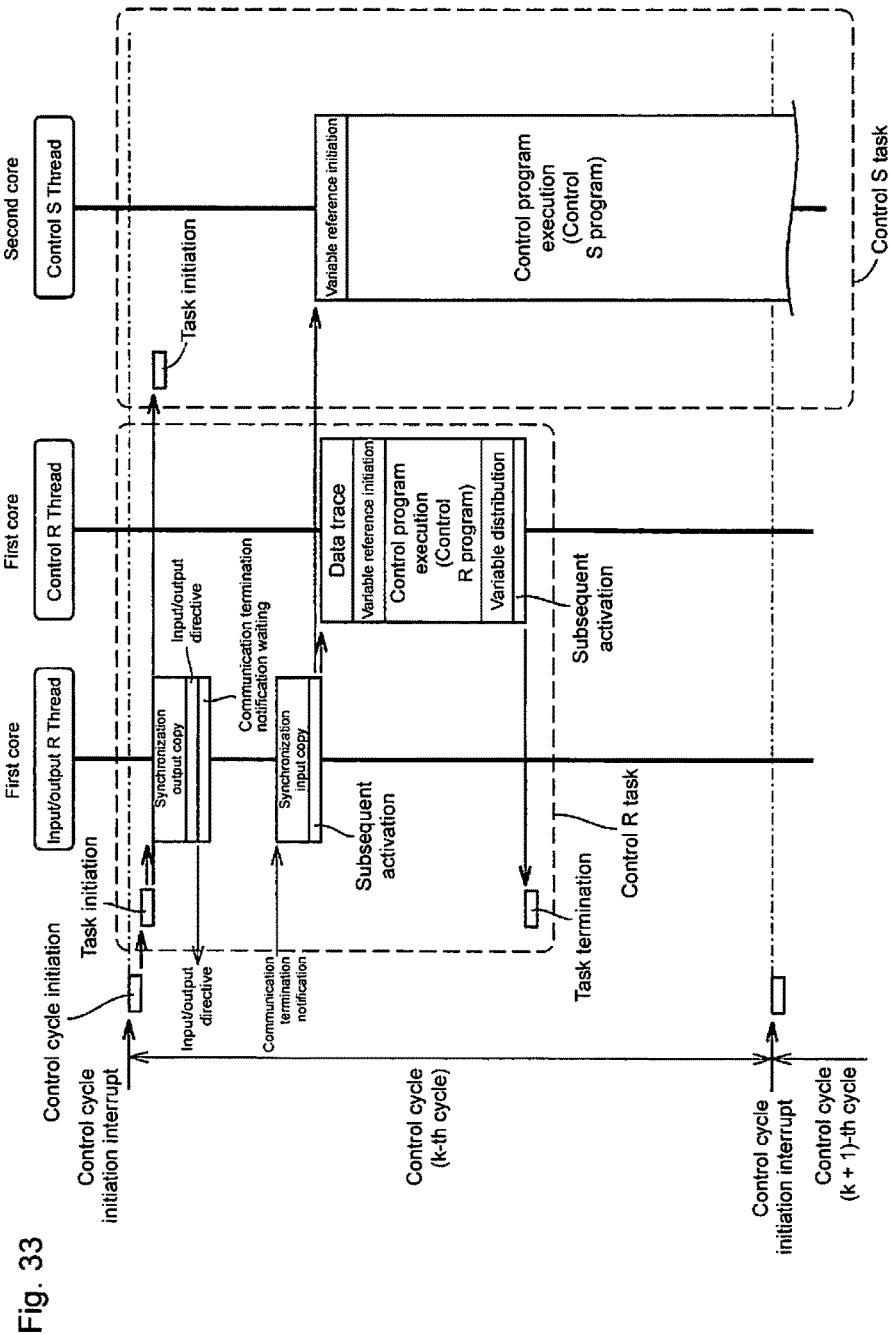
FIG. 33 is a sequence diagram of the k-th cycle in schedule example 7 in the first embodiment of the invention.
Figure 34:
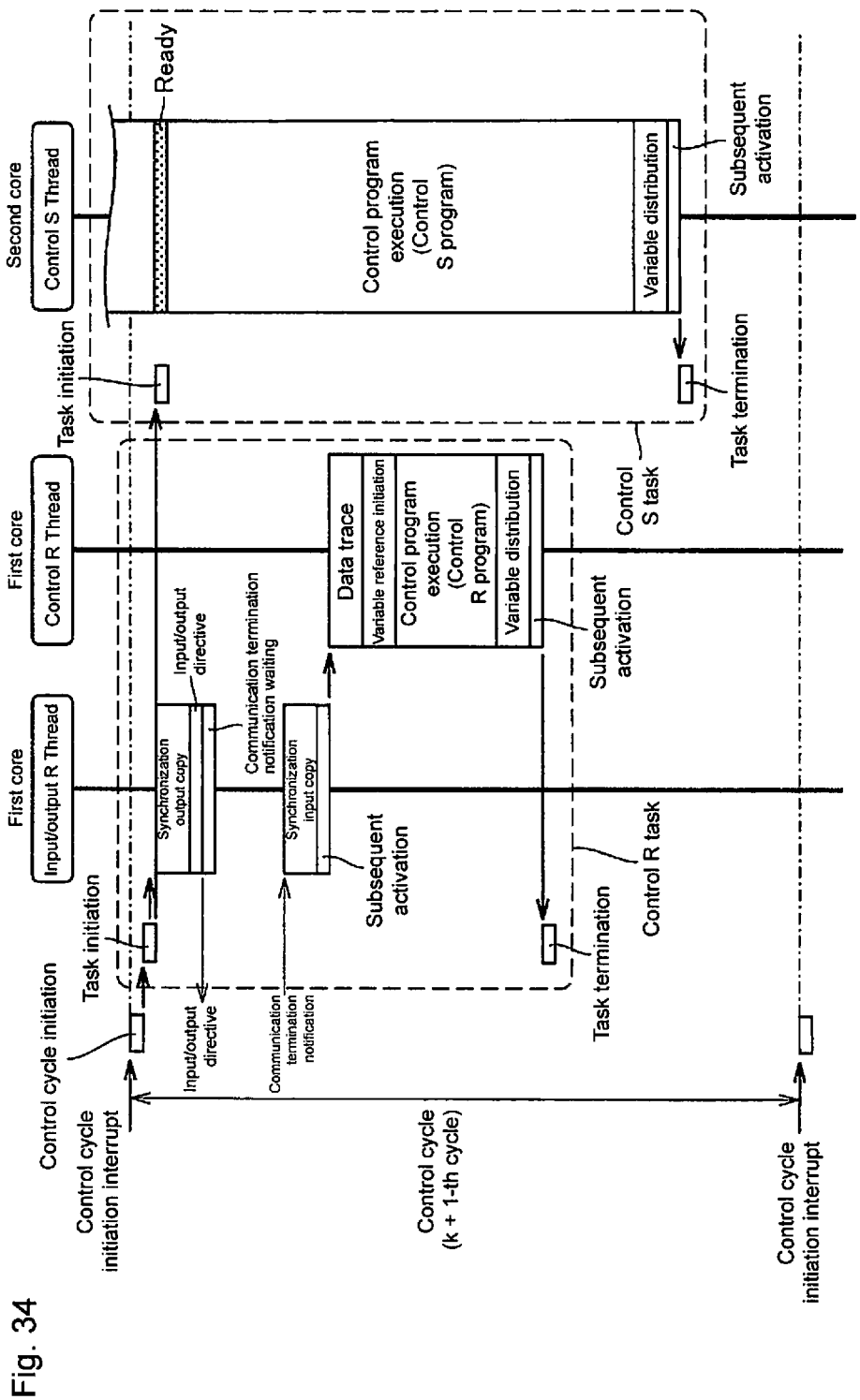
FIG. 34 is a sequence diagram of the (k+1)-th cycle in schedule example 7 in the first embodiment of the invention.

FIG. 32 is a table showing schedule-building data 234 corresponding to schedule example 7 in the first embodiment of the invention. FIG. 33 is a sequence diagram of the k-th cycle in schedule example 7 in the first embodiment of the invention. FIG. 34 is a sequence diagram of the (k+1)-th cycle in schedule example 7 in the first embodiment of the invention. How the sequences in FIGS. 33 and 34 are generated from the schedule-building data 234 in FIG. 32 is obvious from schedule example 1, so that no detailed description is given to a relationship between the schedule-building data 234 in FIG. 32 and the sequences in FIGS. 33 and 34.

It is supposed that the microprocessor 100 in the CPU unit 13 to which schedule 7 is applied has a plurality of cores including the first core and the second core. At the first core, the control cycle initiation procedure and a control R task are executed, and at the second core, a control S task is executed.

Execution of the control R task is the same as that of the control A task in schedule example 1 except that after the task initiation procedure for the control R task is executed, an input/output R thread enters the run state without waiting for ending of the execution of the task initiation procedure for the control S task.

The control S thread is different from the control B thread in schedule example 1 in that the control S thread enters the run state immediately when activated by the subsequent activation procedure for the input/output R thread and is executed concurrently with the control R thread. Further, the control S thread continues to be executed without suspended by a control cycle initiation interrupt that starts the (k+1)-th cycle. Moreover, the control S thread is executed concurrently also with the input/output R thread in the (k+1)-th cycle.

The control S thread can be executed concurrently also with the input/output R thread in the k-th cycle because it utilizes resources of the second core, whereas the control S thread whose execution starts in the k-th cycle is activated by the subsequent activation procedure for the input/output R thread because it uses input data applied through execution of the input/output R thread in the k-th cycle.

Characteristics of the CPU unit 13 that employs a schedule to be executed in the microprocessor 100 having a plurality of cores described above can be summarized as follows.

The microprocessor 100 has at least the first core and the second core. The control program 230 includes the first control program and the second control program. The schedule-building data 234 includes specifications of procedure execution order necessary to cause the first core to execute the first control program after output data is transmitted and input data is received and the second core to execute the second control program concurrently with the execution of the first control program.

Thus, it is possible to realize high-speed processing by means of concurrent execution of the programs by the microprocessor 100 having the plurality of cores while employing cyclic processing for execution of input/output processing and the control programs, peculiar to the PLC 1.

f14: Schedule Examples 8 and 9

According to the present embodiment, it is possible also to build a schedule similar to that for the conventional and typical PLC 1. Such examples may include schedule examples 8 and 9 described below.

Figure 36:
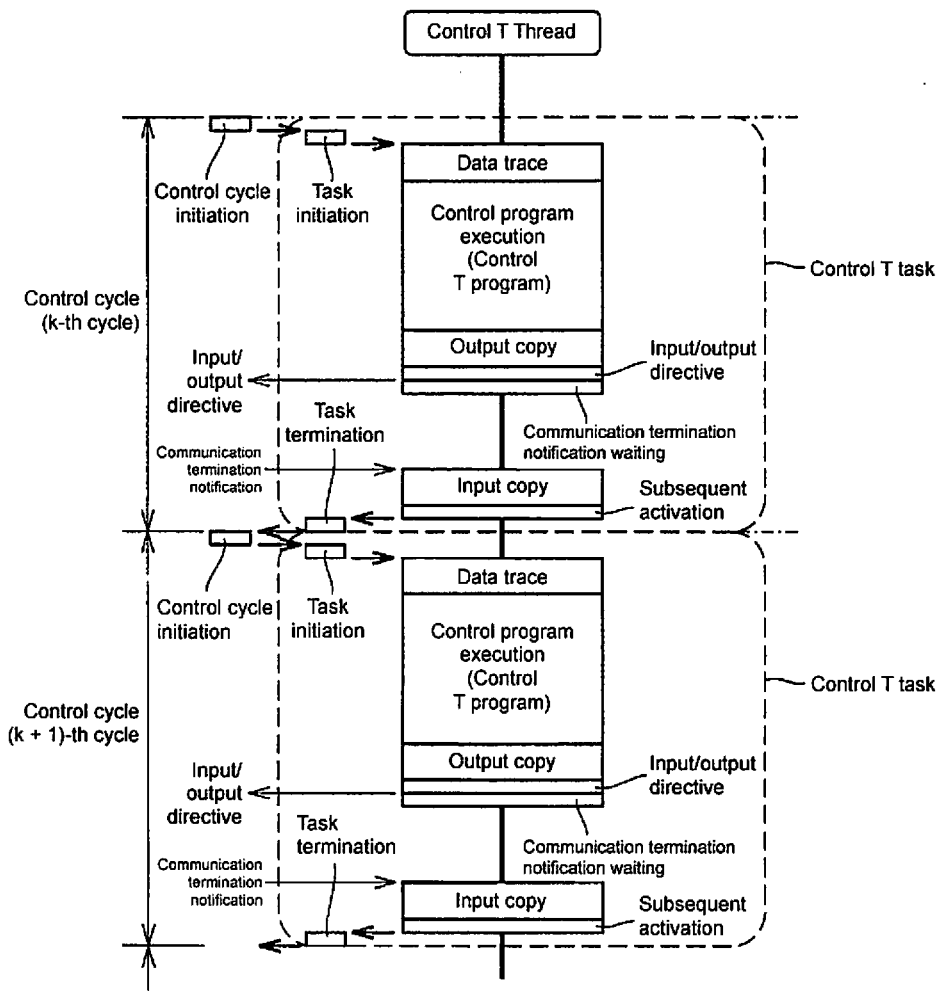
FIG. 36 is a sequence diagram of the k-th cycle and the (k+1)-th cycle in schedule example 8 in the first embodiment of the invention.

FIG. 35 is a table showing schedule-building data 234 corresponding to schedule example 8 in the first embodiment of the invention. FIG. 36 is a sequence diagram of the k-th cycle and the (k+1)-th cycle in schedule example 8 in the first embodiment of the invention. How the sequence in FIG. 36 is generated from the schedule-building data 234 in FIG. 35 is obvious from schedule example 1, so that no detailed description is given to a relationship between the schedule-building data 234 in FIG. 35 and the sequence n FIG. 36.

In schedule example 8, the control program and the input/output processing are executed in a single thread (control T thread). Further, the control cycle initiation interrupt is not utilized, so that if a task of one control cycle ends, immediately the next control cycle is started. This is because in place of "control cycle initiation interrupt", "control T task" is specified in "Control cycle initiation conditions" in FIG. 35(1). Of processing pieces by the system program 210, the processing pieces including processing of communication with the PLC support device 8 other than that shown in FIG. 36 are executed during a communication termination notification waiting time. The other processing pieces by the system program 210 are sometimes referred to as peripheral processing also.

In a variant of schedule example 8, the other processing pieces (peripheral processing pieces) by the system program 210 may be incorporated into the control T thread and executed after, for example, the input copy procedure of each control cycle is executed.

Figure 38:
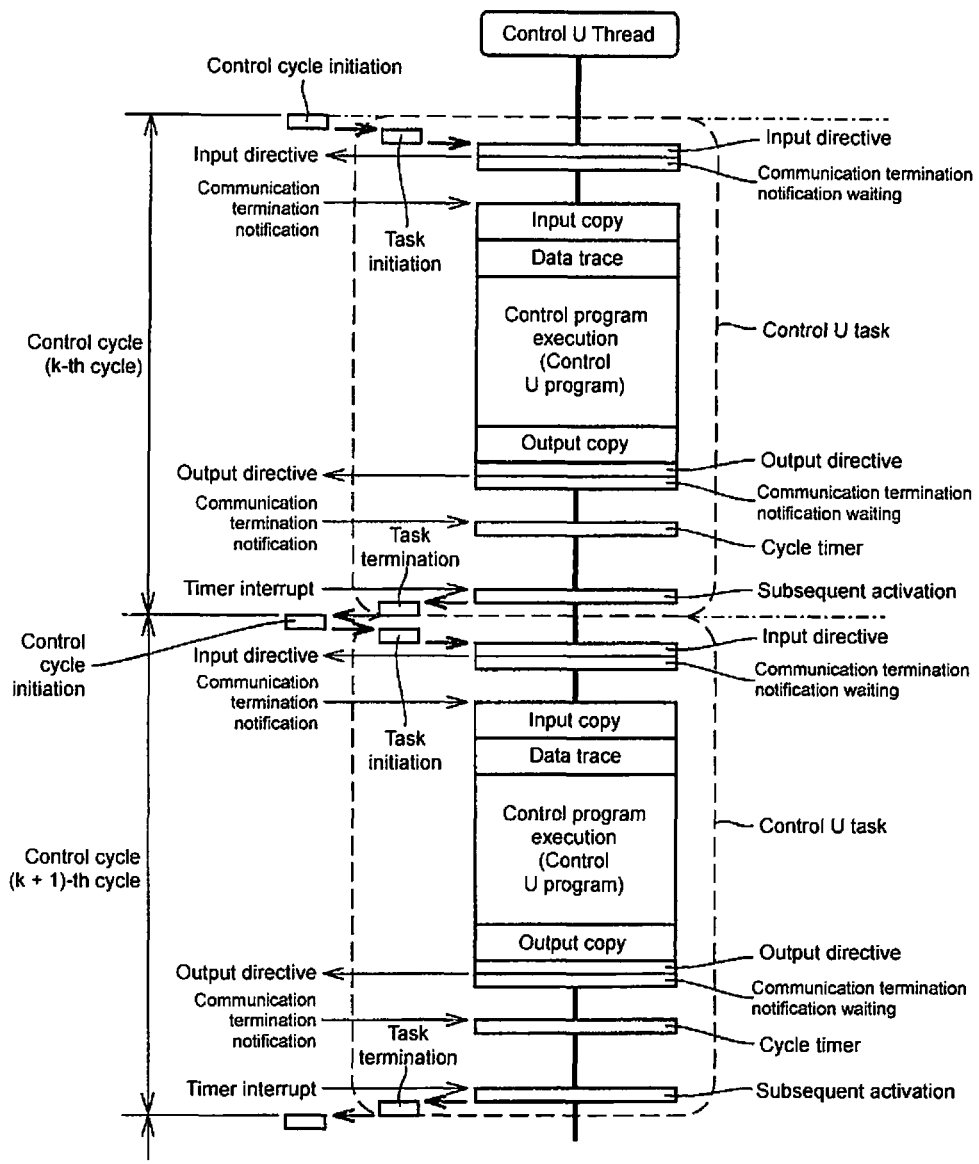
FIG. 38 is a sequence diagram of the k-th cycle and the (k+1)-th cycle in schedule example 9 in the first embodiment of the invention.

FIG. 37 is a table showing schedule-building data 234 corresponding to schedule example 9 in the first embodiment of the invention. FIG. 38 is a sequence diagram of the k-th cycle and the (k+1)-th cycle in schedule example 9 in the first embodiment of the invention. How the sequence in FIG. 38 is generated from the schedule-building data 234 in FIG. 37 is obvious from schedule example 1, so that no detailed description is given to a relationship between the schedule-building data 234 in FIG. 37 and the sequence in FIG. 38.

Although the input/output processing has been executed after execution of the control program in schedule example 8, in schedule example 9, the input processing, the control program execution, and the output processing are executed in this order. Correspondingly, in schedule example 9, in place of the input/output directive procedure, the input directive procedure and the output directive procedure are used.

Moreover, in schedule example 9, after communication termination notification of an output, a cycle timer procedure is executed. As described in FIG. 11B, the cycle timer procedure has a function to acquire a lapse of time that has elapsed after initiation of a control cycle, calculate a remaining time to termination of a control cycle time, set a processor-built-in timer such that a timer interrupt may occur if the calculated remaining time elapses, configure the present thread to be reactivated if the timer interrupt occurs, and halt the present thread (put in the sleep state). If the control cycle time has already elapsed at a point in time when the cycle timer procedure was executed, the cycle timer procedure immediately execute the subsequent activation procedure without setting timer interruption. Different from the case of using control cycle initiation interruption, the execution of a thread is not suspended forcedly as the control cycle time elapses. By using the cycle timer procedure, it is possible to set the control cycle period to roughly a constant time value without using control cycle initiation interruption. The other processing pieces (peripheral processing pieces) by the system program 210 described above are executed in an input/output communication termination notification waiting time and a timer interrupt waiting time that is set by the cycle timer procedure.

G. Second Embodiment

The first embodiment has been described with reference to the method of using the mechanism of building a schedule having the hierarchy structure of tasks and threads. In contrast, a second embodiment will be described with reference to a method of building a schedule by using threads but not tasks.

In the second embodiment, in preparatory processing (step S1 in FIG. 7) by system program 210 for control actions by a PLC 1, for each thread, a storage section (main memory 104 etc.) is provided with a storage region configured to store a thread execution cycle count, a thread ending-flag storage region, a storage region configured to store a thread execution count, and a storage region configured to store a thread execution time.

FIGS. 39A and 39B are table-format views showing set thread items prepared in the second embodiment of the invention and explanations of the set thread items. The period setting shown in the set item of task initiation conditions among those of tasks in the first embodiment shown in FIG. 8 is shifted to a set item of thread initiation conditions in the second embodiment shown in FIGS. 39A and 39B. Further, the cycle overrun allowance count of the set item of tasks in the first embodiment is shifted to a set item of threads in the second embodiment.

FIGS. 40A and 40B are tables showing names and functions of procedures prepared in the second embodiment of the invention. For a control cycle initiation procedure, set items and their descriptions are also shown in FIGS. 40a and 40B. In the second embodiment also, the procedures following the subsequent activation procedure in FIG. 11A are prepared but have the same contents as those in FIGS. 11A and 11B, so that their repetitive illustration will be omitted.

The functions of the task initiation procedure and the functions of the task termination procedure in the first embodiment are essentially shifted to the control cycle initiation procedure and a thread termination procedure respectively in the second embodiment.

Figure 42:
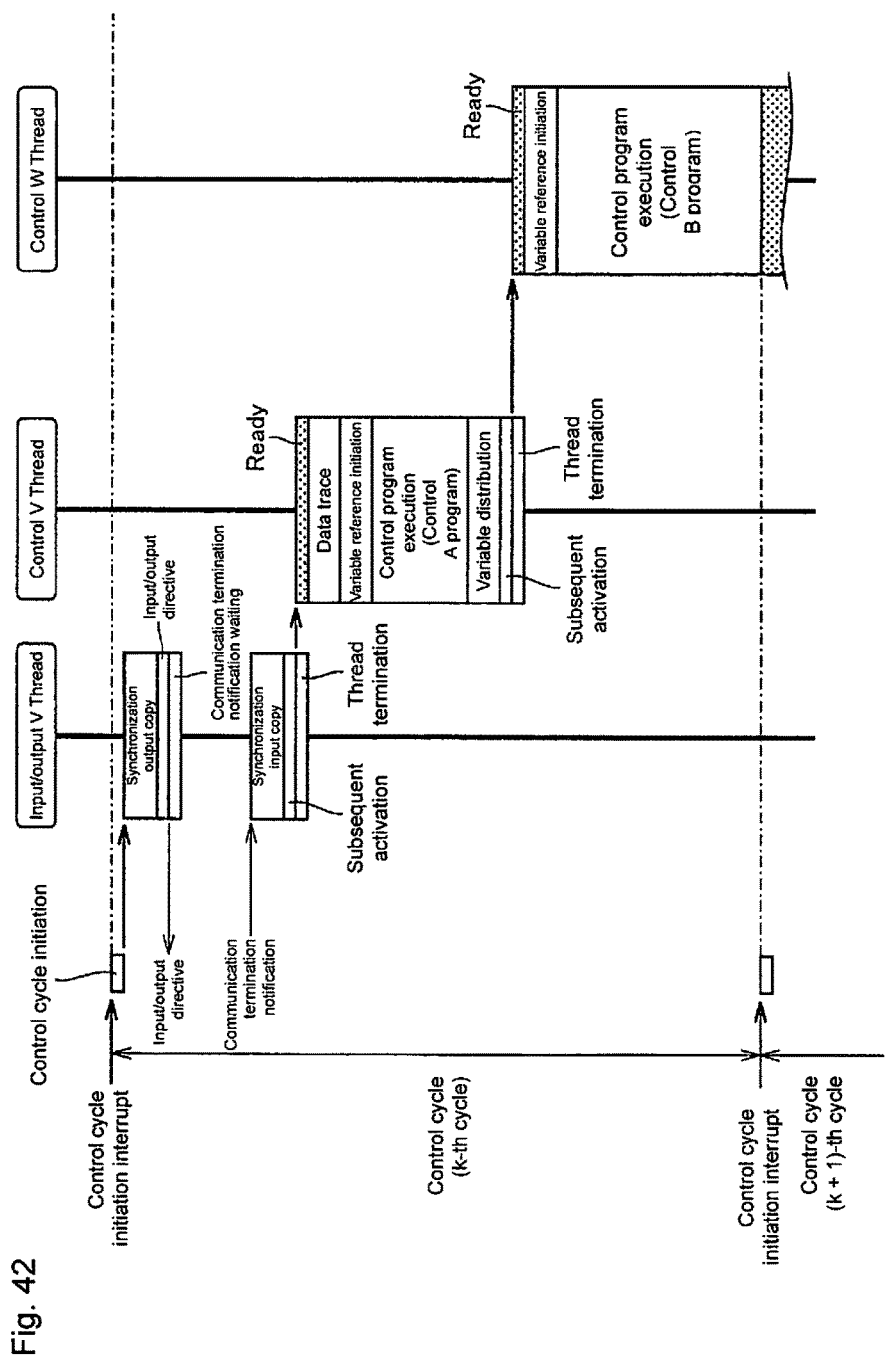
FIG. 42 is a sequence diagram of the k-th cycle in the schedule example in the second embodiment of the invention.
Figure 43:
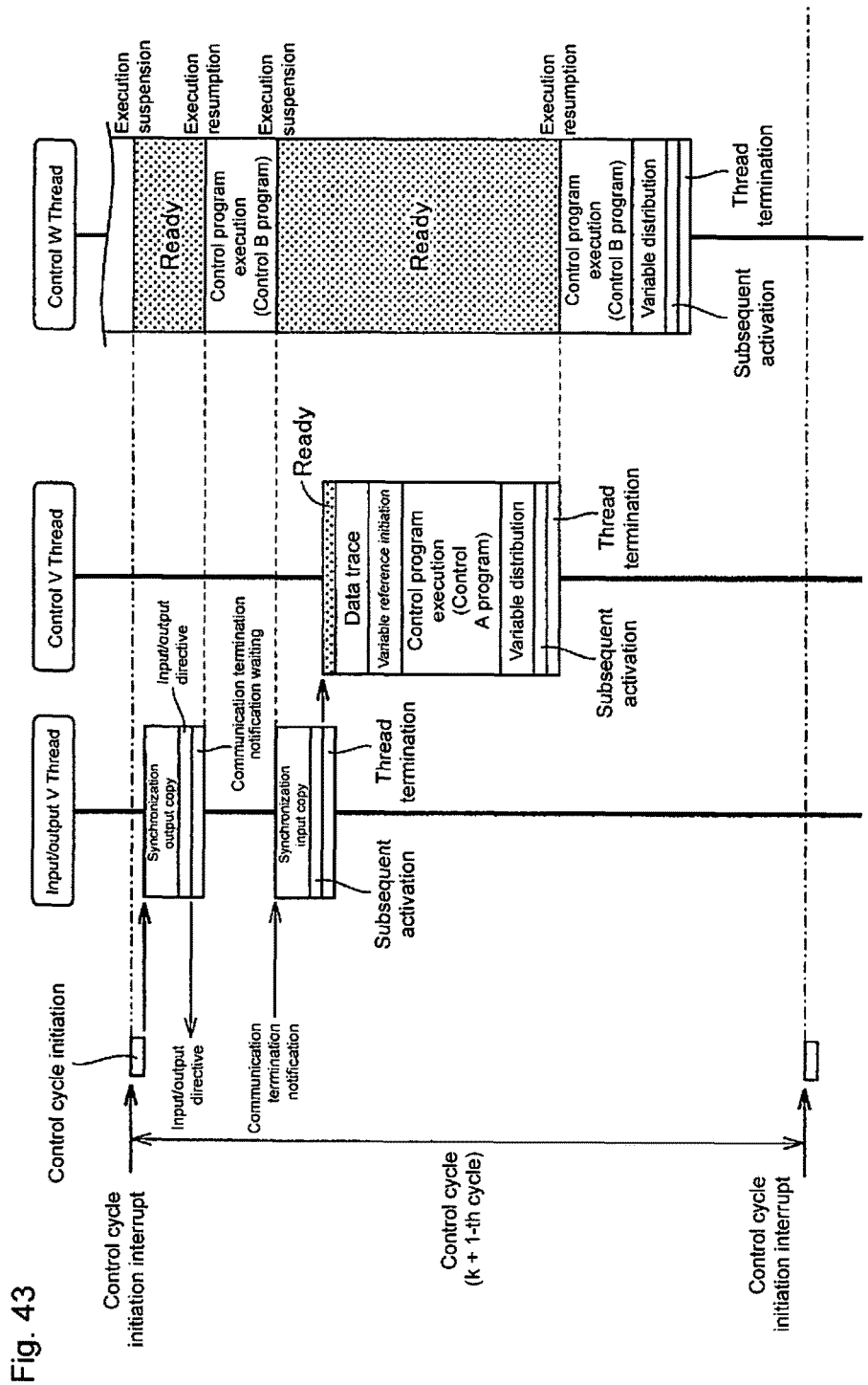
FIG. 43 is a sequence diagram of the (k+1)-th cycle in schedule example in the second embodiment of the invention.

FIG. 41 is a table showing schedule-building data 234 corresponding to a schedule example in the second embodiment of the invention. FIG. 42 is a sequence diagram of the k-th cycle in the schedule example in the second embodiment of the invention. FIG. 43 is a sequence diagram of the (k+1)-th cycle in schedule example in the second embodiment of the invention. How the sequences in FIGS. 42 and 43 are generated from the schedule-building data 234 in FIG. 41 is obvious from schedule example 1 in the first embodiment considered with reference to FIGS. 39A, 39B, 40A, and 40B, so that no detailed description is given to a relationship between the schedule-building data 234 in FIG. 41 and the sequences in FIGS. 42 and 43.

The schedule example in the second embodiment has realized almost the same schedule as that in schedule example 1 in the first embodiment by using a mechanism in the second embodiment. That is, the schedule is built using threads but not tasks. Therefore, the execution count and the execution time measured by using tasks as a target in the first embodiment are done so by using threads in the second embodiment. Similarly, almost the same schedules as those in the other schedule examples in the first embodiment can also be realized using the mechanism in the second embodiment.

H. Third Embodiment

The first embodiment has been described with reference to the method of using the mechanism of building a schedule having the hierarchy structure of tasks and threads. In contrast, a third embodiment will be described with reference to a method of building a schedule by assigning execution numbers to procedures and executing the procedures in order of the execution numbers to build a schedule without using tasks and threads.

Schedule-building data according to the third embodiment includes specifications of procedures to be executed and specifications of execution numbers and execution cycle periods of the specified procedures. If a plurality of specified procedures having the same name are assigned to assign different execution numbers, a procedure's object instance is generated for each of the execution numbers. In the following description, the procedures having the same name but assigned different execution numbers are handled as separate procedures distinguished from each other.

In the third embodiment, in preparatory processing (step S1 in FIG. 7) by system program 210 for control actions by a PLC 1, for each procedure, a storage section (main memory 104 etc.) is provided with a storage region configured to store execution cycle counts and a storage region configured to store an executed flag.

Further, besides functions peculiar to each procedure, the procedures according to the third embodiment have a procedure execution control function which is common to them.

Figure 44:
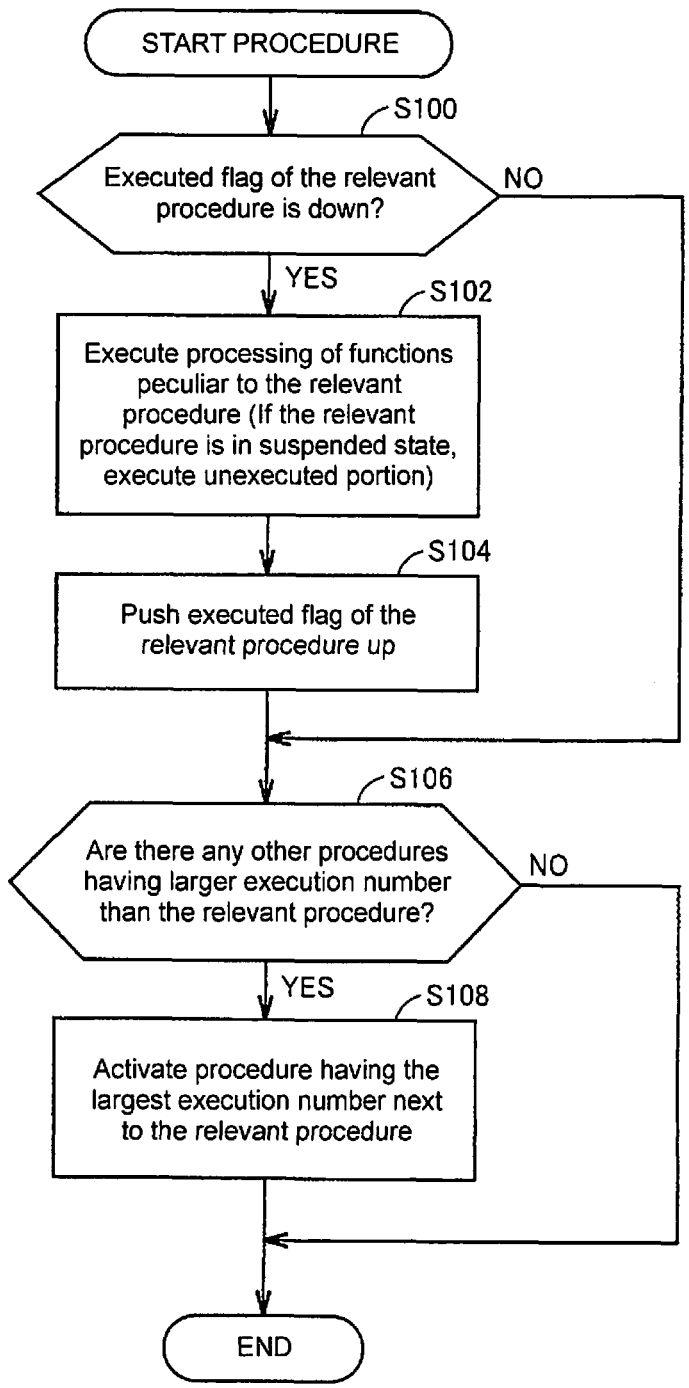
FIG. 44 is a flowchart showing processing provided by an execution control function commonly owned by the procedures in a third embodiment of the invention.

FIG. 44 is a flowchart showing processing provided by an execution control function commonly owned by the procedures in the third embodiment of the invention. As shown in FIG. 44, if execution of a procedure starts, a decision is made as to whether the executed flag of the relevant procedure is down (step S100). In the third embodiment, whether execution of each procedure is finished is decided on the basis of the state (up or down) of the corresponding executed flag.

If the executed flag of the relevant procedure is not down (NO in step S100), processing goes to step S106.

If the executed flag of the procedure is down (YES in step S100), processing of functions peculiar to the relevant procedure is executed (step S102). If the relevant procedure is in the suspended state owing to the preceding processing, an unexecuted portion is executed. Then, if the processing of the functions peculiar to the relevant procedure ends, the executed flag of the relevant procedure is put up (step S104).

A decision is made in step S106 as to whether there are any other procedures having a larger execution number than the relevant procedure. If there are no other procedures having a larger execution number than the relevant procedure (NO in step S106), the relevant procedure ends.

If there are other procedures having a larger execution number than the relevant procedure (YES in step S106), a procedure having the largest execution number next to the relevant procedure is activated (step S108). Then, execution of the relevant procedure ends.

FIG. 45 is a table showing functions, set items, and explanations of the set items about a control cycle initiation procedure, which is one of the procedures prepared in the third embodiment of the invention. FIGS. 46A and 46B are tables showing names and functions of the procedures other than the control cycle initiation procedure prepared in the third embodiment of the invention.

FIG. 47 is a table showing schedule-building data 234 corresponding to a schedule example in the third embodiment of the invention. In FIG. 47(1), for the control cycle initiation procedure, a "control cycle initiation interrupt" is set as control cycle initiation conditions. In FIG. 47(2), as described above, procedures to be executed are specified, and for each of the specified procedures, an execution number and an execution cycle period are specified. Moreover, for a control program execution procedure, a target control program to be executed by the procedure is also specified. The following will describe an example which is similar to schedule example 1 in the first embodiment in that a control A program is executed using an execution cycle period of "1" and a control B program is executed using an execution cycle period of "2".

Figure 48:
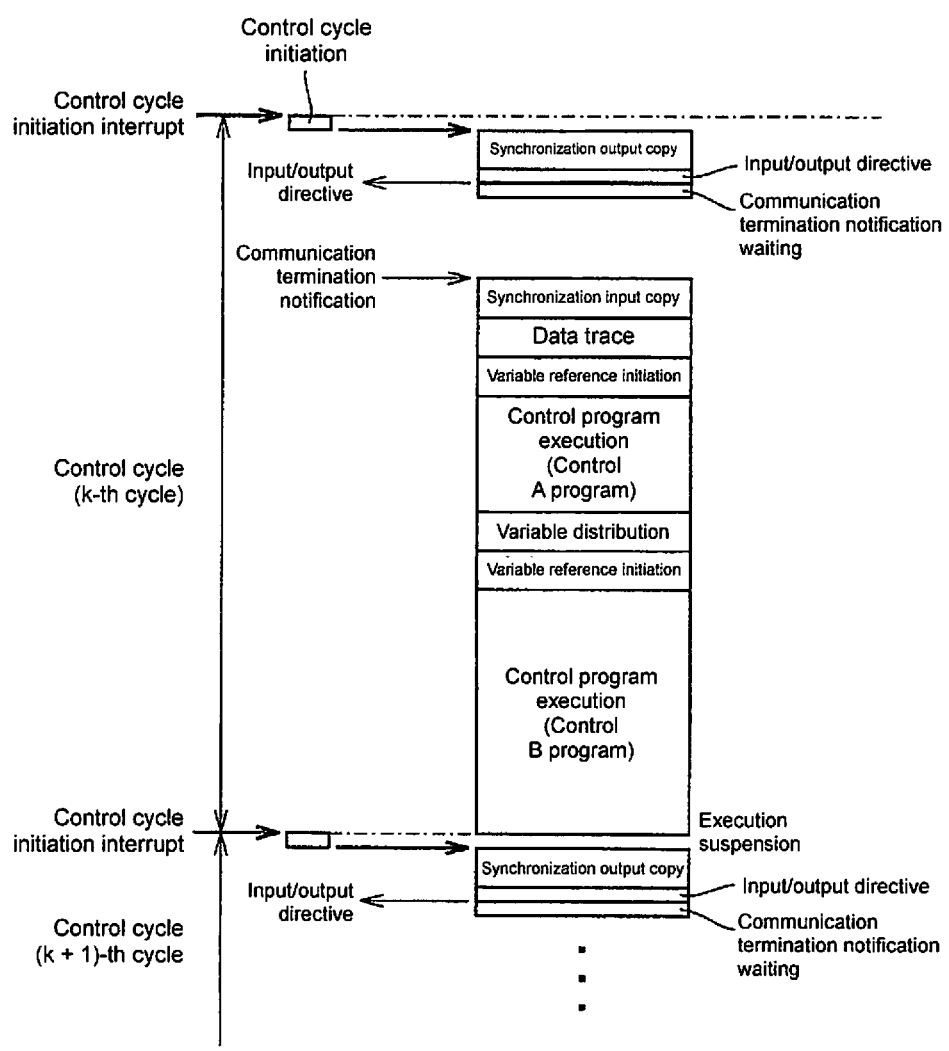
FIG. 48 is a sequence diagram of the k-th cycle in the schedule example corresponding to the schedule-building data in FIG. 47.
Figure 49:
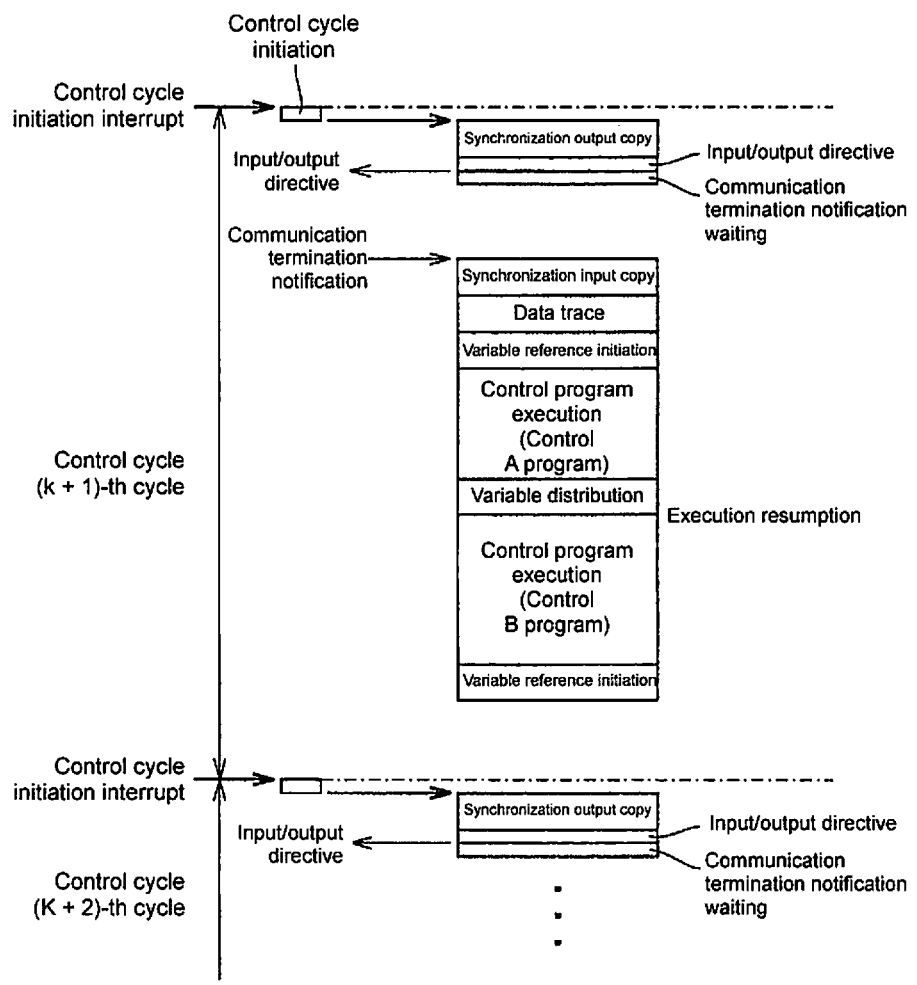
FIG. 49 is a sequence diagram of the (k+1)-th cycle in the schedule example corresponding to the schedule-building data in FIG. 47.

FIG. 48 is a sequence diagram of the k-th cycle in the schedule example corresponding to the schedule-building data in FIG. 47. FIG. 49 is a sequence diagram of the (k+1)-th cycle in the schedule example corresponding to the schedule-building data in FIG. 47.

As shown in FIGS. 47 and 48, in the k-th cycle, the control cycle initiation procedure is executed owing to control cycle initiation interruption. As described in FIG. 45, the control cycle initiation procedure counts up the execution cycle count of each procedure and executes the other processing. It is supposed that in the k-th cycle, the control cycle initiation procedure sets the execution cycle count to "1" and pushes the executed flag down for all of the procedures. Further, the control cycle initiation procedure first activates the procedure (synchronization output copy procedure in the example in FIG. 47) that has the smallest execution number. Then, in accordance with a processing sequence (flowchart shown in FIG. 44) for execution control functions which are common to the procedures, the procedures are executed in ascending order of the execution numbers. After the processing of the peculiar functions is executed, the procedures have their respective executed flags pushed up. In the example in FIG. 47, a control cycle initiation interrupt for the (k+1)-th cycle occurs while a control B program is being executed, so that execution of the control B program is suspended.

As shown in FIGS. 47 and 49, in the (K+1)-th cycle, the control cycle initiation interrupt causes the control cycle initiation procedure to be executed. The control cycle initiation procedure counts up the execution cycle count of each of the procedures, so that resultantly each procedure has its execution cycle count set to "2". The procedures having execution numbers of "1" through "8" each have an execution cycle period of "1", so that at this point in time, the execution cycle count of each of them is in excess of a specified execution cycle period. Therefore, the control cycle initiation procedure sets the execution cycle count of each of the procedures to "1" and pushes down the corresponding executed flag. The procedures having execution numbers of "9" through "11" each have an execution cycle period of "2", so that at this point in time, the execution cycle count of each of them is not in excess of the specified execution cycle period. Therefore, the control cycle initiation procedure leaves the respective execution cycle counts and executed flags of the procedures as they are. Then, the procedures are executed starting with the procedure having the smallest execution number (synchronization output procedure in the example in FIG. 47).

The procedures that have the execution cycle period of "1" and execution numbers "1" through "8" are executed in much the same way as in the k-th cycle. The variable reference initiation procedure with execution number "9" has its executed flag left up in the k-th cycle as is, so that its peculiar functions are not executed, to activate the control program execution procedure with execution number "10" in accordance with a flow in FIG. 44 (see step S100 in FIG. 44).

The control program B to be executed by the control program execution procedure with execution number "10" is suspended during execution in the k-th cycle, so that its unexecuted portion is executed (see step S102 in FIG. 44).

Then, execution of the variable distribution procedure with execution number "11" ends, so that execution of the procedure in the (k+1)-th cycle ends.

Then, a time before occurrence of the control cycle initiation interrupt in the (k+2)-th cycle is used to execute the other processing pieces (peripheral processing) by the system program.

Contents of execution by the schedule are similar to those in schedule example 1 in the first embodiment. Thus, in the third embodiment of the invention, for each procedure, its execution number that determines execution order and execution cycle period are specified, so that the order in which the procedures are executed in the control cycles can be used to build a schedule that has almost the same results as those obtained in the case of using a plurality of threads having the different execution cycle periods.

Although the example in the third embodiment has not included the function to cope with execution cycle overrun, the function to allow a procedure execution cycle overrun of up to a set number of control cycles may be added.

Instead of providing the procedure itself with the execution control functions as in the case of the third embodiment described above, the system program 210 may assume execution control functions such as those in FIG. 44, to call and execute the procedures one by one based on schedule-building data such as shown in FIG. 47 so that a schedule similar to that in the third embodiment can be realized.

It is to be noted that the disclosed embodiments are exemplary in all respects and not restrictive. It is intended that the scope of the invention should be considered to be defined not by the above description but by the claims and also include all of descriptions and equivalents in the claims and their modifications.

DESCRIPTION OF SYMBOLS

1 PLC
2 Field network
3 Servo motor driver
4 Servo motor
5 Terminal
6 Detection switch
7 Relay
8 PLC support device
9 CD-ROM
10 Connection cable
11 PLC system bus
12 Power supply unit
13 CPU unit 14, 53 IO unit
15 Special unit
51 Terminal bus
52 Communication coupler
81 CPU
83 RAM
85 Keyboard
86 Mouse
87 Monitor
88 CD-ROM drive
100 Microprocessor
102 Chip set
104 Main memory
106 Nonvolatile memory
108 System timer
110 USB connector
120 PLC system bus controller
122 DMA control circuit
124 PLC system bus control circuit
126, 146 Buffer memory
130 connector
140 Field network controller
144 Field network control circuit
200 real-time OS
210 System program
212 Scheduler program
214 Procedure library
222 Control action performing thread and independent procedure
224, 234 Schedule-building data
230 Control program
230-1 First control program
230-2 Second control program
232 Sequence instruction computing program
234 Motion computing program
234-1 First motion computing program
234-2 Second motion computing program
236 User program
236-1 First user program
236-2 Second user program
310 OS
320 Support program
321 Editor program
322 Compiler program
323 Debugger program
324 Schedule-building data template
325 Schedule-building data program
326 Communication program
330 Source program
1041 Program region
1042 Control program's working region
1042a Global variable region
1042b Variable synchronization buffer region
1042c Output synchronization buffer region
1042d Input synchronization buffer region
1043 PLC system bus transmission buffer
1044 PLC system bus reception buffer
1045 Field network transmission buffer
1046 Field network reception buffer
SYS System

The invention claimed is:

1. A CPU unit in a programmable logic controller (PLC) configured to control a control target, the CPU unit comprising:
a microprocessor;
a storage section; and
a communication circuit, wherein:
the storage section stores a system program, a control program, and schedule-building data;
the microprocessor executes the system program and the control program stored in the storage section;
the communication circuit transmits output data generated through execution of the control program and receives input data to be used in execution of the control program;
the microprocessor executes the system program comprising a procedure library comprising at least a first procedure for controlling execution of the control program and a second procedure for controlling output of the output data and input of the input data;
the schedule-building data comprises a specification for an execution order for executing the first procedure and the second procedure; and
the system program causes the microprocessor to execute the first procedure and the second procedure in accordance with the specification for the execution order included in the schedule-building data.

2. The CPU unit according to claim 1, wherein:
the schedule-building data comprises specifications for generating a thread of one or more of the procedures included in the procedure library; and
the system program causes the microprocessor to perform operations comprising generating the thread of the one or more of the procedures included in the procedure library in accordance with specifications, as preparatory processing for performance of control actions by the PLC.

3. The CPU unit according to claim 2, wherein the schedule-building data comprises data about the thread comprising specifications that cause the microprocessor to perform operations to activate any other threads when the generated thread is being executed by the microprocessor.

4. The CPU unit according to claim 2, wherein:
the schedule-building data further comprises specifications that set a task set item which comprises one or a plurality of the threads and provides a unit for repetitive execution; and
the system program causes the microprocessor to set the task set item in accordance with the specifications that set the task set item, as the preparatory processing for performance of the control actions by the PLC.

5. The CPU unit according to claim 1, further comprising a schedule-building data acquisition section that acquires the schedule-building data.

6. A PLC system comprising a CPU unit according to claim 5 and a PLC support device configured to support use of the PLC, wherein:
the PLC support device comprises a second storage section and a second computing unit;
the second storage section stores a PLC support program and the schedule-building data; and
the PLC support program causes the second computing unit to perform operations comprising outputting the schedule-building data such that the schedule-building data acquisition section acquires the schedule-building data from the second computing unit.

7. The CPU unit according to claim 1, wherein the schedule-building data comprising the procedure execution order specifications comprises data that cause the communication circuit to repeat transmission of the output data, and to repeat the reception of the input data, and that causes the microprocessor to repeat the execution of the control program configured to generate the output data by using the input data.

8. The CPU unit according to claim 7, further comprising a control cycle period setting section configured to set a period of a control cycle, wherein:
the communication circuit transmits the output data and receives the input data for each control cycle; and
the schedule-building data comprises specifications of the procedure execution order that causes the microprocessor to start execution of the control program after transmission of the output data and reception of the input data by the communication circuit in a next control cycle after a current control cycle in which execution of the control program is finished and to execute an unexecuted portion of the control program in the next control cycle after the current control cycle in which execution of the control program is not finished.

9. The CPU unit according to claim 7, wherein:
the system program causes the microprocessor to perform operations comprising, as preparatory processing for performance of the control actions by the PLC:
generating in the storage section a reception buffer in which the received input data is stored; and
generating in the storage section an input synchronization buffer as a reference destination when the control program references the input data for each piece of the input data; and
the schedule-building data comprises specifications of the procedure execution order that cause the microprocessor to perform operations comprising:
copying according to the execution order the received input data from the reception buffer to the input synchronization buffer compatible with received input data; and
starting execution of the control program according to the execution order.

10. The CPU unit according to claim 9, wherein:
the system program further causes the microprocessor to perform operations comprising, as preparatory processing for performance of the control actions by the PLC:
generating in the storage section a transmission buffer configured to store output data to be transmitted; and
generating in the storage section an output synchronization buffer in which the output data to be copied to the transmission buffer is stored for each piece of the output data; and
the schedule-building data further comprises specifications of the procedure execution order that causes the microprocessor to copy the output data from the output synchronization buffer to the transmission buffer.

11. The CPU unit according to claim 10, wherein the schedule-building data comprises specifications of the procedure execution order that causes the microprocessor to execute the control program initiation processing in each execution cycle defined as an integral multiple of the control cycle and to copy the output data from the output synchronization buffer to the transmission buffer when the output data generated through execution of the control program in a previous execution cycle is transmitted from the transmission buffer.

12. The CPU unit according to claim 9, wherein:
the input data is received for each of the control cycles; and
the schedule-building data comprises specifications of the procedure execution order that causes the microprocessor to start the control program initiation processing for each execution cycle defined as an integral multiple of the control cycle and to execute the copying according to the execution order the received input data received in the control cycle in which the execution cycle of the control program is started.

13. The CPU unit according to claim 7, wherein:
the storage section further stores attribute data about a variable to be used by the control program;
the attribute data comprises: specifications of one owner side control program that can rewrite the variable if the variable is a global variable referenced by a plurality of the control programs; and specifications of one or more referrer side control programs that can reference only the variable;
the system program causes the microprocessor to perform operations comprising, as preparatory processing for performance of the control actions by the PLC:
generating in the storage section a global variable region in which global variables are stored; and
generating in the storage section a variable synchronization buffer to be used as a reference destination in place of the global variable region by each of the referrer side control programs when the referrer side control program references the global variables for each of the global variables referenced by the referrer side control program; and
the schedule-building data comprises specifications of the procedure execution order that cause the microprocessor to perform operations comprising:
starting execution of an owner side control program;
copying the global variable to be rewritten by the owner side control program from the global variable region to the variable synchronization buffer compatible with the global variable if execution of the owner side control program ends; and
starting execution of one or more of the referrer side control programs.

14. The CPU unit according to claim 7, wherein:
the control program comprises a motion computing program that causes the microprocessor to calculate a motion command value used to control motion of a motor and a user program that causes the microprocessor to supply the motion computing program with directives; and
the schedule-building data comprises specifications of the procedure execution order that cause the communication circuit to repeatedly perform transmission of the output data and reception of the input data cause the microprocessor to repeatedly execute the user program, and the motion computing program in the given order.

15. The CPU unit according to claim 7, wherein:
the communication circuit transmits the output data and receives the input data in a period of the control cycle;
the control program comprises a first control program and a second control program;
the first control program comprises a first motion computing program that causes the microprocessor to generate first motion command value data to control motion of a motor;
the second control program comprises a second motion computing program that causes the microprocessor to generate second motion command value data to control motion of the motor;
at least one of the first control program and the second control program comprises a user program that causes the microprocessor to supply the first motion computing program and the second motion computing program with directives; and the schedule-building data comprises specifications of the procedure execution order that cause the microprocessor to perform operations comprising:
   starting execution of the first control program for each first execution cycle having the same period as that of the control cycle and starting execution of the second control program for each second execution cycle having an integral multiple of two or more times the period of the control cycle; and
   starting execution of the second control program after execution of the first control program ends in the control cycle in which the second execution cycle starts and, if the second control program fails to end before the control cycle in which the second execution cycle starts ends, starting execution of an unexecuted portion of the second control program in a next control cycle after execution of the first control program ends.

16. The CPU unit according to claim 7, wherein:
the microprocessor comprises at least a first core and a second core;
the control program comprises a first control program and a second control program; and
the schedule-building data comprises specifications of the procedure execution order that cause the first core to perform operations comprising executing the first control program after transmission of the output data and reception of the input data by the communication circuit is ended and to cause the second core to perform operations comprising executing the second control program concurrently with execution of the first control program.

17. The CPU according to claim 1, wherein the schedule-building data comprises the specification of the procedure execution order necessary to cause the microprocessor to start execution of the control program after transmission of the output data and reception of the input data by the communication circuit; and
   the CPU unit further comprises a control cycle period setting section configured to set a period of a control cycle of the control program such that a period of communication of the transmission of the output data and the reception of the input data by the communication circuit is in synchronization with the control cycle.

18. A non-transitory computer-readable medium storing a system program configured to be executed by a microprocessor after being stored in a storage section in a CPU unit in a programmable logic controller (PLC), the CPU unit comprising the microprocessor, the storage section, and a communication circuit to control a control target, wherein:
   the storage section stores the system program, a control program, and schedule-building data;
   the microprocessor is configured to read and execute the system program and the control program stored in the storage section;
   the communication circuit is configured to transmit output data generated through execution of the control program and receive input data to be used in execution of the control program;
   the system program comprises a procedure library comprising at least a first procedure for controlling execution of the control program and a second procedure for controlling output of the output data and input of the input data;
   the schedule-building data comprises a specification for an execution order for the first procedure and the second procedure; and
   the system program causes the microprocessor to execute the first procedure and the second procedure in accordance with the specification for the execution order included in schedule-building data.

19. The non-transitory computer-readable medium storing the system program according to claim 18, wherein:
   the schedule-building data comprises specifications necessary to generate a thread by using the procedures included in the procedure library; and
   the system program comprises processing for generating the thread in accordance with specifications for generating the thread included in the schedule-building data, as preparatory processing for performance of control actions by the PLC.

20. The non-transitory computer-readable medium storing the system program according to claim 19, wherein the schedule-building data comprises, as data about the thread, specifications necessary to activate any other threads when the thread is being executed.

21. The non-transitory computer-readable medium according to claim 18, wherein the schedule-building data comprises the specification of the procedure execution order necessary to cause the microprocessor to start execution of the control program after transmission of the output data and reception of the input data by the communication circuit; and
   the system program causes the microprocessor to perform operation comprising setting a period of a control cycle of the control program such that a period of communication of the transmission of the output data and the reception of the input data by the communication circuit is in synchronization with the control cycle.

22. A PLC support device configured to support a CPU unit in a programmable logic controller (PLC) configured to control a control target, the CPU unit comprising:
   a procedure library comprising at least a first procedure for controlling execution of a control program and a second procedure for controlling output of output data generated through execution of the control program and input of input data to be used in execution of the control program; and
   a schedule-building data acquisition section configured to acquire schedule-building data that comprises specifications for an execution order of the first procedure and the second procedure, wherein:
   the PLC support device comprises a storage section and a computing unit;
   the storage section stores a PLC support program and the schedule-building data;
   the PLC support program causes the computing unit to execute output processing necessary to output the schedule-building data such that the schedule-building data acquisition section acquires the schedule-building data from the computing unit of the PLC support device.

23. The PLC support device according to claim 22, wherein
   the schedule-building data comprises the specification of the procedure execution order necessary to cause the CPU unit to start execution of the control program after transmission of the output data and reception of the input data, and
   the CPU unit further comprises a control cycle period setting section configured to set a period of a control cycle of the control program such that a period of communication of the transmission of the output data and the reception of the input data by the communication circuit is in synchronization with the control cycle.

24. A non-transitory computer: readable medium storing a programmable logic controller (PLC) support program configured to be executed in a PLC support device that supports a CPU unit in a PLC configured to control a control target, wherein
the CPU unit comprises:
a procedure library comprising at least a first procedure for controlling execution of a control program and a second procedure for controlling output of output data generated through execution of the control program and input of input data to be used in execution of the control program are included;
a schedule-building data acquisition section configured to acquire schedule-building data that comprises specifications for an execution order of the first procedure and the second procedure, and
a control cycle period setting section configured to set a period of a control cycle of the control program;
the PLC support device comprises a storage section and a computing unit;
the storage section is used to store a PLC support program and the schedule-building data;
the PLC support program causes the computing unit to execute output processing necessary to output the schedule-building data such that the schedule-building data acquisition section acquires the schedule-building data from the computing unit of the PLC support device.

25. The non-transitory computer: readable medium according to claim 24, wherein
the schedule-building data comprises the specification of the procedure execution order necessary to cause the CPU unit to start execution of the control program after transmission of the output data and reception of the input data; and
the control cycle period setting section is configured to set the period of a control cycle of the control program such that a period of communication of the transmission of the output data and the reception of the input data is in synchronization with the control cycle.

* * * * *